(12) United States Patent
Das et al.

(10) Patent No.: US 12,041,398 B2
(45) Date of Patent: *Jul. 16, 2024

(54) APPARATUS AND METHODS FOR ENHANCING QUALITY OF EXPERIENCE FOR DATA SERVICES OVER HIGH-CAPACITY WIRELESS NETWORKS

(71) Applicant: Charter Communications Operating, LLC, St. Louis, MO (US)

(72) Inventors: Pratik Das, Escondido, CA (US); Diwelawatte Jayawardene, Centennial, CO (US); Manish Jindal, Lone Tree, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,131

(22) Filed: Oct. 17, 2022

(65) Prior Publication Data

US 2023/0050403 A1 Feb. 16, 2023

Related U.S. Application Data

(63) Continuation of application No. 17/175,161, filed on Feb. 12, 2021, now Pat. No. 11,477,550, which is a (Continued)

(51) Int. Cl.
*H04L 41/5003* (2022.01)
*H04J 3/16* (2006.01)
(Continued)

(52) U.S. Cl.
CPC ............ *H04Q 11/02* (2013.01); *H04J 3/1652* (2013.01); *H04L 5/0007* (2013.01);
(Continued)

(58) Field of Classification Search
CPC ............... H04L 41/5003; H04L 47/821; H04L 61/5007; H04M 7/006; H04W 84/042
See application file for complete search history.

(56) References Cited

U.S. PATENT DOCUMENTS

| 5,742,583 | A | 4/1998 | Scott |
| 6,542,730 | B1 | 4/2003 | Hosain |

(Continued)

FOREIGN PATENT DOCUMENTS

| CA | 2643806 C | 6/2013 |
| CA | 3097121 A1 | 10/2019 |

(Continued)

OTHER PUBLICATIONS

3GPP., "Evolved Universal Terrestrial Radio Access (E-UTRA), Carrier Aggregation, Base Station (BS) radio transmission and reception (Release 10)", Technical Specification Group Radio Access Network, Technical Report (TR 36.808 V10.1.0), 2013, 31 pages.

(Continued)

*Primary Examiner* — Brian Whipple
(74) *Attorney, Agent, or Firm* — Patent Beach PC

(57) ABSTRACT

Apparatus and methods for guaranteeing a quality of experience (QoE) associated with data provision services in an enhanced data delivery network. In one embodiment, a network architecture having service delivery over at least portions of extant infrastructure (e.g., a hybrid fiber coax infrastructure) is disclosed, which includes standards-compliant ultra-low latency and high data rate services (e.g., 5G NR services) via a common service provider. In one exemplary implementation, "over-the-top" voice data services may enable exchange of voice traffic with client devices in the aforementioned network. A distribution node may use a detection rule to identify received packets as voice traffic, and cause a dedicated bearer to attach to the default bearer, thereby enabling delivery of high-quality voice traffic by at (Continued)

least prioritizing the identified packets thereafter and sustaining the delivery even in a congested network environment, and improving the quality of service (QoS) and QoE for the user(s).

20 Claims, 32 Drawing Sheets

Related U.S. Application Data continuation of application No. 16/384,701, filed on Apr. 15, 2019, now Pat. No. 10,924,825.

(60) Provisional application No. 62/658,465, filed on Apr. 16, 2018.

(51) Int. Cl.
| | | |
|---|---|---|
| *H04L 5/00* | (2006.01) | |
| *H04L 12/28* | (2006.01) | |
| *H04L 27/00* | (2006.01) | |
| *H04L 27/26* | (2006.01) | |
| *H04L 47/70* | (2022.01) | |
| *H04L 61/5007* | (2022.01) | |
| *H04L 67/12* | (2022.01) | |
| *H04M 7/00* | (2006.01) | |
| *H04Q 11/02* | (2006.01) | |
| *H04W 16/14* | (2009.01) | |
| *H04W 36/08* | (2009.01) | |
| *H04W 48/18* | (2009.01) | |
| *H04W 56/00* | (2009.01) | |
| *H04W 72/0453* | (2023.01) | |
| *H04W 80/10* | (2009.01) | |
| *H04W 84/04* | (2009.01) | |

(52) U.S. Cl.
CPC ........ *H04L 5/0041* (2013.01); *H04L 12/2801* (2013.01); *H04L 27/0006* (2013.01); *H04L 27/2637* (2013.01); *H04L 41/5003* (2013.01); *H04L 47/821* (2013.01); *H04L 61/5007* (2022.05); *H04L 67/12* (2013.01); *H04W 16/14* (2013.01); *H04W 36/08* (2013.01); *H04W 48/18* (2013.01); *H04W 56/001* (2013.01); *H04W 72/0453* (2013.01); *H04W 80/10* (2013.01); *H04M 7/006* (2013.01); *H04Q 2213/13012* (2013.01); *H04W 84/042* (2013.01)

(56) References Cited

U.S. PATENT DOCUMENTS

| | | |
|---|---|---|
| 6,542,739 B1 | 4/2003 | Garner |
| 7,592,912 B2 | 9/2009 | Hasek et al. |
| 7,602,820 B2 | 10/2009 | Helms et al. |
| 7,698,606 B2 | 4/2010 | Ladd et al. |
| 8,024,607 B2 | 9/2011 | Ladd et al. |
| 8,046,636 B2 | 10/2011 | Ladd et al. |
| 8,095,610 B2 | 1/2012 | Gould et al. |
| 8,170,065 B2 | 5/2012 | Hasek et al. |
| 8,302,111 B2 | 10/2012 | Ladd et al. |
| 8,321,723 B2 | 11/2012 | Ladd et al. |
| 8,599,797 B2 | 12/2013 | Pelkonen |
| 8,724,588 B2 | 5/2014 | Li et al. |
| 8,750,710 B1 | 6/2014 | Hirt et al. |
| 8,799,723 B2 | 8/2014 | Ladd et al. |
| 8,880,071 B2 | 11/2014 | Taaghol et al. |
| 8,989,297 B1 | 3/2015 | Lou et al. |
| 8,997,136 B2 | 3/2015 | Brooks et al. |
| 9,185,341 B2 | 11/2015 | Hardin |
| 9,209,898 B1 | 12/2015 | Schemmann et al. |
| 9,213,538 B1 | 12/2015 | Ladd et al. |
| 9,270,592 B1 | 2/2016 | Sites |
| 9,300,445 B2 | 3/2016 | Hardin |
| 9,363,202 B1 | 6/2016 | Al-Banna |
| 9,414,111 B2 | 8/2016 | Hasek et al. |
| 9,472,091 B2 | 10/2016 | Stern et al. |
| 9,596,593 B2 | 3/2017 | Li et al. |
| 9,706,512 B2 | 7/2017 | Suh |
| 9,948,349 B2 | 4/2018 | Malach |
| 10,009,431 B2 | 6/2018 | Holtmanns |
| 10,164,858 B2 | 12/2018 | Gunasekara et al. |
| 10,340,976 B2 | 7/2019 | Kakinada et al. |
| 10,375,629 B2 | 8/2019 | Zhang |
| 10,405,192 B2 | 9/2019 | Kakinada et al. |
| 10,492,204 B2 | 11/2019 | Kakinada et al. |
| 10,506,499 B2 | 12/2019 | Keller et al. |
| 10,536,859 B2 | 1/2020 | Gunasekara et al. |
| 10,742,270 B1 | 8/2020 | Kim |
| 10,924,825 B2 | 2/2021 | Das et al. |
| 11,129,213 B2 | 9/2021 | Vaidya et al. |
| 11,190,861 B2 | 11/2021 | Bali |
| 11,432,284 B2 | 8/2022 | Hmimy et al. |
| 2004/0158649 A1 | 8/2004 | Ophir et al. |
| 2004/0187156 A1 | 9/2004 | Palm et al. |
| 2005/0063317 A1 | 3/2005 | Risberg et al. |
| 2006/0262770 A1 | 11/2006 | Park et al. |
| 2007/0022459 A1 | 1/2007 | Gaebel, Jr. et al. |
| 2007/0094691 A1 | 4/2007 | Gazdzinski |
| 2008/0101291 A1 | 5/2008 | Jiang et al. |
| 2008/0235746 A1 | 9/2008 | Peters et al. |
| 2008/0279287 A1 | 11/2008 | Asahina |
| 2009/0110088 A1 | 4/2009 | Di Giandomenico et al. |
| 2009/0119735 A1 | 5/2009 | Dounaevski et al. |
| 2009/0176490 A1 | 7/2009 | Kazmi et al. |
| 2010/0008235 A1 | 1/2010 | Tinnakornsrisuphap et al. |
| 2010/0064330 A1 | 3/2010 | Yu et al. |
| 2010/0178912 A1 | 7/2010 | Gunnarsson et al. |
| 2012/0076009 A1 | 3/2012 | Pasko |
| 2012/0224563 A1 | 9/2012 | Zisimopoulos et al. |
| 2012/0246255 A1 | 9/2012 | Walker et al. |
| 2012/0275315 A1 | 11/2012 | Schlangen et al. |
| 2012/0275401 A1 | 11/2012 | Sun |
| 2013/0010686 A1 | 1/2013 | Shatzkamer et al. |
| 2013/0077554 A1 | 3/2013 | Gauvreau et al. |
| 2013/0178225 A1 | 7/2013 | Xing |
| 2013/0279914 A1 | 10/2013 | Brooks |
| 2013/0322504 A1 | 12/2013 | Asati et al. |
| 2013/0329550 A1* | 12/2013 | Kotecha ............ H04L 47/2475 370/230 |
| 2014/0148107 A1 | 5/2014 | Maltsev et al. |
| 2014/0269865 A1 | 9/2014 | Aparin |
| 2015/0085853 A1 | 3/2015 | Smith et al. |
| 2015/0156777 A1 | 6/2015 | Negus et al. |
| 2015/0201088 A1 | 7/2015 | Wu et al. |
| 2015/0229584 A1 | 8/2015 | Okamoto et al. |
| 2016/0013855 A1 | 1/2016 | Campos et al. |
| 2016/0020835 A1 | 1/2016 | Stadelmeier et al. |
| 2016/0073344 A1 | 3/2016 | Vutukuri et al. |
| 2016/0094421 A1 | 3/2016 | Bali et al. |
| 2016/0127434 A1 | 5/2016 | Yoon et al. |
| 2016/0128072 A1 | 5/2016 | Rajagopal et al. |
| 2016/0212632 A1 | 7/2016 | Katamreddy et al. |
| 2016/0259923 A1 | 9/2016 | Papa et al. |
| 2016/0294498 A1 | 10/2016 | Ma et al. |
| 2016/0337485 A1 | 11/2016 | Nuggehalli et al. |
| 2016/0373974 A1 | 12/2016 | Gomes et al. |
| 2017/0019144 A1 | 1/2017 | Malach |
| 2017/0034734 A1 | 2/2017 | Ahmadi |
| 2017/0093555 A1 | 3/2017 | Hamzeh et al. |
| 2017/0164068 A1 | 6/2017 | Wachob et al. |
| 2017/0201912 A1 | 7/2017 | Zingler et al. |
| 2017/0208488 A1 | 7/2017 | Hwang et al. |
| 2017/0245281 A1 | 8/2017 | Zuckerman et al. |
| 2017/0257750 A1 | 9/2017 | Gunasekara et al. |
| 2017/0332282 A1 | 11/2017 | Dao |
| 2018/0063813 A1 | 3/2018 | Gupta et al. |
| 2018/0092142 A1 | 3/2018 | Han et al. |
| 2018/0098245 A1 | 4/2018 | Livanos et al. |
| 2018/0198732 A1 | 7/2018 | Karthikeyan et al. |

(56) References Cited

U.S. PATENT DOCUMENTS

| | | |
|---|---|---|
| 2018/0331935 A1 | 11/2018 | Ross et al. |
| 2018/0338277 A1 | 11/2018 | Byun et al. |
| 2018/0343685 A1 | 11/2018 | Hart et al. |
| 2018/0351809 A1 | 12/2018 | Meredith et al. |
| 2018/0352386 A1 | 12/2018 | Gunasekara et al. |
| 2019/0007870 A1 | 1/2019 | Gupta et al. |
| 2019/0028141 A1 | 1/2019 | Padden et al. |
| 2019/0037630 A1 | 1/2019 | Zhang et al. |
| 2019/0053193 A1 | 2/2019 | Park et al. |
| 2019/0075023 A1 | 3/2019 | Sirotkin |
| 2019/0082501 A1 | 3/2019 | Vesely et al. |
| 2019/0109643 A1 | 4/2019 | Campos et al. |
| 2019/0124572 A1 | 4/2019 | Park et al. |
| 2019/0124696 A1 | 4/2019 | Islam et al. |
| 2019/0208380 A1 | 7/2019 | Shi et al. |
| 2019/0245740 A1 | 8/2019 | Kachhla |
| 2019/0253944 A1 | 8/2019 | Kim |
| 2019/0289470 A1 | 9/2019 | Vaidya et al. |
| 2019/0313365 A1 * | 10/2019 | Islam .................. H04W 48/12 |
| 2019/0319814 A1 | 10/2019 | Das |
| 2019/0319858 A1 | 10/2019 | Das et al. |
| 2019/0320250 A1 | 10/2019 | Hoole et al. |
| 2019/0320322 A1 | 10/2019 | Jayawardene et al. |
| 2019/0320494 A1 | 10/2019 | Jayawardene et al. |
| 2019/0320498 A1 | 10/2019 | Sadri et al. |
| 2019/0349848 A1 | 11/2019 | Bali |
| 2019/0357199 A1 | 11/2019 | Ali et al. |
| 2019/0379455 A1 | 12/2019 | Wang et al. |
| 2020/0053018 A1 | 2/2020 | White et al. |
| 2020/0053545 A1 | 2/2020 | Wong et al. |
| 2020/0053546 A1 | 2/2020 | Panchal et al. |
| 2020/0091608 A1 | 3/2020 | Alpman et al. |
| 2020/0214065 A1 | 7/2020 | Tomala et al. |
| 2020/0267077 A1 | 8/2020 | Williams et al. |
| 2020/0374352 A1 | 11/2020 | Ge et al. |
| 2021/0026711 A1 | 1/2021 | Ovadia et al. |
| 2021/0028915 A1 | 1/2021 | Jia et al. |
| 2021/0092640 A1 | 3/2021 | Ravishankar et al. |
| 2021/0112551 A1 | 4/2021 | Anderson et al. |
| 2021/0120315 A1 | 4/2021 | Makinen et al. |
| 2021/0175925 A1 | 6/2021 | Tarighat Mehrabani |
| 2021/0250196 A1 | 8/2021 | Das et al. |
| 2021/0274529 A1 | 9/2021 | Chen et al. |
| 2021/0289275 A1 | 9/2021 | Das |
| 2021/0314762 A1 | 10/2021 | Wong et al. |
| 2021/0336815 A1 | 10/2021 | Das et al. |
| 2022/0007274 A1 | 1/2022 | Jin et al. |
| 2022/0007440 A1 | 1/2022 | Vaidya et al. |
| 2022/0046343 A1 | 2/2022 | Hoole et al. |
| 2022/0078624 A1 | 3/2022 | Hong |
| 2022/0132524 A1 | 4/2022 | Mueck et al. |

FOREIGN PATENT DOCUMENTS

| | | | |
|---|---|---|---|
| CA | 3097140 A1 | 10/2019 | |
| CA | 3097144 A1 | 10/2019 | |
| CN | 105071860 A | 11/2015 | |
| CN | 111989900 A | 11/2020 | |
| EP | 0812119 A2 | 12/1997 | |
| EP | 2858303 A1 * | 4/2015 | ......... H04L 41/0893 |
| EP | 3782305 A1 | 2/2021 | |
| EP | 3782341 A1 | 2/2021 | |
| EP | 3782435 A1 | 2/2021 | |
| GB | 2548796 A | 10/2017 | |
| JP | 2006325206 | 11/2006 | |
| JP | 2007281617 A | 10/2007 | |
| JP | 2009135880 A | 6/2009 | |
| JP | 2010136020 A | 6/2010 | |
| JP | 2011254495 A | 12/2011 | |
| JP | 2016511998 A | 4/2016 | |
| JP | 2017118483 A | 6/2017 | |
| JP | 2018023050 A | 2/2018 | |
| JP | 2018510589 A | 4/2018 | |
| JP | 2021521712 A | 8/2021 | |
| JP | 2021524173 A | 9/2021 | |
| KR | 20160097917 A | 8/2016 | |
| WO | WO-2004045125 A2 | 5/2004 | |
| WO | WO-2017025152 A1 * | 2/2017 | ............ H04W 16/10 |
| WO | WO-2017186294 A1 | 11/2017 | |
| WO | WO-2018031070 A1 * | 2/2018 | |
| WO | WO-2018131488 A1 | 7/2018 | |
| WO | WO-2019204165 A1 | 10/2019 | |
| WO | WO-2019204166 A1 | 10/2019 | |
| WO | WO-2019204336 A1 | 10/2019 | |
| WO | WO-2020033334 A1 | 2/2020 | |
| WO | WO-2020077346 A1 | 4/2020 | |
| WO | WO-2020081471 A1 | 4/2020 | |

OTHER PUBLICATIONS

3GPP., "RAN Adjusts Schedule for 2nd Wave of 5G Specifications (Release 16)", 2 pages, Retrieved from the internet [URL: https://www.3gpp.org/news-events/3gpp-news/2005-ran_r16_schedule].

3GPP TS 23.234 v13.1.0, "3GPP system to Wireless Local Area Network (WLAN) interworking; System description (Release 13)" 2017, 18 pages.

3GPP TS 36.413, V14.4.1, "3rd Generation Partnership Project; Technical Specification Group Radio Access Network; Evolved Universal Terrestrial Radio Access Network (E-UTRAN); S1 Application Protocol (S1AP) (Release 14)", 2018.

3GPP TS 38.473 V15.0.0 (Dec. 2017) "3rd Generation Partnership Project; Technical Specification Group Radio Access Network," TS 38.473 (v15.0.0), Dec. 2017, NG-RAN, F1 application protocol (F1AP), Release 15, 90 pages.

3GPP TS 38.473 V15.A.A (Apr. 2018) 3rd Generation Partnership Project; Technical Specification Group Radio Access Network; NG-RAN; F1 application protocol (F1AP) (Release 15), 106 pages.

3GPP., "Study on New Radio Access Technology, Radio Interface Protocol Aspects (Release 14)", Technical Specification Group Radio Access Network, Technical Report (TR 38.804), V14.0.0 (Mar. 2017), 57 pages.

IEEE 802.11 standard, 1997, URL: http://www.ieeexplore.ieee.org/documenU654779 , 459 pages.

IEEE Standards 802.3, 2008, 27 pages.

Maamoun K. M. et al., "A Survey and a Novel Scheme for RoF-PON as FTTx Wireless Services," 2009 6th InternationalSymposium on High Capacity Optical Networks and Enabling Technologies(HONET), IEEE, 2009, pp. 246-253.

Aoyama et al., "Video System Optical Receiving Terminal Device", Jun. 18, 2009, JP, English translation of JP-2009135880.

* cited by examiner

APPARATUS AND METHODS FOR ENHANCING QUALITY OF EXPERIENCE FOR DATA SERVICES OVER HIGH-CAPACITY WIRELESS NETWORKS

PRIORITY AND RELATED APPLICATIONS

This application is a continuation of and claims the benefit of priority to U.S. patent application Ser. No. 17/175,161 of the same title filed Feb. 12, 2021, issuing as U.S. Pat. No. 11,477,550 on Oct. 18, 2022, which is a continuation of and claims the benefit of priority to U.S. patent application Ser. No. 16/384,701 entitled "APPARATUS AND METHODS FOR ENHANCING QUALITY OF EXPERIENCE FOR OVER-THE-TOP DATA SERVICES OVER HIGH-CAPACITY WIRELESS NETWORKS" filed Apr. 15, 2019, and issued as U.S. Pat. No. 10,924,825 on Feb. 16, 2021, which claims the benefit of priority to U.S. Provisional Patent Application No. 62/658,465 entitled "APPARATUS AND METHODS FOR INTEGRATED HIGH-CAPACITY DATA AND WIRELESS NETWORK SERVICES" and filed Apr. 16, 2018, each of which is incorporated herein by reference in its entirety.

This application is also related to co-owned and co-pending U.S. patent application Ser. No. 16/216,835 entitled "APPARATUS AND METHODS FOR INTEGRATED HIGH-CAPACITY DATA AND WIRELESS NETWORK SERVICES" filed Dec. 11, 2018, Ser. No. 16/261,234 entitled "APPARATUS AND METHODS FOR ENABLING MOBILITY OF A USER DEVICE IN AN ENHANCED WIRELESS NETWORK" filed Jan. 29, 2019, Ser. No. 16/384,706 entitled "APPARATUS AND METHODS FOR COORDINATED DELIVERY OF MULTIPLE DATA CHANNELS OVER PHYSICAL MEDIUM" filed Apr. 15, 2019, Ser. No. 16/384,561 entitled "APPARATUS AND METHODS FOR INTEGRATED HIGH-CAPACITY DATA AND WIRELESS IoT (INTERNET OF THINGS) SERVICES" filed Apr. 15, 2019, and Ser. No. 16/384,805 entitled "GATEWAY APPARATUS AND METHODS FOR WIRELESS IoT (INTERNET OF THINGS) SERVICES" filed Apr. 15, 2019, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless devices, and specifically in one exemplary aspect to improving or guaranteeing quality of experience (QoE) for over-the-top (OTT) voice services over high-speed wireless data services.

2. Description of Related Technology

Data communication services are now ubiquitous throughout user premises (e.g., home, office, and even vehicles). Such data communication services may be provided via a managed or unmanaged network. For instance, a typical home has services provided by one or more network service providers via a managed network such as a cable or satellite network. These services may include content delivery (e.g., linear television, on-demand content, personal or cloud DVR, "start over", etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere", anytime," so that users (subscribers) can access the desired services (e.g., watch a movie) via a number of different receiving and rendering platforms, such as in different rooms of their house, on their mobile device while traveling, etc.

Managed Cable Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home). FIGS. 1 and 2 are a functional block diagrams illustrating a typical prior art managed (e.g., cable) content delivery network architecture used to provide such data services to its users and subscribers.

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

Within the cable plant, VOD and so-called switched digital video (SDV) may also be used to provide content, and utilize a single-program transport stream (SPTS) delivery modality. In U. S. cable systems for example, downstream RF channels used for transmission of television programs are 6 MHz wide, and occupy a 6 MHz spectral slot between 54 MHz and 860 MHz. Deployments of VOD services have to share this spectrum with already established analog and digital cable television services such as those described above. Within a given cable plant, all homes that are electrically connected to the same cable feed running through a neighborhood will receive the same downstream signal. For the purpose of managing e.g., VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable.

Thus, a VOD Service Group consists of homes receiving VOD signals over the same 4 RF channels.

In most cable networks, programs are transmitted using MPEG (e.g., MPEG-2) audio/video compression. Since cable signals are transmitted using Quadrature Amplitude Modulation (QAM) scheme, available payload bitrate for typical modulation rates (QAM-256) used on HFC systems is roughly 38 Mbps. For example, in many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel (10×3.75=37.5 Mbps<38 Mbps). Since a typical Service Group consists of 4 RF channels, 40 simultaneous SD VOD sessions can be accommodated within a Service Group.

Entertainment-quality transmission of HD (High Definition) signals requires about four times as much bandwidth as SD. For an exemplary MPEG-2 Main Profile-High Level (MP@HL) video compression, each HD program requires around 15 Mbps bitrate.

Over-the-Top (OTT) Delivery

Alternatively, so-called "over-the-top" or OTT delivery may be used for providing services within a network, wherein content from a third party source who may be unaffiliated with the network operator provides content directly to the requesting user or subscriber via the network operator's infrastructure (including the cable architecture described supra), e.g., via an IP-based transport; i.e., the content is packetized and routed for delivery to the requesting user based on the user's network or IP address, such as via the aforementioned high-speed DOCSIS cable modem, according to the well-known Internet Protocol network-layer protocol.

IP unicasts (point to point) or multicasts (point to multiple points) have traditionally been used as the mechanism by which the OTT content is distributed over the network, via the user accessing a prescribed URL and logging in with their credentials to gain access to the content. The IP content is then streamed via the unicast/multicast to the requesting user(s), and received and decoded by a media player application program ("app") on the user's PC, laptop, or other IP-enabled end-user device.

One type of service widely used by and gaining increasing interest from casual consumers, small businesses, and enterprises is OTT voice services. Generally speaking, an OTT application uses a data network of a device (e.g., desktop, laptop, smartphone, tablet) to offer a service that is provided by a third party other than a network operator. Such OTT services may be packaged and delivered by vendors as Voice over Internet Protocol (VoIP), which is a type of digital telephony that uses the Internet Protocol. These services rely on existing public and/or private data communication services and architectures (e.g., IP networks managed by one or more network operators) to offer a high-speed and low-cost alternative (often free after initial setup costs, if any) to, for example, phone systems that utilize a traditional circuit-switched telephony infrastructure or digital delephony from a service provider. OTT voice services may enable myriad of additional features such as worldwide access, screen sharing, video, call forwarding, voicemail, and group or conference calls with multiple participants. OTT voice services may also be incorporated into other Internet-based applications such as voice chat in gaming, or as an additional component to text-based chats.

Examples of OTT applications that have at least one voice feature include Facebook Messenger, Skype, FaceTime, Google Talk, WhatsApp, Viber, KakaoTalk, and LINE. These applications provide voice services (among others) by leasing one or more servers and wireless services from a mobile operator to deliver and receive voice data packets.

Voice over Long Term Evolution (VoLTE) is an extension of voice OTT applications and uses a device's LTE data connection (see discussion of LTE and other 3GPP technologies below). Voice traffic exchanged over an LTE network (or 3GPP-based network, such as 3G, 4G and 5G) conforms to VoIP standards and similarly circumvents the aforementioned analog or copper telephony service provider infrastructure. Additionally, it is flexible in providing uninterrupted service even in areas where LTE (4G/4.5G) is unavailable, being able to fall back on 3G connectivity. VoLTE is typically provided by a mobile service operator, rather than by a third party. Hence, VoLTE is technically not an OTT application; however, it is useful for providing services resembling VoIP, and has similar downsides.

Wireless

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.

One such technology that enables a user to engage in wireless communication (e.g., via services provided through the cable network operator) is Wi-Fi® (IEEE Std. 802.11), which has become a ubiquitously accepted standard for wireless networking in consumer electronics. Wi-Fi allows client devices to gain convenient high-speed access to networks (e.g., wireless local area networks (WLANs)) via one or more access points.

Commercially, Wi-Fi is able to provide services to a group of users within a venue or premises such as within a trusted home or business environment, or outside, e.g., cafes, hotels, business centers, restaurants, and other public areas. A typical Wi-Fi network setup may include the user's client device in wireless communication with an AP (and/or a modem connected to the AP) that are in communication with the backend, where the client device must be within a certain range that allows the client device to detect the signal from the AP and conduct communication with the AP.

Another wireless technology in widespread use is Long-Term Evolution standard (also colloquially referred to as "LTE," "4G," "LTE Advanced," among others). An LTE network is powered by an Evolved Packet Core ("EPC"), an Internet Protocol (IP)-based network architecture and eNodeB—Evolved NodeB or E-UTRAN node which part of the Radio Access Network (RAN), capable of providing high-speed wireless data communication services to many wireless-enabled devices of users with a wide coverage area.

Currently, most consumer devices include multi-RAT capability; e.g.; the capability to access multiple different RATs, whether simultaneously, or in a "fail over" manner (such as via a wireless connection manager process running on the device). For example, a smartphone may be enabled for LTE data access, but when unavailable, utilize one or more Wi-Fi technologies (e.g., 802.11g/n/ac) for data communications.

The capabilities of different RATs (such as LTE and Wi-Fi) can be very different, including regarding establishment of wireless service to a given client device. For example, there is a disparity between the signal strength threshold for initializing a connection via Wi-Fi vs. LTE (including those technologies configured to operate in unlicensed bands such as LTE-U and LTE-LAA). As a brief aside, LTE-U enables data communication via LTE in an unlicensed spectrum (e.g., 5 GHz) to provide additional radio spectrum for data transmission (e.g., to compensate for overflow traffic). LTE-LAA uses carrier aggregation to combine LTE in unlicensed spectrum (e.g., 5 GHz) with the licensed band. Typical levels of signal strength required for LTE-U or LTE-LAA service are approximately −80 to −84 dBm. In comparison, Wi-Fi can be detected by a client device based on a signal strength of approximately −72 to −80 dBm, i.e., a higher (i.e., less sensitive) detection threshold.

Increasing numbers of users (whether users of wireless interfaces of the aforementioned standards, or others) invariably lead to "crowding" of the spectrum, including interference. Interference may also exist from non-user sources such as solar radiation, electrical equipment, military uses, etc. In effect, a given amount of spectrum has physical limitations on the amount of bandwidth it can provide, and as more users are added in parallel, each user potentially experiences more interference and degradation of performance.

Moreover, technologies such as Wi-Fi have limited range (due in part to the unlicensed spectral power mask imposed in those bands), and may suffer from spatial propagation variations (especially inside structures such as buildings) and deployment density issues. Wi-Fi has become so ubiquitous that, especially in high-density scenarios such as hospitality units (e.g., hotels), enterprises, crowded venues, and the like, the contention issues may be unmanageable, even with a plethora of Wi-Fi APs installed to compensate. Yet further, there is generally no coordination between such APs, each in effect contending for bandwidth on its backhaul with others.

Additionally, lack of integration with other services provided by e.g., a managed network operator, typically exists with unlicensed technology such as Wi-Fi. Wi-Fi typically acts as a "data pipe" opaquely carried by the network operator/service provider.

5G New Radio (NR) and NG-RAN (Next Generation Radio Area Network)

NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core). As such, both "standalone" (SA) and "non-standalone" (NSA) configurations are described. As discussed in greater detail below, in the SA scenario, the 5G NR or the evolved LTE radio cells and the core network are operated alone. Conversely, in NSA scenarios, combination of e-UTRAN and NG-RAN entities are utilized.

In some aspects, exemplary Release 15 NG-RAN leverages technology and functions of extant LTE/LTE-A technologies (colloquially referred to as 4G or 4.5G), as bases for further functional development and capabilities. For instance, in an LTE-based network, upon startup, an eNB (base station) establishes S1-AP connections towards the MME (mobility management entity) whose commands the eNB is expected to execute. An eNB can be responsible for multiple cells (in other words, multiple Tracking Area Codes corresponding to E-UTRAN Cell Global Identifiers). The procedure used by the eNB to establish the aforementioned S1-AP connection, together with the activation of cells that the eNB supports, is referred to as the S1 SETUP procedure; see inter alia, 3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated September 2017, which is incorporated herein by reference in its entirety.

As a brief aside, and referring to FIG. 3a (an SA configuration), the CU 304 (also known as gNB-CU) is a logical node within the NR architecture 300 that communicates with the NG Core 303, and includes gNB functions such as transfer of user data, session management, mobility control, RAN sharing, and positioning; however, other functions are allocated exclusively to the DU(s) 306 (also known as gNB-DUs) per various "split" options described subsequently herein in greater detail. The CU 304 communicates user data and controls the operation of the DU(s) 306, via corresponding front-haul (Fs) user plane and control plane interfaces 308, 310.

Accordingly, to implement the Fs interfaces 308, 310, the (standardized) F1 interface is employed. It provides a mechanism for interconnecting a gNB-CU 304 and a gNB-DU 306 of a gNB 302 within an NG-RAN, or for interconnecting a gNB-CU and a gNB-DU of an en-gNB within an E-UTRAN. The F1 Application Protocol (F1AP) supports the functions of F1 interface by signaling procedures defined in 3GPP TS 38.473. F1AP consists of so-called "elementary procedures" (EPs). An EP is a unit of interaction between gNB-CU and gNB-DU. These EPs are defined separately and are intended to be used to build up complete messaging sequences in a flexible manner. Generally, unless otherwise stated by the restrictions, the EPs may be invoked independently of each other as standalone procedures, which can be active in parallel.

Within such an architecture 300, a gNB-DU 306 (or ngeNB-DU) is under the control of a single gNB-CU 304. When a gNB-DU is initiated (including power-up), it executes the F1 SETUP procedure (which is generally modeled after the above-referenced S1 SETUP procedures of LTE) to inform the controlling gNB-CU of, inter alia, any number of parameters such as e.g., the number of cells (together with the identity of each particular cell) in the F1 SETUP REQUEST message.

FIGS. 3b-3d illustrate some of the alternate prior art configurations of 5G NR gNB architectures, including those involving eLTE eNB (evolved LTE eNBs that are capable of communication with an NGC or EPC) and various configurations of user-plane and control-plane interfaces in the so-called "non-standalone" or NSA configurations (e.g., Options 3, 4 and 7). See, inter alia, 3GPP TR 38.804 V14.0.0 (2017-03)—"3rd Generation Partnership Project; Technical Specification Group Radio Access Network; Study on New Radio Access Technology; Radio Interface Protocol Aspects (Release 14)," incorporated herein by reference in its entirety, for additional details on these and other possible 4G/5G configurations.

In FIG. 3b, a eUTRAN eNB 316 is communicative with the 5G gNB 302 for user plane (UP) and control plane (CP) functions, and is communicative with the NGC 303 for UP functions (i.e., the gNB is a master node in conjunction with a 5GC).

In FIG. 3c, a eUTRAN eNB 316 is communicative with the 5G gNB 302 for user plane (UP) and control plane (CP) functions, and is communicative with the NGC 303 for UP and CP functions (i.e., the eNB is a master node in conjunction with a 5GC).

In FIG. 3d, a 5G gNB 302 is communicative with the eNB 316 for user plane (UP) and control plane (CP) functions, and is communicative with the Evolved Packet Core (EPC) 333 for UP functions (i.e., the eNB is a master node in conjunction with an EPC).

As of the date of this writing, 3GPP is delivering Release 15 to industry in three distinct steps: (i) 'early' drop: contains Non-standalone 5G specifications (so called Option-3 family), ASN.1 frozen in March 2018; (ii) 'main' drop: contains Standalone 5G (so called Option-2), ASN.1 frozen in September 2018; and (iii) 'late' drop: contains additional migration architectures (so called Option-4, Option-7, and 5G-5G dual connectivity), ASN.1 to be frozen in June 2019. See http://www.3gpp.org/news-events/3gpp-news/2005-ran_r16_schedule.

Better Solutions Needed

Even with the great advances in wireless data rate, robustness and coverage afforded by extant 4/4.5G (e.g. LTE/LTE-A) and WLAN (and other unlicensed) systems, significant disabilities still exist in the provision of OTT voice applications.

One such problem relates to OTT voice services such as VoIP (and VoLTE) that commonly suffer from quality-of-service (QoS) and quality-of-experience (QoE) issues. QoS refers to an objective measurement of network service parameters related to the network itself, such as packet loss rates or throughput. QoE is a more subjective measure from the user's perspective and is representative of the user's experience of the overall quality of the service provided, by capturing user's aesthetic and hedonic needs. QoE may be measured by a number of metrics such as user ratings or Mean Opinion Score (MOS). MOS is a widely used measure for assessing the quality of media signals.

Both QoE and QoS metrics are important for measuring and anticipating the quality associated with OTT voice services over the data network, in that degraded network performance may affect the user's experience and satisfaction, even after a one negative experience. Lack of continuity of service (e.g., causing intermittent or permanent service dropouts), low fidelity of audio (and/or video), packet delays causing lag in audio (and/or video), jitter, echo, disconnections, etc. may cause unsatisfactory experiences for the end user (resulting in, e.g., lower QoE ratings). Moreover, as wireless technology continues to evolve beyond LTE and 4.5G connectivity, consumers and enterprise users expect higher QoE for OTT voice services; i.e., one that is commensurate with expectations attached to increasing data rates and lower latencies. Third-party OTT service providers may be unable to significantly improve media quality and fidelity without control over the network infrastructure.

In one example scenario, a user communicating with one or more other users via an OTT voice application via VoIP or VoLTE (such as any one of the aforementioned applications, e.g., Skype, WhatsApp, FaceTime) may unexpectedly experience a degradation of the audio being received and transmitted. For instance, the user may experience "choppy" audio where at least portions of the communications may be inaudible, leading to intermittently unclear messages. The audio quality may drop to very low levels, where the sampling rate of the audio signals may drop below 8,000 Hz (also known as "speech quality," cf. 44,100 Hz used by audio CDs). At this point, the audio may become undecipherable to the listening user. In some scenarios, the call may temporarily or permanently "drop" with or without the user's knowledge, on one side or all sides, causing confusion among listeners and speakers. The line connection may also stall until a stable connection is restored. These issues often require the user(s) to reconnect, wait until the audio quality eventually rises to acceptable levels, or simply bear them.

Consequently, the user experience (hence, QoE) may greatly suffer as a result of the degradation of voice signals, especially when bandwidth allocated to the user is limited or otherwise unstable or unpredictable (e.g., based on the modem used on the premises or whether the user is on the go). Congestion of network traffic may require other users on the premises to disconnect or pause activity. Demands placed on bandwidth are even higher when combining voice with video, as would be the case during a video call (a feature present in most OTT voice applications).

Accordingly, improved apparatus, systems, and methods are needed to, inter alia, enhance the QoE and/or QoS of OTT voice services received on a networked device (e.g., a 3GPP-enabled wireless mobile device), ideally while also concurrently providing access to optimized delivery of ultra-high data rate services (both wired and wireless). To the degree that extant network infrastructure could be leveraged to provide these capabilities, additional advantages could be realized.

SUMMARY

The present disclosure addresses the foregoing needs by providing, inter alia, methods and apparatus for providing enhancements to the quality of experience associated with over-the-top voice services via ultra-high data rate services (both wired and wireless) which leverage extant network infrastructure.

In one aspect, methods and apparatus for guaranteed QoE for OTT voice services is disclosed. In one embodiment, a 3GPP-based CPE is connected via RF cable to a 3GPP access system, and a detection process (such as a Mobile Edge Computing (MEC) platform which can reside at DU, CU or Core network), will first detect the type of traffic as e.g., OTT voice, and allocate one or more QoE/QoS-enabled channels or bearers for the OTT voice session so as to mitigate packet loss.

In another aspect, a method for enhancing a quality of experience (QoE) associated with communication service over a data network is disclosed. In one embodiment, the method includes: receiving, over a first virtualized data channel, one or more data packets originating from a client device of the data network; determining that at least one attribute of the one or more received data packets meets a prescribed criterion; based at least on the determining, causing a creation of a second virtualized data channel; and causing a transmission of data packets associated with the communication service that are subsequently received from the client device via the second virtualized data channel.

In one variant of the method, the receiving, determining and causing are each performed by execution of computerized logic on a computerized network node device of the data network. The receiving of the one or more data packets includes in one implementation receiving one or more Voice over Internet Protocol (VoIP) packets at least via a wireless connection between the client device and a network node communicative with the computerized network node device.

In another variant, the method further includes logically correlating the second virtualized data channel to the first virtualized data channel, the second virtualized data channel having a priority that is greater than that of the first virtualized data channel.

In a further variant, the receiving of the one or more data packets from the client device over the first virtualized data channel comprises receiving the one or more data packets from the client device over a 3GPP EPS (Evolved Packet System) or 5G NR (New Radio) default bearer; and the causing a transmission of data packets via the second virtualized data channel comprises a transmission via a 3GPP EPS or 5G NR dedicated bearer attached to the default bearer.

In yet another variant, the causing creation of the second virtualized data channel is at least partly in response to a determination that a match exists between a transport protocol utilized by the one or more data packets and one or more of (i) an Extensible Messaging and Presence Protocol (XMPP), and/or (ii) a Bidirectional-streams over Synchronous HTTP (BOSH).

In another variant, the causing the creation of the second virtualized data channel is at least partly in response to a determination that a destination Internet Protocol (IP) address associated with the one or more data packets comprises an IP address associated with a known third-party data server in data communication with the data network.

In a further variant, the communication service comprises a real-time voice or video communication service susceptible to quality erosion due to use of the first virtualized data channel; and the data network comprises an HFC (hybrid fiber coaxial) network utilizing at least OFDM (Orthogonal frequency division multiplexed) waveforms for providing at least the second virtualized data channel.

In another aspect of the disclosure, network apparatus configured to enable enhanced quality of experience (QoE) of communication over a data network is set forth. In one embodiment, the network apparatus includes: digital processing apparatus; a data interface in data communication with the digital processing apparatus and configured for data communication with a computerized IP-enabled client device; and a storage device in data communication with the digital processing apparatus and comprising at least one computer program.

In one variant, the at least one computer program configured to, when executed on the digital processing apparatus is configured to receive a plurality of data packets issued by the computerized IP-enabled client device via the data interface, the plurality of data packets having been transmitted over a first data channel and belonging to a media stream of data packets; evaluate at least a portion of the plurality of data packets to determine whether at least one criterion is met; and based at least on the evaluation indicating that the at least one criterion is met, causing instantiation of a second data channel, the second data channel configured in at least one respect to improve performance of delivery of the media stream over that provided by the first data channel; and cause utilization of the second data channel for delivery of subsequent portions of the media stream of data packets.

In another aspect, a method of utilizing a default bearer to instantiate a dedicated bearer in a data network is disclosed. In one embodiment, the method includes detecting a prescribed type of traffic being carried on the default bearer, instantiating a dedicated bearer to carry the traffic, and then causing utilization of the dedicated bearer for carrying the traffic in place of the default bearer once the dedicated bearer has been instantiated and configured.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In another aspect, a computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device. In yet another embodiment, the apparatus comprises a "cloud" (network) based storage device which is remote from yet accessible via a computerized user or client electronic device. In yet another embodiment, the apparatus comprises a "fog" (network) based storage device which is distributed across multiple nodes of varying proximity and accessible via a computerized user or client electronic device.

In yet another aspect, a software architecture is disclosed. In one embodiment, the architecture includes a Mobile Edge Computing (MEC) that is operative on one or more 5G NR entities (e.g., CU or DU or AMF) that is configured to communicate with other software processes within the architecture to invoke QoS-enabled bearers for OTT voice sessions.

These and other aspects shall become apparent when considered in light of the disclosure provided herein.

Figure 1:
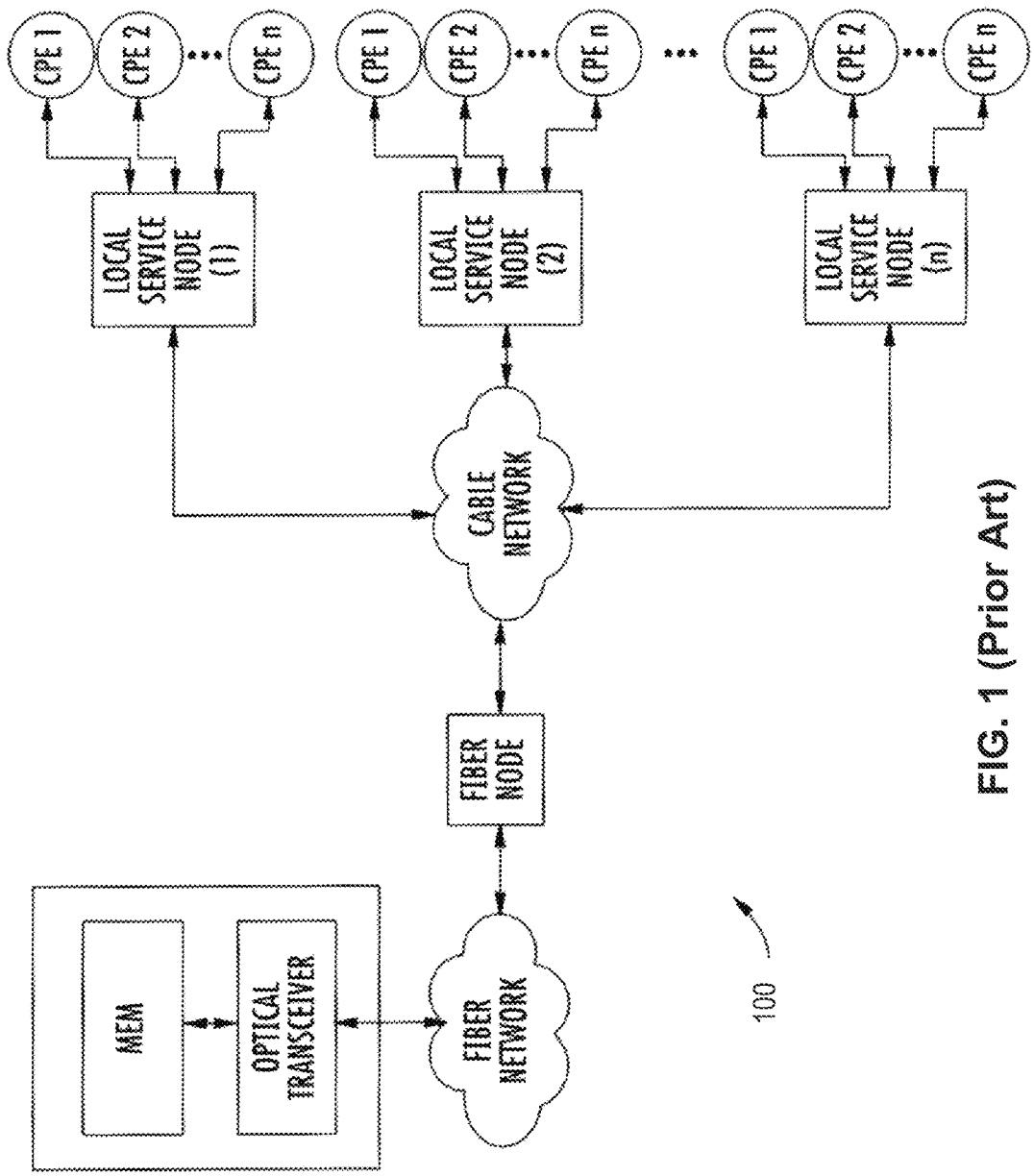
FIGS. 1 and 2 are a functional block diagrams illustrating a typical prior art managed (e.g., cable) content delivery network architecture.

All figures © Copyright 2018-2019 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

Overview

In one exemplary aspect, the present disclosure provides improved architectures, methods and apparatus for providing a guaranteed quality-of-experience (QoE) for users communicating over an data network capable of providing 5G connectivity. In one embodiment, the enhanced data network leverages an existing managed network (e.g., HFC cable network) infrastructure to provide enhanced data throughput and performance, including in support of OTT or other packet-based voice and/or video communication sessions between two or more endpoints.

In one configuration, a Hybrid Fiber Coax (HFC) plant infrastructure and extant 3GPP LTE and 5G NR protocols are used as bases for provision of standards-compliant ultra-low latency and high data rate services (e.g., 5G NR services) via a common service provider. In one variant, an expanded frequency band (approximately 1.6 GHz in total bandwidth) is used over the coaxial portions of the HFC infrastructure, which is allocated to two or more sub-bands, at least one of which may be allocated to specialized data channels with guaranteed priority over other channels. An OFDM and TDD-based access and modulation scheme is used to allow for maximal efficiency and flexibility in allocating bandwidth to UL and DL transmissions over the HFC infrastructure. The improved architecture also in some implementations advantageously facilitates so-called "network slicing," including providing differentiated services (to guarantee QoE of users) for various target applications and use cases.

5G-enabled network entities (including Distribution Units, Controller Units, NR Core) are used within the foregoing architecture to provide the services to users at a given premises and thereabouts, using extant 3GPP protocols. In one variant, local area (e.g., "pole mounted" or buried) radio access nodes are used in concert with a 5G-enabled CPE (CPEe) to provide wireless connectivity to one or more user devices in data communication with the aforementioned 5G-enabled network entities and/or other associated nodes (e.g., "enhanced" CPE), thereby enabling data rates on the order of 10 Gbps and above and latency rates on the order of 1 ms or less "round trip."

One aspect of the present disclosure enables data packets associated with so-called over-the-top (OTT) voice services to be detected by an "enhanced" node of the improved network architecture, and evaluated using one or more detection criteria. If selection criteria are met (e.g., a match exists between an aspect of the packets and one or more prescribed criteria), the enhanced node may instruct another network entity to create (or itself create) one or more dedicated bearers for transporting particular types of traffic going to or from a user device thereafter. For example, the type of transport protocol identified from the packets passing through the enhanced node may match one associated with OTT voice services, such as XMPP or BOSH.

Additionally or alternatively, the destination IP addresses of the packets may be associated with a server entity controlled by a third-party voice service provider (but not necessarily by the network operator). Other detection rules may be implemented based on one or more attributes of the detected packets.

The foregoing enables enhanced QoE and QoS commensurate with user expectations for the ultra-high data rate and ultra-low latency of the 5G-enabled network (i.e., high-bitrate audio and/or video, minimized or eliminated disconnects or packet drops even with multi-party conference calls over OTT voice services), thereby enabling a rich and sustained delivery of voice traffic for the users even in a congested network environment.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned wireless access nodes (e.g., gNBs) associated with or supported at least in part by a managed network of a service provider (e.g., MSO), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., commercial/retail, or enterprise domain (e.g., businesses), or even governmental uses. Yet other applications are possible.

Other features and advantages of the present disclosure will immediately be recognized by persons of ordinary skill in the art with reference to the attached drawings and detailed description of exemplary embodiments as given below.

Service Provider Network Architecture—

Figure 4:
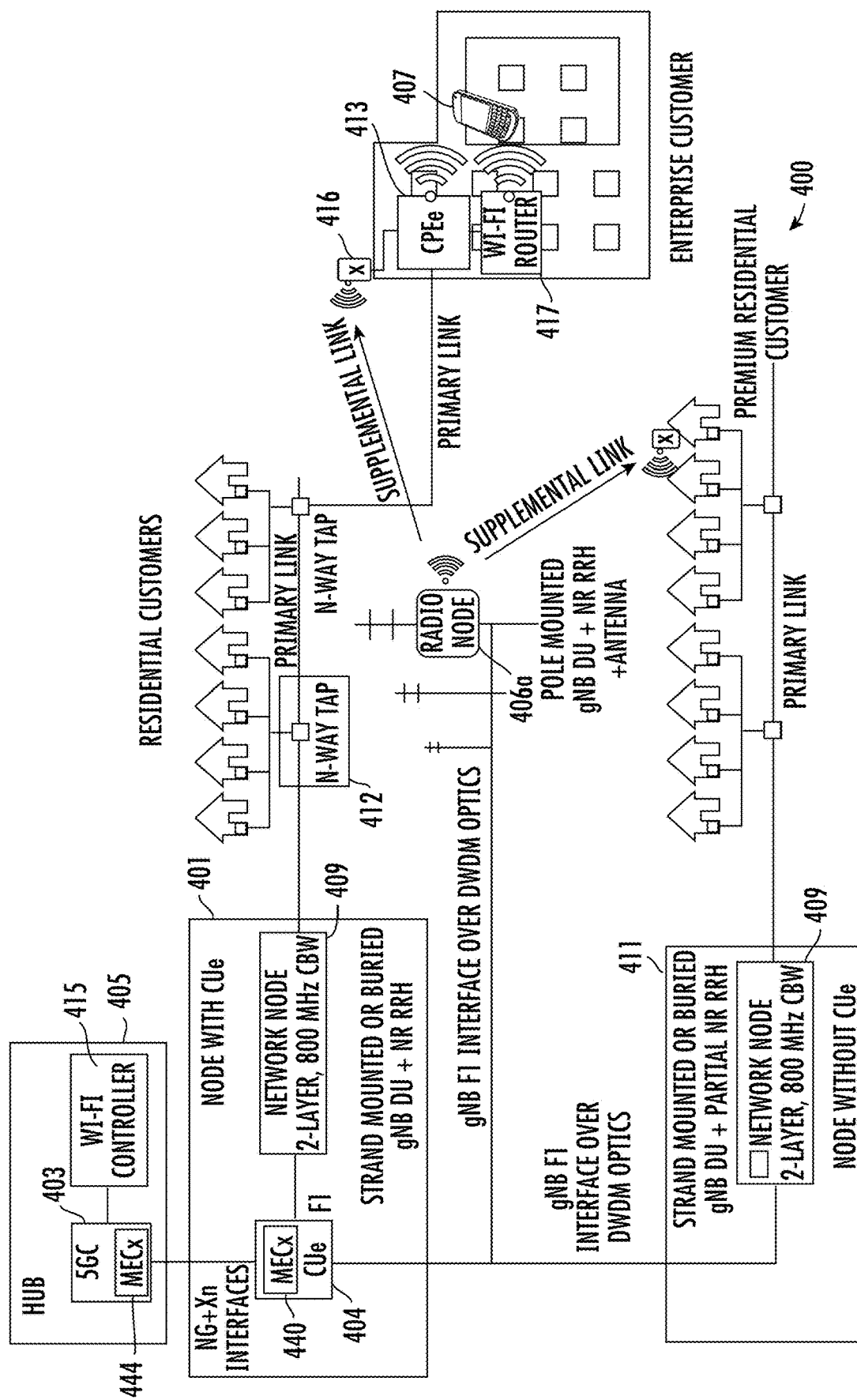
FIG. 4 is a functional block diagram of an exemplary MSO network architecture comprising various features described herein.

Referring now to FIG. 4, one embodiment of an enhanced service provider network architecture 400 is shown and described in detail.

As illustrated, the architecture 400 includes one or more hubs 405 within the MSO network (e.g., whether near edge portions of the network, or further towards the core), including a 5G NR core (5GC) 403. The hub 405 includes a WLAN controller process 415, and services one or more "enhanced" nodes 401, which each include a gNB CUe 404 and a network radio node 409, described in greater detail below. The nodes 401 utilize HFC infrastructure, including N-way taps 412 to deliver RF waveforms to the various served premises (including the enhanced CPE or CPEe) 413 and ultimately the user device(s) 407 (e.g., 3GPP-enabled UEs).

Also serviced by the node 401 are one or more non-CUe enabled nodes 411 including 4G/4.5G/5G enabled network radio nodes 409, which service additional premises as shown.

In the illustrated embodiment, the nodes 401, 411 are backhauled by optical fiber, although this is merely illustrative, as other types of backhauls including e.g., high-bandwidth wireless may be used consistent with the present disclosure.

Similarly, one or more pole-mounted radio nodes 406a (and potentially other mobile client devices enabled for DU-type functionalities; e.g., authorized to receive data from another node or client device, and broadcast/receive signals according to the user domain frequency band) are backhauled to the MSO network via optical fiber (or other medium); these nodes 406 provide, inter alia, supplemental capacity/coverage for both indoor and outdoor (and mobility) scenarios as described in greater detail below.

In one exemplary embodiment, radio nodes 406a are located on an "edge" of a network (i.e., functioning as a network node proximate to the premises and away from the core), and are enabled for 4G and/or 5G communications as described in greater detail below. A given DU that provides 5G coverage to the premises thereby supplements the ultra-low latency and high-bandwidth services by the CUe 404. Moreover, as described further below, the CUe may be logically and functionally grouped with one or more DUes 406 to together make up a gNB. Prescribed unlicensed and/or licensed frequency bands are utilized by the nodes 406a. For example, in one implementation, the disclosed solution supports one or more prescribed subsets of NR and NR-U band combinations as defined by 3GPP, depending on the particular application(s) anticipated by the installation and the locale in which it is installed (including for example whether other operators or carriers such as MNOs are utilizing licensed spectrum within the prescribed area, and which frequency bands such operators are using). It will also be appreciated that so-called "quasi-licensed" spectrum (such as for instance that within the 3.55-3.70 GHz CBRS bands in the U.S.) may be utilized consistent with the methods and apparatus described herein.

In various implementations, one or more of the aforementioned network nodes 401, 403, 406a and/or 411 include a mobile edge computing (MEC) platform 440, 444, described below in greater detail with respect to FIGS. 5-5f. As used herein, "mobile edge computing," "MECx," "MECx module," or "MECx platform" refers to a service process or environment provided via a network entity or group of entities that enables and/or extends computing or operational capabilities of a computing device (e.g., mobile device, desktop device, 3GPP-enabled UE) at the edge of a network. MEC implementations are useful for distributed computing or networking environments, and may enable, e.g., storage, caching, and processing of data in close proximity to users or subscribers of wireless (e.g., cellular) service for reduced response times and reduced computational or bandwidth loads on the network. In specific embodiments of the present disclosure, one or more MECx modules or platforms reside at the edge of the network infrastructure. The MECx module (s) may generally be implemented within any network entity between a given client device (e.g., UE 407) and the core network, or between the client device and a third-party provider of OTT voice services.

In exemplary variants described below with respect to FIGS. 5-5g, one or more MECx modules reside at a DU-type entity (e.g., aforementioned node 406a or 411 which may be a pole-mounted node, buried near premises, etc.), at a CU-type entity (e.g., aforementioned CUe 404), and/or at a core network (e.g., 5GC 403). In some embodiments, a separate MEC application server may be deployed at a gNB or eNB/eLTE eNB entity.

As noted above, mobile devices which may utilize the architecture and methods described herein may function as intermediary nodes or transient "jumping points." Such devices may be those owned by subscribers of the hub or core providing the managed network services who have opted into (or not opted out) of use of their eligible devices as nodes. In other variants, devices owned by subscribers of a different core (e.g., managed by a different entity) may be included in the network of nodes. As an aside, such networking schemes are often generally referred to as "fog networking," a decentralized computing infrastructure in which data, computations, storage, and applications are distributed in an efficient manner between the data source and the destination (e.g., a "cloud" server, premises equipment, end user device) as opposed to a more highly centralized architecture. As such, these transient intermediary nodes or devices may also include MEC functionality in some configurations.

A Wi-Fi router device 417 is also present in the served premises to provide WLAN coverage, in conjunction with the controller 415 at the hub 405. The centralized Wi-Fi controller 415 is also utilized in the exemplary architecture 400 for tight-interworking and better mobility between the 3GPP and Wi-Fi access technologies where the Wi-Fi router is either integrated with the consumer premises equipment (e.g., enhanced CPE or CPEe) or connected to it. In various embodiments, one or more intermediary nodes (e.g., radio node 406a) located between the CUe 404 and the served premises are utilized to provide additional coverage and bandwidth to the premises. Then, mobility between the 3GPP and Wi-Fi channels for any user can be triggered for the best data throughput, such as based on (i) estimation of the RF quality of the Wi-Fi channel toward the user, and/or (ii) the degree of congestion of the Wi-Fi router, and not just the Wi-Fi received signal strength indicators (RSSI) measured at the mobile device, the latter which may not be representative of the service quality that can be obtained by the user.

In the exemplary configuration, the controller (e.g., Wi-Fi Controller 415) is configured to choose the best (optimal) wireless connection available to it based on performance (as opposed to coverage/coverage area alone). Typically today, a preferred method of access is predetermined based on its received signal strength and/or as a preferred means (e.g. Wi-Fi could be defined as the preferred method of access to offload the mobile wireless network). However, this method suffers from the drawback of blind 'stickiness' to a technology, without considering the end user experience. Given that in exemplary embodiments of the architecture described herein, both Wi-Fi and licensed/unlicensed 3GPP access technologies are both controlled by the network operator (e.g. MSO), there is no need to prefer an access method, such as to purely to offload a user's traffic. The decision to offload or steer a user to a given access technology, can be based upon other criteria, such as e.g., a select set of Key Performance Indicators (KPIs) such as the user perceived latency, throughput, packet loss, jitter and bit/packet/frame error rates as measured in real-time at any given layer (e.g., L1, L2 or L3) by the network. For instance, in one implementation, once a target KPI threshold is triggered, the switching of the user can be triggered by either the AMF function (for 3GPP) or Wi-Fi Controller. This switching may then trigger a session establishment at the alternate access medium to transfer the user to that technology. This helps optimize QoE for connected users, since the controller will always be attempting to holistically optimize the connection versus merely making decisions based on coverage or signal strength alone.

This architecture also obviates the problematic transition between premises Wi-Fi and cellular, thereby enabling content consumption (here, voice/video call continuity) while the user is mobile, with no reduction in QoE or interruptions due to e.g., new session establishment in the cellular network. This is accomplished by, inter alia, communication between the Wi-Fi controller 415 and the CUe 404, such that the CUe can remain cognizant of both Wi-Fi and 3GPP channel status, performance and availability. Advantageously, in exemplary embodiments, the foregoing enhanced mobility is provided without the need for any module or customized application software or protocols of the user device (e.g., mobile UE), since all communication sessions (whether between the CPEe and the UE, or the supplemental radio access node and the UE) are both (i) controlled by a common system, and (ii) utilize extant 3GPP (e.g., 4G/4.5G/5G) protocols and architectural elements. In one variant a GPRS Tunneling Protocol (GTP) is utilized for maintenance of session continuity between the heterogeneous RAN technologies (e.g., 3GPP and IEEE Std. 802.11). In another variant, a PMIP (Proxy Mobile IP) based approach is utilized for session maintenance/handover. In yet a further variant, techniques described in 3GPP TS 23.234 v13.1.0, "3GPP system to Wireless Local Area Network (WLAN) interworking; System description (Release 13)," incorporated herein by reference in its entirety, (aka "I-WLAN") based approach is utilized for these purposes. As will be appreciated by those of ordinary skill given the present disclosure, combinations of the foregoing mechanisms may be utilized as well, depending on the particular application (including the two heterogeneous technologies that are party to the session maintenance/handoff).

The MSO network architecture 400 of FIG. 4 is particularly useful for the delivery of packetized content (e.g., encoded digital content carried within a packet or frame structure or protocol, including audio and/or video call packets) consistent with the various aspects of the present disclosure.

The architecture 400 of FIG. 4 further provides a consistent and seamless user experience with IP-based delivery over both wireline and wireless interfaces. Additionally, in the IP paradigm, dynamic switching between unicast delivery and multicast/broadcast is used based on e.g., local demand. For instance, where a single user (device) is requesting content, an IP unicast can be utilized. For multiple devices (i.e., with multiple different IP addresses, such as e.g., different premises), multicast can be utilized. This approach provides for efficient and responsive switching of delivery and obviates other more equipment/CAPEX-intensive approaches.

Moreover, the architecture can be used for both broadband data delivery as well as "content" (e.g., movie channels) simultaneously, and obviates much of the prior separate infrastructure for "in band" and DOCSIS (and OOB) transport. Specifically, with DOCSIS (even FDX DOCSIS), bandwidth is often allocated for video QAMs, and a "split" is hard-coded for downstream and upstream data traffic. This hard split is typically implemented across all network elements—even amplifiers. In contrast, under the exemplary configuration of the architecture disclosed herein, effectively all traffic traversing the architecture is IP-based, and hence in many cases there is no need to allocate QAMs and frequency splits for different program or data streams. This "all-IP" approach enables flexible use of the available bandwidth on the transmission medium for all applications dynamically, based on for instance the demand of each such application at any given period or point in time.

In certain embodiments, the service provider network 400 also advantageously permits the aggregation and/or analysis of subscriber- or account-specific data (including inter alia, correlation of particular CUe or DUe or E-UTRAN eNB/femtocell devices associated with such subscriber or accounts) as part of the provision of services to users under the exemplary delivery models described herein. As but one example, device-specific IDs (e.g., gNB ID, Global gNB Identifier, NCGI, MAC address or the like) can be cross-correlated to MSO subscriber data maintained at e.g., the network head end(s) 407 so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising or 5G "slicing" configuration or delivery; and (iii) determination of subscription level, and hence subscriber privileges and access to certain services as applicable.

Moreover, device profiles for particular devices (e.g., 3GPP 5g NR and WLAN-enabled UE, or the CPEe 413 and any associated antenna 416, etc.) can be maintained by the MSO, such that the MSO (or its automated proxy processes) can model the device for wireless or other capabilities. For instance, one (non-supplemented) CPEe 413 may be modeled as having bandwidth capability of X Gbps, while another premises' supplemented CPEe may be modeled as having bandwidth capability of X+Y Gbps, and hence the latter may be eligible for services or "slices" that are not available to the former.

As a brief aside, the 5G technology defines a number of network functions (NFs), which include the following:

1. Access and Mobility Management function (AMF)—Provides for termination of NAS signaling, NAS integrity protection and ciphering, registration and connection and mobility management, access authentication and authorization, and security context management. The AMF has functions analogous to part of the MME functionality of the prior Evolved Packet Core (EPC).

2. Application Function (AF)—Manages application influence on traffic routing, accessing NEF, interaction with policy framework for policy control. The NR AF is comparable to the AF in EPC.

3. Authentication Server Function (AUSF)—Provides authentication server functionality. The AUSF is similar to portions of the HSS from EPC.

4. Network Exposure function (NEF)—Manages exposure of capabilities and events, secure provision of information from external applications to 3GPP network, translation of internal/external information. The NEF is a wholly new entity as compared to EPC.

5. Network Slice Selection Function (NSSF)—Provides for selection of the Network Slice instances to serve the UE, determining the allowed NSSAI, determining the AMF set to be used to serve the UE. The NSSF is a wholly new entity as compared to EPC.

6. NF Repository function (NRF)—Supports the service discovery function, maintains NF profile and available NF instances The NRF is a wholly new entity as compared to EPC.

7. Policy Control Function (PCF)— Provides a unified policy framework, providing policy rules to CP functions, and access subscription information for policy decisions in UDR. The PCF has part of the PCRF functionality from EPC.

8. Session Management function (SMF)—Provides for session management (session establishment, modification, release), IP address allocation & management for UEs, DHCP functions, termination of NAS signaling related to session management, DL data notification, traffic steering configuration for UPF for proper traffic routing. The SMF includes portions of the MME and PGW functionality from EPC.

9. Unified Data Management (UDM)—Supports generation of Authentication and Key Agreement (AKA) credentials, user identification handling, access authorization, subscription management. This comprises a portion of HSS functionality from EPC.

10. User plane function (UPF)—The UPF provides packet routing & forwarding, packet inspection, QoS handling, and also acts as an external PDU session point of interconnect to Data Network (DN). The UPF may also act as an anchor point for intra-RAT and inter-RAT mobility. The UPF includes some of the prior SGW and PGW functionality from EPC.

Within the 5G NR architecture, the control plane (CP) and user plane (UP) functionality is divided within the core network or NGC (Next Generation Core). For instance, the 5G UPF discussed above supports UP data processing, while other nodes support CP functions. This divided approach advantageously allows for, inter alia, independent scaling of CP and UP functions. Additionally, network slices can be tailored to support different services, such as for instance those described herein with respect to session handover between e.g., WLAN and 3GPP NR, and supplemental links to the CPEe.

In addition to the NFs described above, a number of different identifiers are used in the NG-RAN architecture, including those of UE's and for other network entities, and may be assigned to various entities described herein. Specifically:

- the AMF Identifier (AMF ID) is used to identify an AMF (Access and Mobility Management Function);
- the NR Cell Global Identifier (NCGI), is used to identify NR cells globally, and is constructed from the PLMN identity to which the cell belongs, and the NR Cell Identity (NCI) of the cell;
- the gNB Identifier (gNB ID) is used to identify gNBs within a PLMN, and is contained within the NCI of its cells;
- the Global gNB ID, which is used to identify gNBs globally, and is constructed from the PLMN identity to which the gNB belongs, and the gNB ID;
- the Tracking Area identity (TAI), which is used to identify tracking areas, and is constructed from the PLMN identity to which the tracking area belongs, and the TAC (Tracking Area Code) of the Tracking Area; and
- the Single Network Slice Selection Assistance information (S-NSSAI), which is used to identify a network slice.

Hence, depending on what data is useful to the MSO or its customers, various portions of the foregoing can be associated and stored to particular gNB "clients" or their components being backhauled by the MSO network, including for use facilitating designated OTT or other sessions requiring QoE/QoS bearers as described elsewhere herein.

Distributed gNB Architectures

In the context of FIG. 4, the DUe's described herein may assume any number of forms and functions relative to the enhanced CPE (CPEe) 413 and the radio node 406a (e.g., pole mounted external device). Recognizing that generally speaking, "DU" and "CU" refer to 3GPP standardized features and functions, these features and functions can, so long as supported in the architecture 400 of FIG. 4, be implemented in any myriad number of ways and/or locations. Moreover, enhancements and/or extensions to these components (herein referred to as CUe and DUe) and their functions provided by the present disclosure may likewise be distributed at various nodes and locations throughout the architecture 400, the illustrated locations and dispositions being merely exemplary.

Notably, the "enhanced" NR-based gNB architecture utilizes existing infrastructure (e.g., at least a portion of the extant HFC cabling controlled by an MSO such as the Assignee hereof) while expanding the frequency spectrum used for signal propagation within the infrastructure (e.g., 1.6 GHz in total bandwidth). Moreover, access points or nodes installed at venues or premises, especially "edge"-based nodes (at least some of which may be controlled, licensed, installed, or leased by the MSO), may be leveraged to deliver 5G-based services to a subscriber of the 5G NR Core (e.g., 403). Fog-based networking made possible through this leveraged infrastructure allows the subscriber to access receive and maintain 5G service whether indoor or outdoor, and in fact, even while the subscriber is changing locations, e.g., moving indoor to outdoor, outdoor to indoor, between servicing nodes indoors (e.g., within a large house, office or housing complex, or venue), and between servicing nodes outdoors. Other nodes may be leveraged, including other 5G-enabled mobile devices that have opted into (or not opted out of) participating in the fog network. In effect, the ubiquity of mobile devices creates a peer-to-peer network for distribution and delivery of ultra-low-latency (e.g., 1 ms ping) and ultra-high-speed (e.g., 10 Gbps or higher) connectivity. In many cases, utilizing one or more participating peer devices results in faster service (e.g., greatly reduced ping) by obviating the need to reach a cell tower, a server, or a gateway that is resident in the backend portion of a cloud-type network.

Notably, the principles described further below enable a subscriber to maintain the 5G service (or any other 3GPP- or IEEE 802.11-based connectivity) without the signals dropping or disconnecting between sessions. In other words, "seamless" transfer of connectivity between nodes (akin to handovers) is made possible despite a difference in at least a portion of wireless data communications standards that may be utilized by the nodes, including for voice/video calls where QoE is important. For instance, a CPEe and a DUe disposed near the "edge" of the network (i.e., near consumer premises) may each be capable of communicating data with, e.g., a mobile user device, via either or both 3GPP- and IEEE 802.11-based protocols. A subscriber, however, would not require a reconnection process with a different base station or modem (as opposed to, e.g., establishing connection to cellular data services when outside the range of a Wi-Fi AP, or connecting back to the Wi-Fi AP when entering the premises), invoking a "seamless" feel and further increasing the user's QoE.

By virtue of the way the frequency spectra used in existing infrastructure is accessed, such enhanced gNB architecture provides salient advantages to a subscriber thereof, such as improved connectivity speeds (e.g., data rates, response times, latency) and seamless mobility of user devices as noted above and described further below, thus significantly improving user experience relative to currently available services. Further, the operator of such an architecture may advantageously save costs of connecting new cables and pipes across long distances by obviating the need to overhaul the infrastructure itself.

Figure 5:
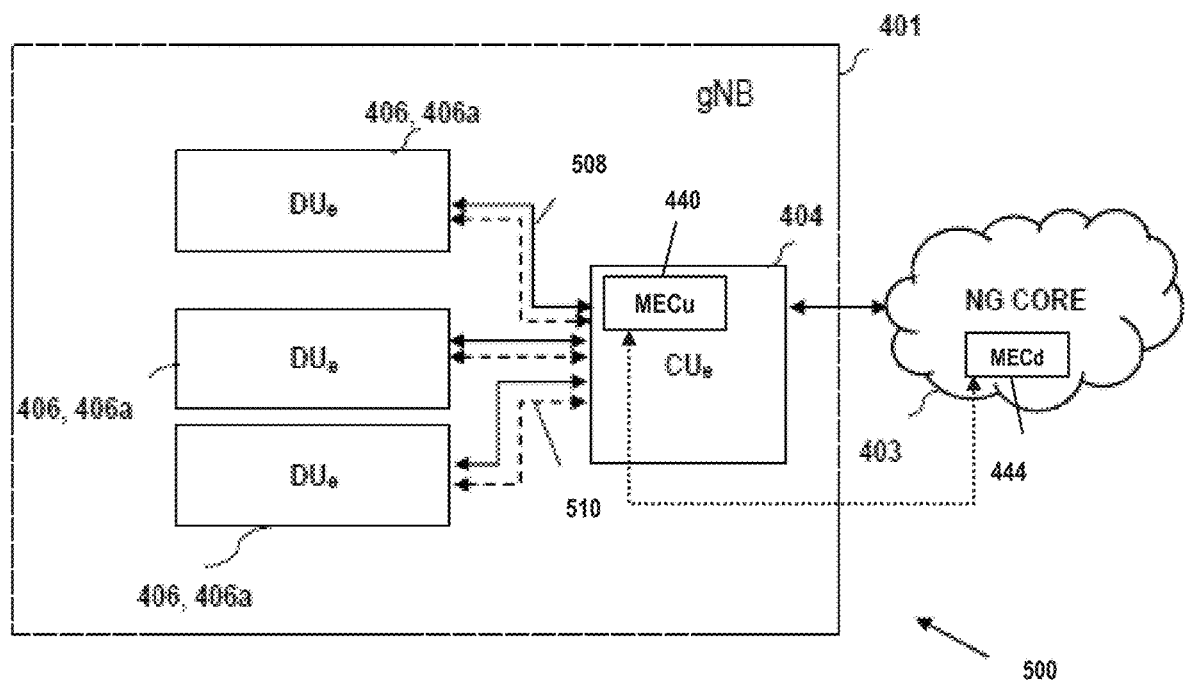
FIG. 5 is a functional block diagram of one exemplary embodiment of a gNB architecture including CUe and multiple DUes in standalone (SA) configuration, according to the present disclosure.
Figure 5A:
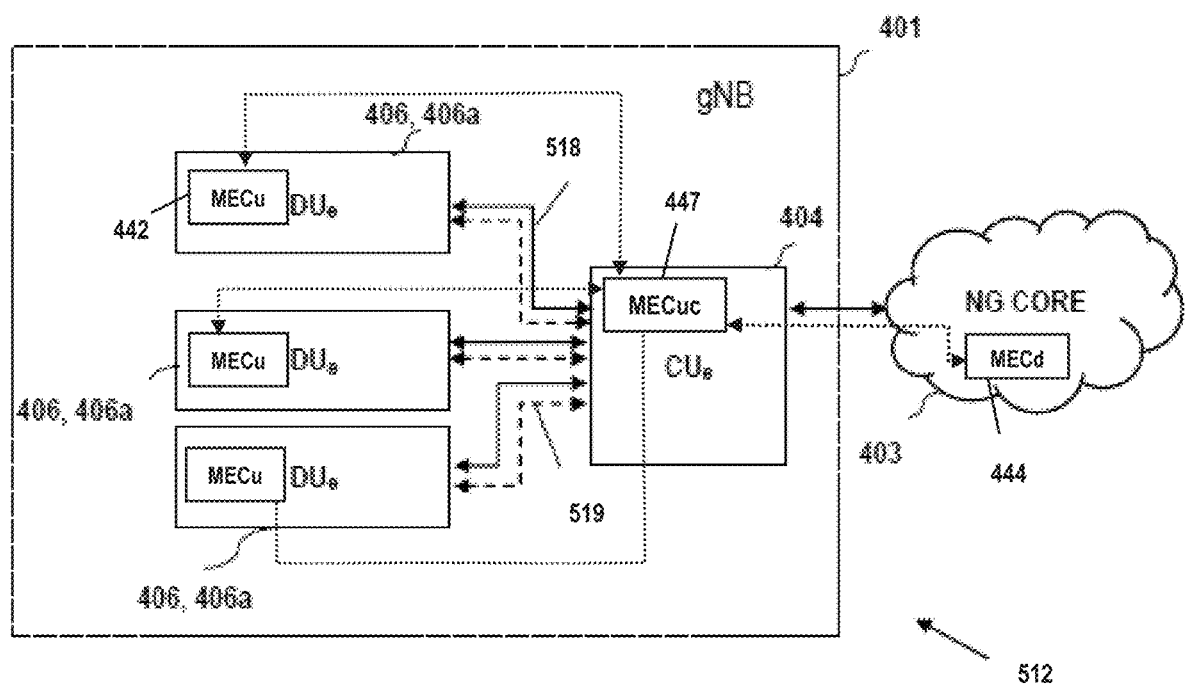
FIG. 5a is a functional block diagram of another exemplary embodiment of a gNB architecture including CUe and multiple DUes in standalone (SA) configuration and "controller" MEC (MECuc), according to the present disclosure.
Figure 5B:
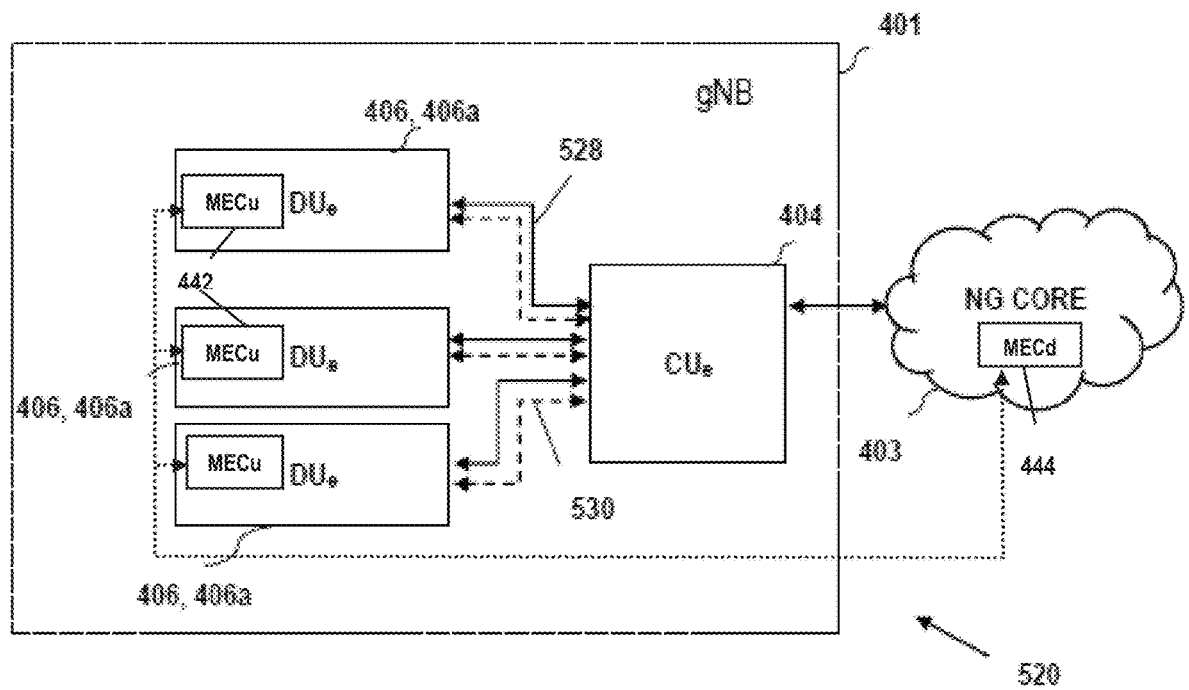
FIG. 5b is a functional block diagram of yet another exemplary embodiment of a gNB architecture including CUe and multiple DUes in standalone (SA) configuration, according to the present disclosure.
Figure 5C:
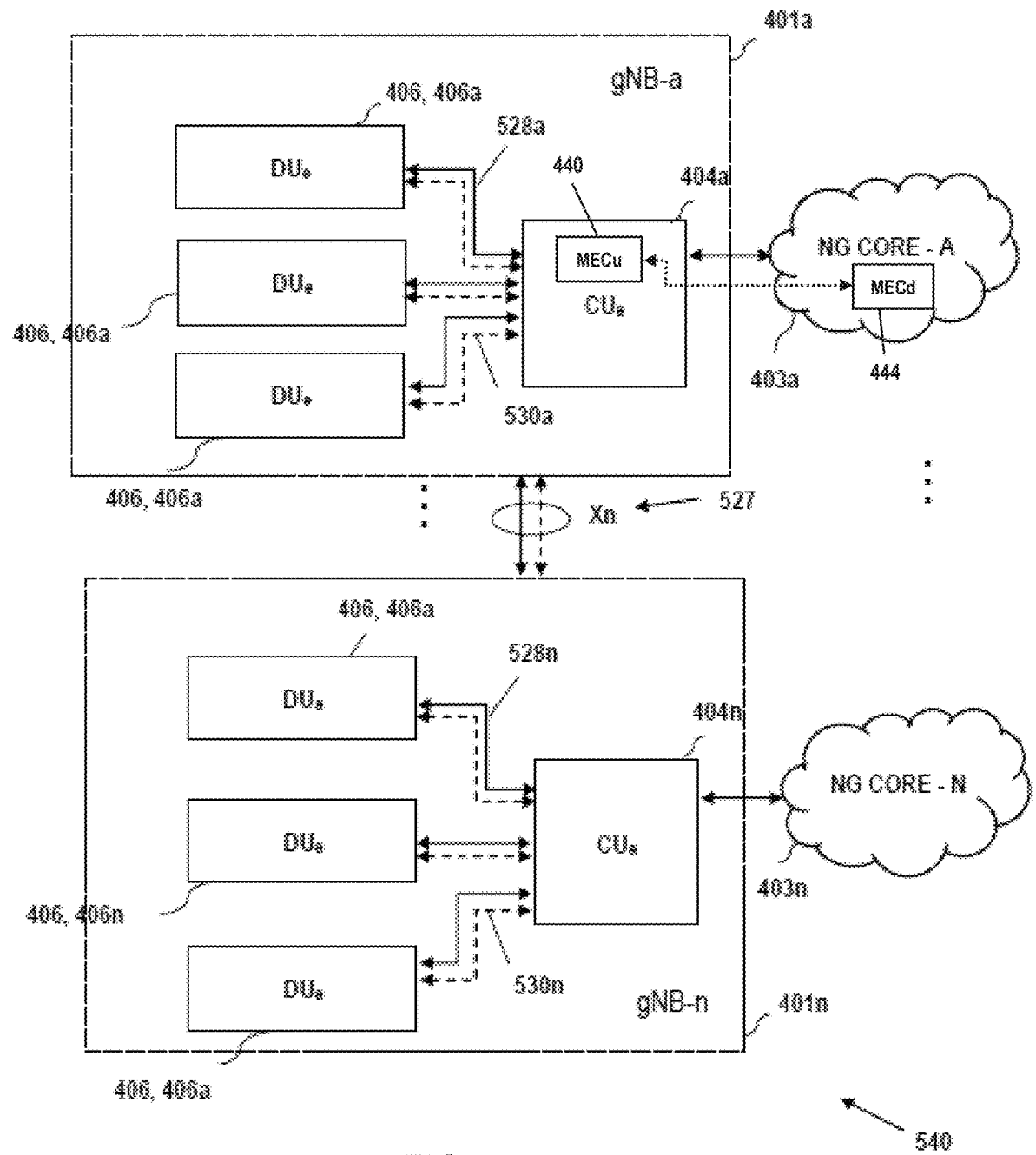
FIG. 5c is a functional block diagram of another exemplary embodiment of a gNB architecture including multiple CUes and multiple corresponding DUes (SA), according to the present disclosure.
Figure 5D:
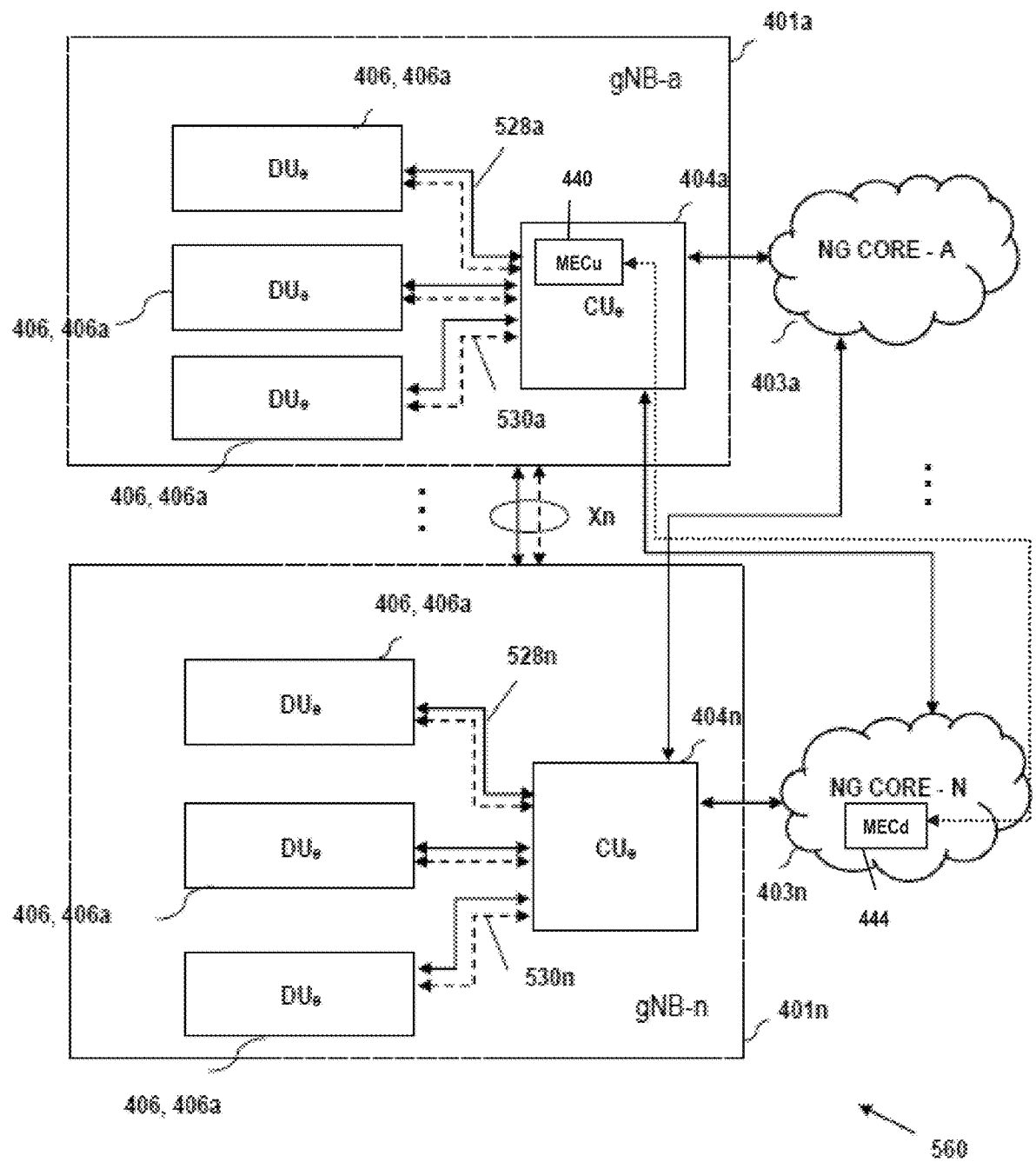
FIG. 5d is a functional block diagram of yet another exemplary embodiment of a gNB architecture including multiple CUes logically cross-connected to multiple different cores (SA), according to the present disclosure.
Figure 5E:
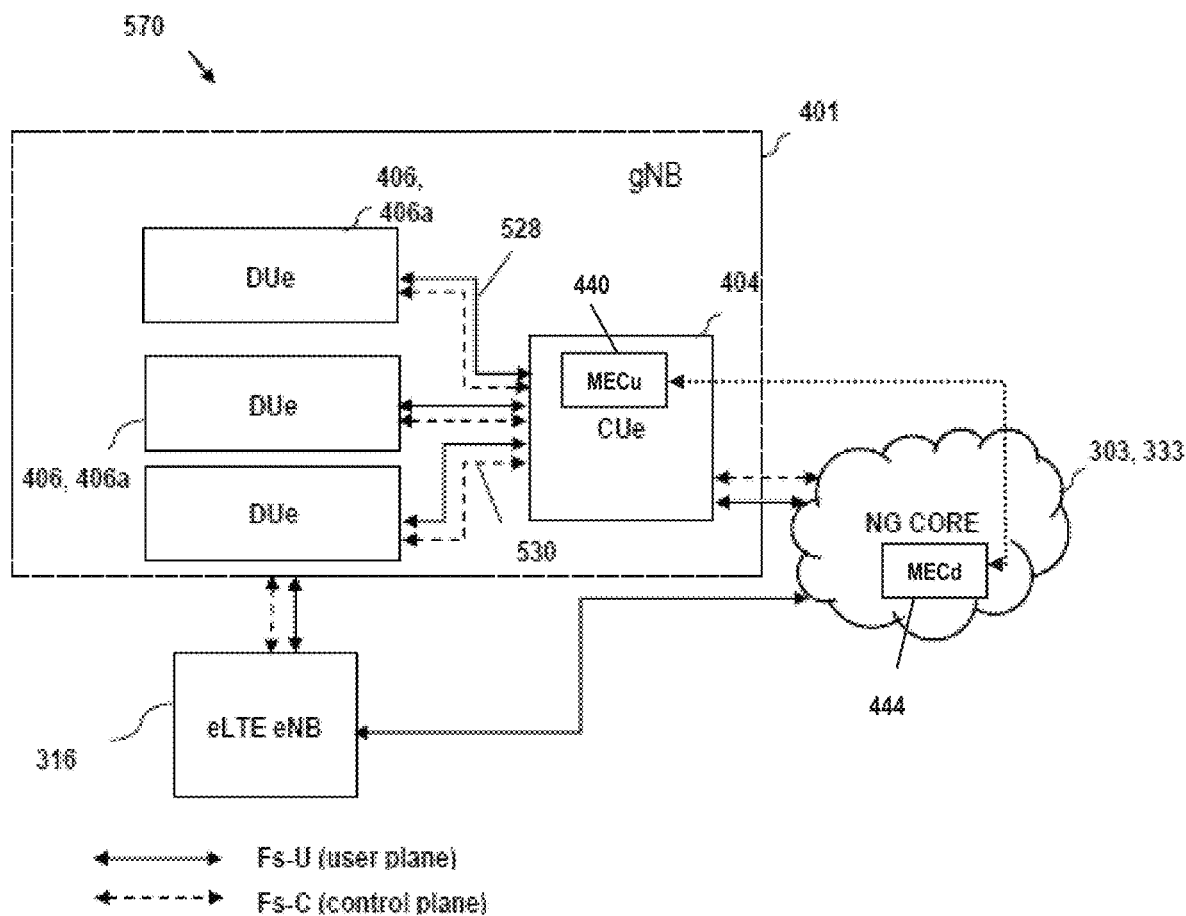
FIG. 5e is a functional block diagram of an NSA gNB and eLTE eNB architecture including a 5G NR Core (NGC) according to the present disclosure.
Figure 5F:
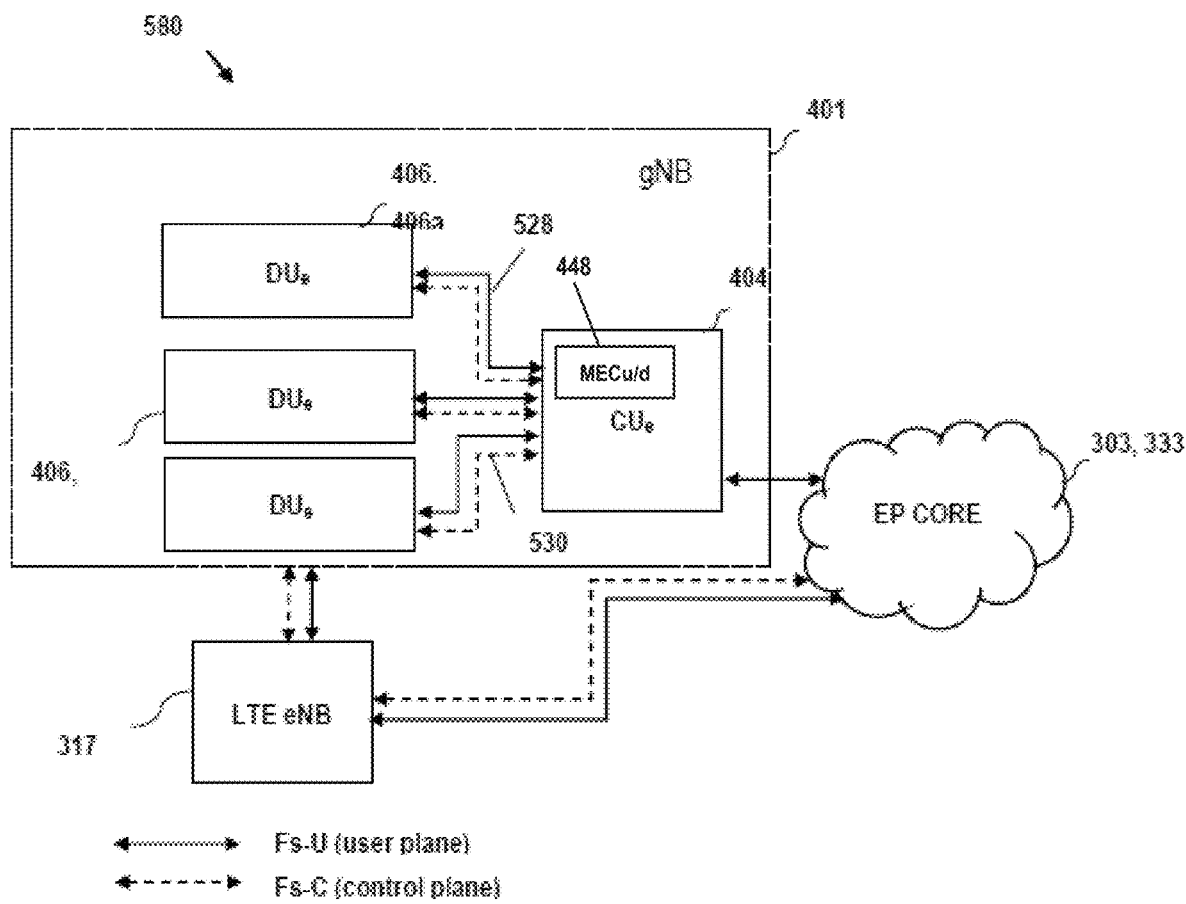
FIG. 5f is a functional block diagram of an NSA gNB and LTE eNB architecture including an Evolved Packet Core (EPC) according to the present disclosure.
Figure 5G:
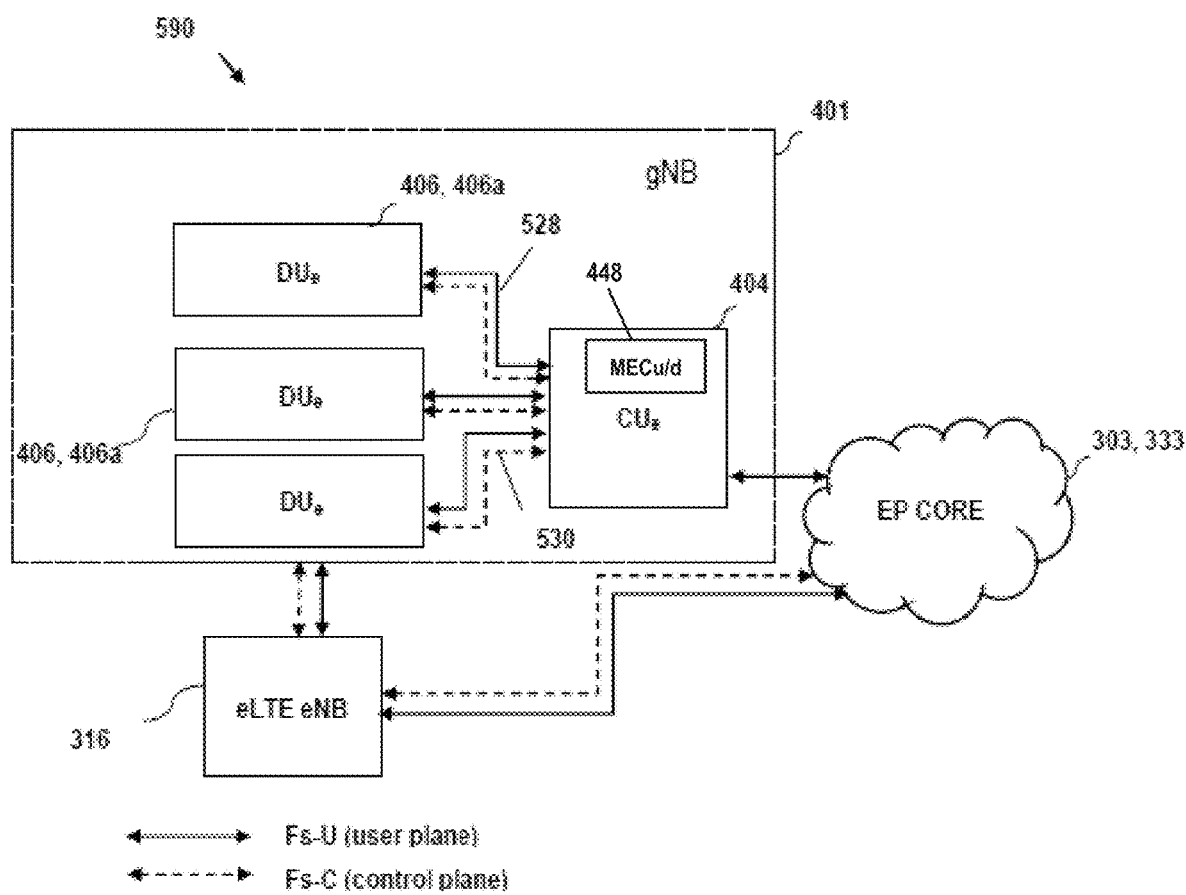
FIG. 5g is a functional block diagram of an NSA gNB and eLTE eNB architecture including an Evolved Packet Core (EPC) according to the present disclosure.

Accordingly, referring now to FIGS. 5-5g, various embodiments of the distributed (CUe/DUe) gNB architecture according to the present disclosure are described.

As shown in FIG. 5, a first or architecture 500 utilizes two MEC modules; i.e., an upstream module (MECu) 440 within the CUe 404, and a downstream module (MECd) 444 within the 5GC 403. As noted elsewhere wherein, this approach is used to enable, inter alia, upstream voice or other session of interest detection at or near the edge of the network, and downstream voice or other session detection at the core (which may be the first ingress point to the managed network from an external VoIP or similar server from which data destined for users of the MSO managed network is transmitted.

As shown, the CUe is in data communication with each DUe, and as such all upstream detection for the DUe's is performed by the centralized MECu.

The individual DUe's 406, 406a in FIG. 5 communicate data and messaging with the CUe 404 via interposed physical communication interfaces 508 and logical interfaces 510. As previously described, such interfaces may include a user plane and control plane, and be embodied in prescribed protocols such as FlAP. Operation of each DUe and CUe are described in greater detail subsequently herein; however, it will be noted that in this embodiment, one CUe 404 is associated with one or more DUe's 406, 406a, yet a given DUe is only associated with a single CUe. Likewise, the single CUe 404 is communicative with a single NG Core 403, such as that operated by an MSO. Each NG Core may have multiple gNBs 401 associated therewith (e.g., of the type shown in FIG. 4).

The MECu module 440 is configured to detect the type of traffic that is exchanged via the CUe. In particular, the MECu module 440 may monitor upstream data packets that originate from a client device, whether CPEe 413 or mobile user device or other. The upstream data may include audio and voice data, video data, requests for data, and command data, among other things, which are directed toward a third-party network entity, such as an OTT voice service provider or server(s).

One or more detection criteria may be used to detect traffic having "eligible" (e.g., OTT voice/video) data. In one example criterion scenario, the detection criteria may be based on the transport protocol being used to transmit or receive data packets. One such protocol may be RTP/RTCP (Real Time Protocol/Real Time Control protocol) or Session Initiation Protocol (SIP), each of which may be used in conjunction with audio/video media streams. Bidirectional-streams over Synchronous HTTP (BOSH), which emulates a bidirectional stream (typically via one or more HTTP connections) between two entities such as a client device and a server that is set up for, e.g., OTT voice services. A similar and related transport protocol is Web Socket, which enables two-way communication between a client running untrusted code in a controlled environment (such as, e.g., 3GPP-enabled client device 407 or DUe 406a/411) to a remote host that has opted-in to communications from that code. Another transport protocol that may be detected by the MEC module is Extensible Messaging and Presence Protocol (XMPP), which may be utilized for communication between two or more network entities. More specifically, it is a communication protocol for message-oriented middleware based on XML (Extensible Markup Language).

In some variants, messages are sent via TCP ports. Both types of protocols may be useful for or used with VoIP signaling, video, file transfer, gaming, Internet of Things (IoT) communications, or other machine-to-machine applications, e.g., MQTT (Message Queuing Telemetry Transport).

According to different variants, the MECu module 440 may determine the transport protocol at predetermined intervals, or on a packet-by-packet basis.

Another detection criterion which may be utilized consistent with the present disclosure is based on a specific destination IP address. Typically, for OTT voice services, a specific IP address or a range of IP addresses (i.e., more than one server) can be used. Notably, all OTT voice applications (such as the aforementioned clients, e.g., Skype, FaceTime, and others) use specific server(s) for their services, and hence the range of their IP addresses used in mediating the call is known a priori. Hence, the MECu module 440 may read the destination IP address contained in, e.g., a header of packets to determine that the traffic should be categorized as OTT voice traffic.

In some variants, the MECu module may read the destination IP address of each packet or a group of packets, or at a predetermined interval. In some instances, decryption of encrypted data may be utilized to examine various portions of data of the packets being evaluated.

Another detection criterion which may be combined with one or more other criteria is size of packets. In some embodiments, the maximum transmission unit (MTU) or maximum segment size (MSS) associated with a data channel or port may be determined. MTU is the largest packet size, measured in bytes, that a network may transmit, and it may be configured per port. For example, a default MTU of 576 bytes typically associated with VoIP traffic determined from a data transmission from a client device may be indicative of OTT voice traffic. Data received through a CUe port that has a MTU of 576 bytes may also be indicative of OTT voice traffic. In some variants, the MTU is corroborated with other indicators, as the MTU may vary from the default (e.g., 1500 bytes).

Other detection criteria may include format of packets (e.g., length and/or content of IP packet), method of encryption applied to the data, and/or usage of a virtual private network (VPN) tunnel. VoIP VPN combines VoIP and VPN to enable delivery of secure voice, i.e., encryption of voice communication. These criteria may be corroborated with other criteria as discussed above.

As will be described further herein with respect to FIGS. 7b and 7c, when OTT voice traffic is detected and flagged, it may cause in some exemplary embodiments a creation or attachment of a dedicated bearer for the transmission of OTT voice traffic over one (or an aggregation of multiple) wideband or portions thereof, of an expanded frequency spectrum associated with, e.g., a static or dynamic 5G NR frequency band allocation.

Likewise, the logic of the MECd 444 can utilize similar (or different) detection logic for downstream traffic detection, depending on configuration. For instance, it may be more efficient to use one detection scheme at the 5GC for DS traffic, and another one at the gNB for US traffic, such as where e.g., IP addresses associated with a limited number of VoIP or other such servers are known to the MECu (and hence messaging directed at these few addresses can be readily identified as voice), whereas the user nodes or endpoints of the video/audio call(s) may be wide ranging in address, and hence another scheme such as protocol detection may be more suited. It will also be appreciated that the MECu and MECd logic can be combined into a single entity disposed at any given point within the architecture 500 if desired, such as at the CUe or within the 5GC Core 403 (not shown).

As shown in FIG. 5a, a second architecture 512 includes a gNB 401 having an enhanced CU (CUe) 404 and a plurality of enhanced DUs (DUe) 406, 406a. As described in greater detail subsequently herein, these enhanced entities are enabled to permit inter-process signaling and high data rate, low latency services, whether autonomously or under control of another logical entity (such as the NG Core 403 with which the gNB communicates, or components thereof), as well as unified mobility and IoT services. An MECuc (MEC upstream controller) module 447 is disposed within the CUe 404 and is configured to logically control the operation of its minion MECu's 442 operative to run on each of the DUe 406.

The individual DUe's 406, 406a in FIG. 5a communicate data and messaging with the CUe 404 via interposed physical communication interfaces 518 and logical interfaces 519 such as for provision of a user plane and control plane, and be embodied in prescribed protocols such as F1AP. Again, one CUe 404 is associated with one or more DUe's 406, 406a, yet a given DUe is only associated with a single CUe. Likewise, the single CUe 404 is communicative with a single NG Core 403, such as that operated by an MSO. Each NG Core may have multiple gNBs 401 associated therewith.

In this architecture 512, the MECu modules which reside at each DUe entity 406 may have similar functionalities as the MECu module 440 described above to monitor upstream voice traffic, in one embodiment; however, the operation of each MECu is controlled at least in part by the MECuc 447.

Specifically, in one variant, the MECuc logically communicates with each MECu (via inter-process communication transmitted over the interposed links 518) to control whether it is operated to detect a certain type of traffic or not, threshold value or criteria (where applicable), and other functions that may vary between each DUe based on e.g., its particular configuration. For instance, heterogeneous detection schemes or MECu configurations may be used on each different DUe (or subsets thereof) depending on user traffic types commonly used or detected on those DUe.

Moreover, the individual MECu for each DUe may communicate with one another via the interprocess communication with the MECuc 447, in effect as peers to one another.

The architecture 512 of FIG. 5a also makes use of an MECd module 444 similar to that described above, which may reside on the network core entity (e.g., NG Core 403) to monitor downstream voice traffic, in one embodiment.

As shown in FIG. 5b, a third architecture 520 includes a gNB 401 having an enhanced CU (CUe) 404 and a plurality of enhanced DUs (DUe) 406, 406a. A plurality of MECu's 442 operative to run on each of the DUe 406, yet with no controller MEC as in the embodiment of FIG. 5a.

In this architecture 520, the MECu modules which reside at each DUe entity 406 may have similar functionalities as the MECu module 440 described above to monitor upstream voice traffic, in one embodiment. The operation of each MECu is independent—and hence each MECu is independently configurable, again dependent on its hardware/software configuration, type of downstream processes or entities, type of traffic it typically carries, and the like. The architecture 520 of FIG. 5b again makes use of an MECd module 444 similar to that described above, which may reside on the network core entity (e.g., NG Core 403) to monitor downstream voice traffic, in one embodiment.

In the architecture 540 of FIG. 5c, two or more gNBs 401a-n are communicative with one another via e.g., an Xn interface 527, and accordingly can conduct at least CUe to CUe data transfer and communication. Separate NG Cores 403a-n are used for control and user plane (and other) functions of the network. As shown, the NG Cores and gNBs 401 may also be heterogeneous in terms of MEC configuration; in the illustrated case, the first Core 403a and first gNB 401a are each configured with respective MECd 444 and MECu 440 as in the architecture 500 of FIG. 5, yet one or more other Cores/gNBs 403n, 401n are not. Hence, the Xn interface 527 facilitates one Core 403a and gNB 527 utilizing its MECd/MECu as a "proxy" for the other gNB 401n. In one scenario, upstream traffic or portions thereof can be routed via the Xn interface for purposes of detection to the gNB with MECu capability, and likewise downstream traffic can be routed via the MECd-equipped core to the first gNB 401a and through the Xn 527 to the second gNB 401n.

In the architecture 560 of FIG. 5d, two or more gNBs 401a-n are communicative with one another via e.g., the Xn interface 527, and accordingly can conduct at least CUe to CUe data transfer and communication. Moreover, the separate NG Cores 403a-n are logically "cross-connected" to the gNBs 401 of one or more other NG Cores, such that one core can utilize/control the infrastructure of another, and vice versa. This may be in "daisy chain" fashion (i.e., one gNB is communicative one other NG Core other than its own, and that NG Core is communicate with yet one additional gNB 401 other than its own, and so forth), or the gNBs and NG Cores may form a "mesh" topology where multiple Cores 403 are in communication with multiple gNBs or multiple different entities (e.g., service providers). As such each MECd-equipped Core can be "cross-connected" to another MECu-equipped (or non-equipped) gNB, and vice versa.

Yet other topologies will be recognized by those of ordinary skill given the present disclosure. This cross-connection approach advantageously allows for, inter alia, sharing of infrastructure between two MSOs, or between MNO and MSO, which is especially useful in e.g., dense deployment environments which may not be able to support multiple sets of RAN infrastructure, such as for different service providers.

FIGS. 5e-5g relate to so-called NSA architectures contemplated during, inter alia, migration or transition between 4G/4.5G and 5G technology. Note that per 3GPP Release 15, some new definitions of entities have been introduced, including: (i) LTE eNB—An eNB device that can connect to the EPC and the extant pre-Release 15 LTE core network; (ii) eLTE eNB—An evolution of the LTE eNB—the eLTE eNB can connect to the EPC and the 5GC; (iii) NG—A data interface between the NGC and the gNB; (iv) NG2—A control plane (CP) interface between core network and the RAN (corresponding to S1-C in LTE); and (v) NG3—A user plane (UP) interface between the core network and the RAN (corresponding to S1-U in LTE).

In a "standalone" or SA scenario (e.g., FIGS. 5-5d above), the 5G NR or the evolved LTE radio cells and the core network are operated alone, and are used for both control plane and user plane. The SA configuration is more simplified than NSA from an operational and management standpoint. Moreover, pure SA networks can operate independently using normal inter-generation handover between 4G and 5G for service continuity. Three variations of SA are defined in 3GPP: (i) Option 1 using EPC and LTE eNB access (i.e. as per current 4G LTE networks); (ii) Option 2 using 5GC and NR gNB access; and (iii) Option 5 using 5GC and LTE ng-eNB access.

Figure 3:
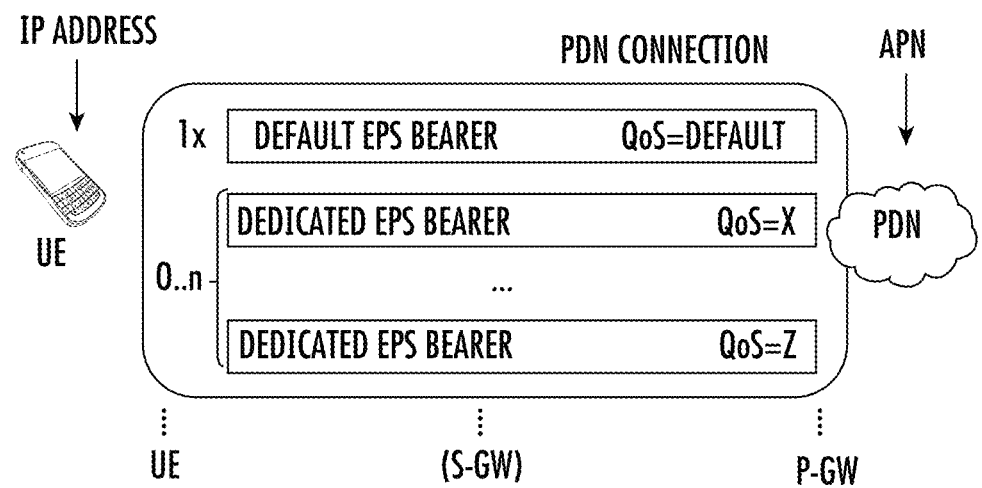
FIG. 3 is a graphical illustration of prior art 3GPP EPS (Evolved Packet System) default and dedicated bearers used between a UE and another packet entity (e.g., PDN) as part of a UE-to-PDN connection.
Figure 3A:
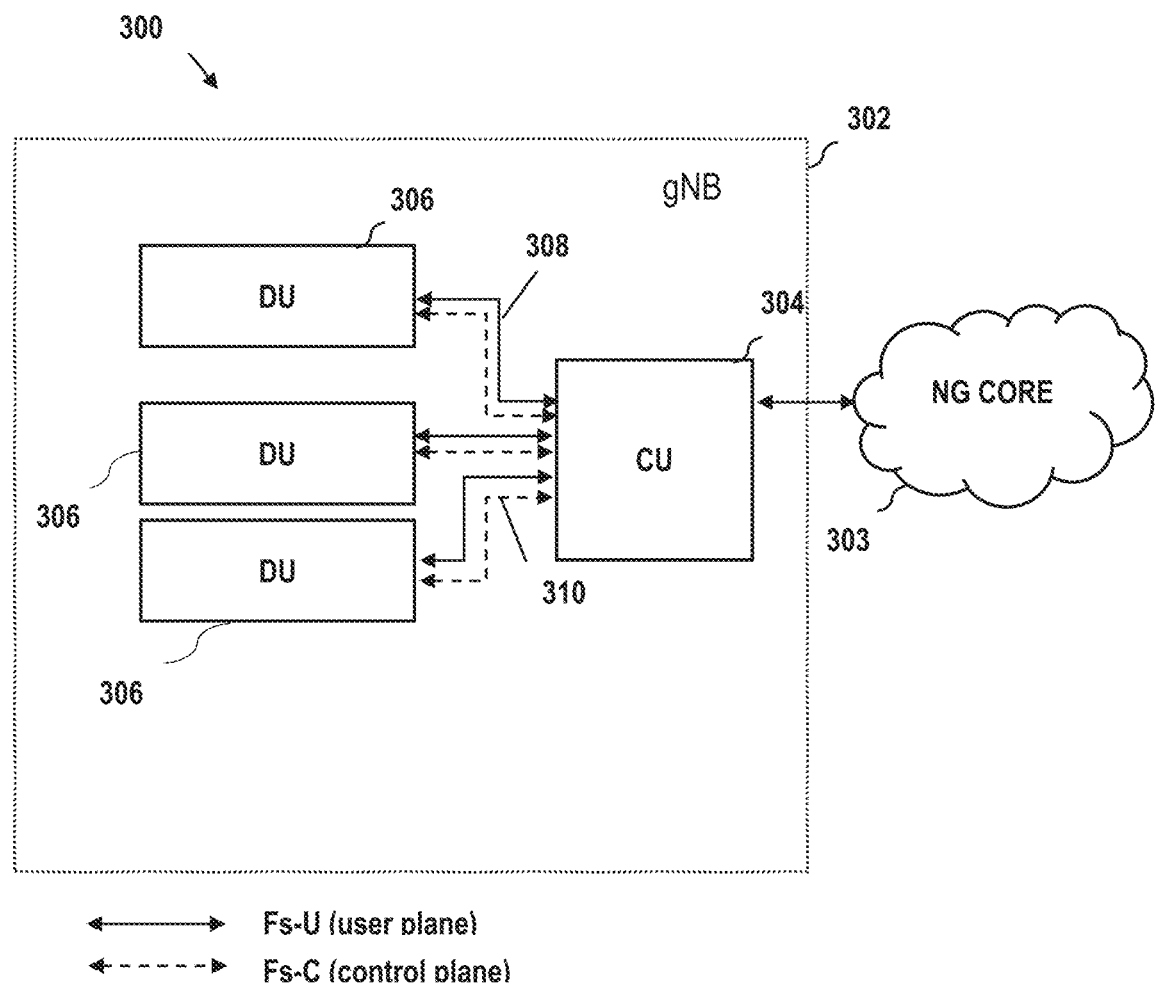
FIG. 3a is a functional block diagram of a prior art gNB architecture including CU and multiple DUs.
Figure 3B:
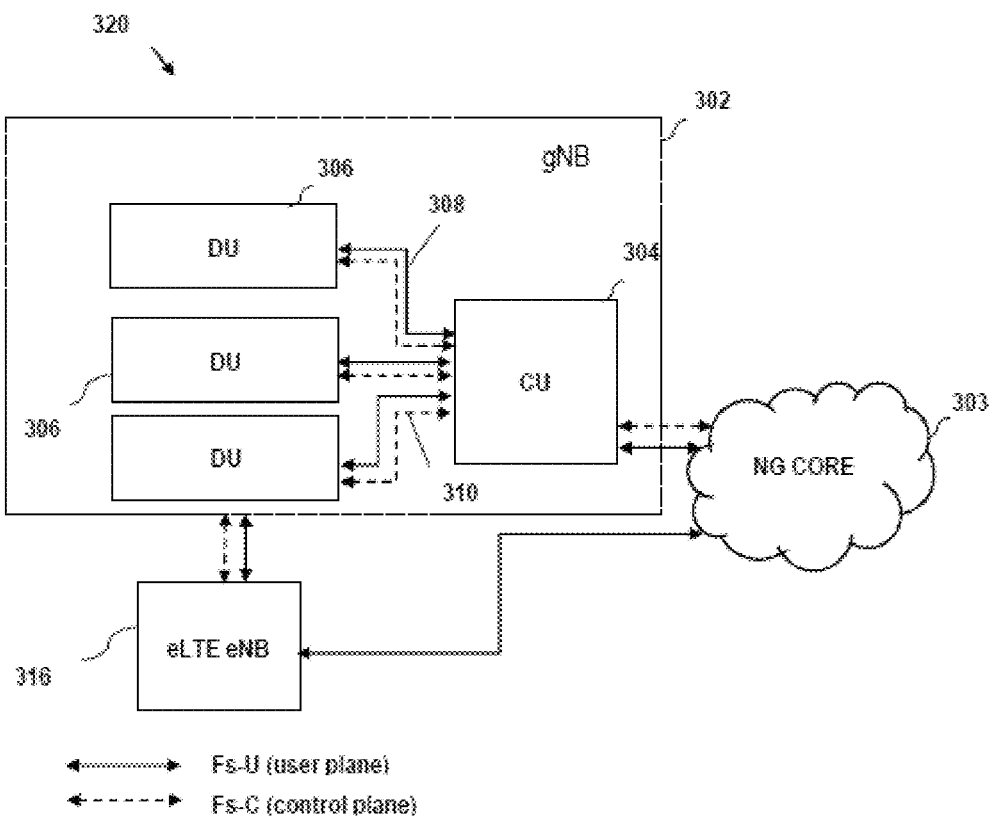
FIG. 3b is a functional block diagram of a prior art NSA gNB and eLTE eNB architecture including a 5G NR Core (NGC).
Figure 3C:
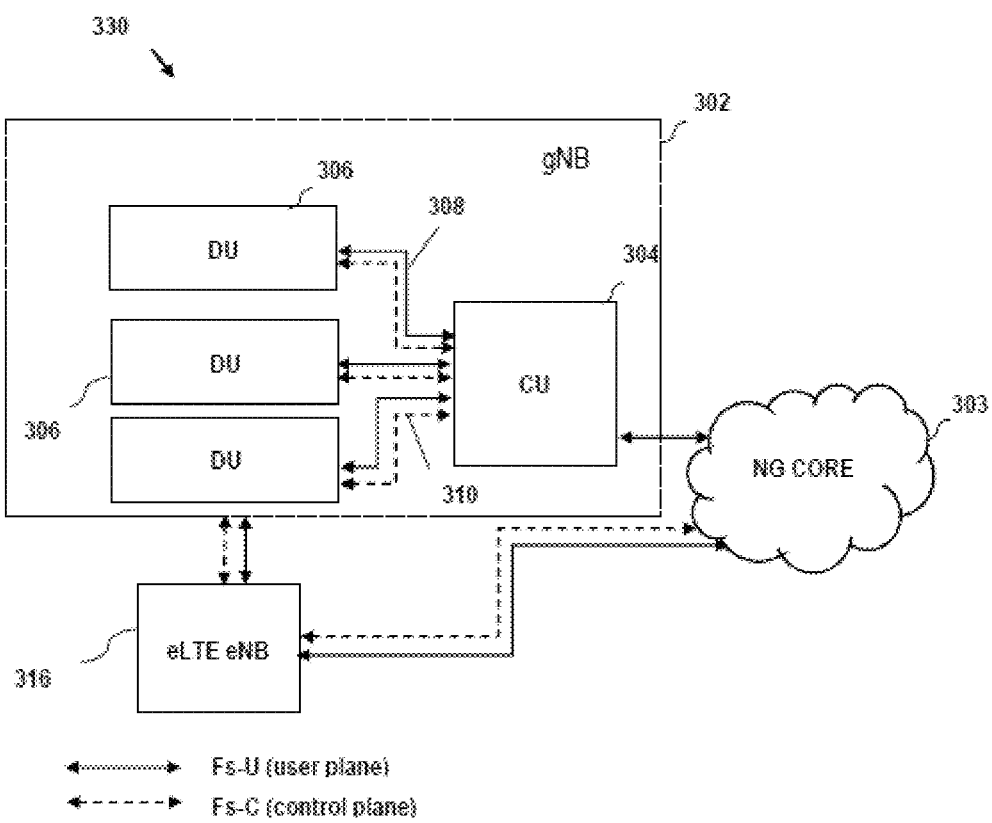
FIG. 3c is a functional block diagram of another prior art NSA gNB and eLTE eNB architecture including a 5G NR Core (NGC).
Figure 3D:
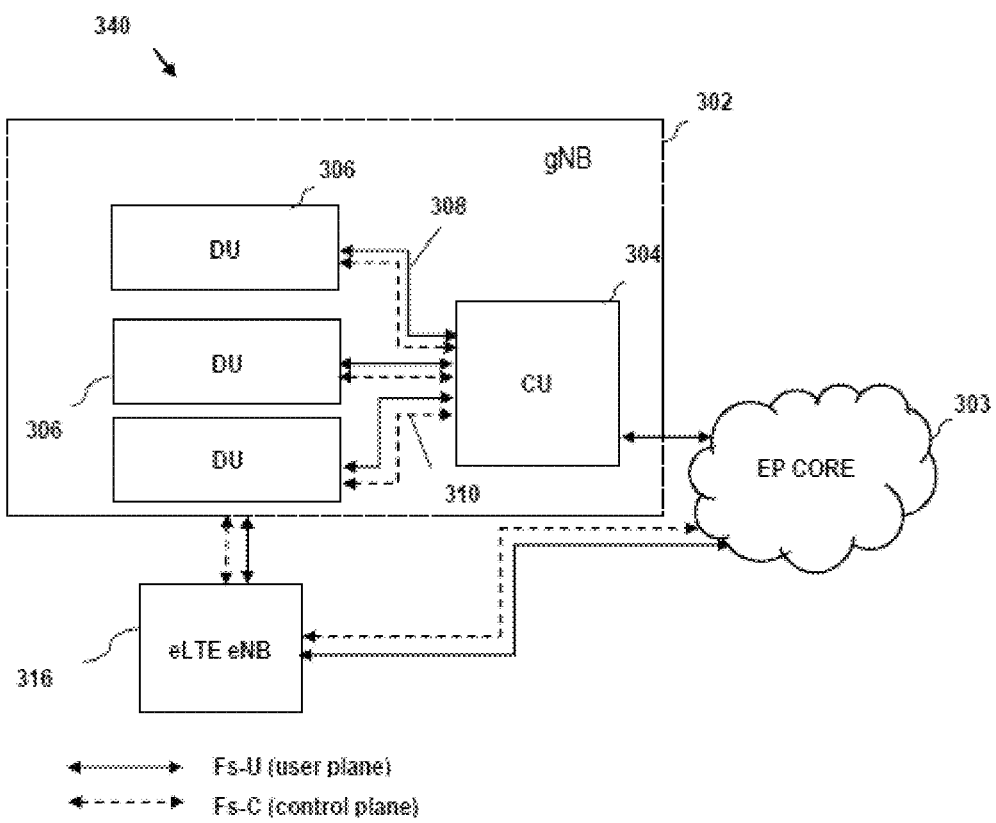
FIG. 3d is a functional block diagram of another prior art NSA gNB and eLTE eNB architecture including an Evolved Packet Core (EPC).

As previously described with respect to FIGS. 3b-3d, in non-standalone (NSA) scenarios, the NR radio cells are effectively integrated or combined with LTE radio cells using dual connectivity to provide radio access. In the case of NSA, the radio network core network may be either EPC or 5GC, depending on the particular choice of the operator.

FIG. 5e illustrates an NSA gNB and eLTE eNB architecture including a 5G NR Core (NGC) according to the present disclosure. In this architecture 570, the NG Core 403 communicates with the gNB 401 with CUe and DUe's, as well as supporting an eLTE eNB 316 for the user plane. Control plane functions for the eLTE eNB are supported by the gNB 401. An MECu 440 is utilized within the gNB 401, and MECd 444 is used within the 5GC or NG Core 403.

FIG. 5f illustrates an NSA gNB and LTE eNB architecture including an Evolved Packet Core (EPC) according to the present disclosure. In this architecture 580, an EPC (EP Core) 303, 333 communicates with the gNB 401 with CUe and DUe's for user plane function, as well as supporting an LTE eNB 317 (i.e., an non-5G communicative NodeB) for the user plane and control plane. A combined MECu/d 448 is utilized within the gNB so as to provide both upstream and downstream detection at a single point within the architecture, thereby obviating having to retrofit the (extant) EPC 303.

FIG. 5g illustrates an NSA gNB and eLTE eNB architecture including an Evolved Packet Core (EPC) according to the present disclosure. In this architecture 590, an EPC (EP Core) 303, 333 communicates with the gNB 401 with CUe and DUe's for user plane function, as well as supporting an eLTE eNB 316 (i.e., a 5G communicative NodeB) for the user plane and control plane. A combined MECu/d 448 is again utilized within the gNB so as to provide both upstream and downstream detection at a single point within the architecture, ad obviating having to retrofit the (extant) EPC 303.

Each of the configurations of FIGS. 5*b*-5*f* may include a MEC module in either or all of the shown CUe(s) or DUe(s) or core network, and perform the functionalities discussed with respect to MEC modules 440, 442 or 444.

It will be recognized that as described above with respect to the various exemplary architectures, each of these MECx modules disposed at the CUe, DUe, and core entity may be capable of monitoring upstream and downstream voice traffic, i.e., in both directions. However, it will be appreciated that some nodes are better suited for one direction; e.g., the CUe or DUe may more optimally detect upstream traffic (since they are closer to the edge and UEs), and can more easily resolve the source node (e.g., a premises within a service group) initiating the session. Likewise, where used, the network core MECd may be best suited to detect downstream traffic (i.e., that originated from an external network node or server such as a VoIP server).

In addition, in some implementations, depending on the configuration, an MEC module (MECx) may monitor for and detect any other type of IP traffic, such as in support of 5G NR network slicing functions that are optimized or dedicated to particular use cases or applications where QoE/QoS would be desirable.

It will also be appreciated that while described primarily with respect to a unitary gNB-CUe entity or device 401 as shown in FIGS. 5-5*g*, the present disclosure is in no way limited to such architectures. For example, the techniques described herein may be implemented as part of a distributed or dis-aggregated or distributed CUe entity (e.g., one wherein the user plane and control plane functions of the CUe are dis-aggregated or distributed across two or more entities such as a CUe-C (control) and CUe-U (user)), and/or other functional divisions are employed, including in NSA-based architectures.

It is also noted that heterogeneous architectures of eNBs or femtocells (i.e., E-UTRAN LTE/LTE-A Node B's or base stations, including eLTE eNBs 316) and gNBs may be utilized consistent with the architectures of FIGS. 5-5*g*. For instance, a given DUe may (in addition to supporting node operations as discussed in greater detail with respect to FIGS. 7-7*a* below), act (i) solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area.

In accordance with the 5G NR model, the DUe(s) 406, 406*a* comprise logical nodes that each may include varying subsets of the gNB functions, depending on the functional split option. DUe operation is controlled by the CUe 404 (and ultimately for some functions by the NG Core 303). Split options between the DUe and CUe in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

Under Option 1 (RRC/PDCP split), the RRC (radio resource control) is in the CUe while PDCP (packet data convergence protocol), RLC (radio link control), MAC, physical layer (PHY) and RF are kept in the DUe, thereby maintaining the entire user plane in the distributed unit.

Under Option 2 (PDCP/RLC split), there are two possible variants: (i) RRC, PDCP maintained in the CUe, while RLC, MAC, physical layer and RF are in the DU(s); and (ii) RRC, PDCP in the CUe (with split user plane and control plane stacks), and RLC, MAC, physical layer and RF in the DUe's.

Under Option 3 (Intra RLC Split), two splits are possible: (i) split based on ARQ; and (ii) split based on TX RLC and RX RLC.

Under Option 4 (RLC-MAC split), RRC, PDCP, and RLC are maintained in the CUe 404, while MAC, physical layer, and RF are maintained in the DUe's.

Under Option 5 (Intra-MAC split), RF, physical layer and lower part of the MAC layer (Low-MAC) are in the DUe's 406, 406*a*, while the higher part of the MAC layer (High-MAC), RLC and PDCP are in the CUe 404.

Under Option 6 (MAC-PHY split), the MAC and upper layers are in the CUe, while the PHY layer and RF are in the DUe's. The interface between the CUe and DUe's carries data, configuration, and scheduling-related information (e.g. Modulation and Coding Scheme or MCS, layer mapping, beamforming and antenna configuration, radio and resource block allocation, etc.) as well as measurements.

Under Option 7 (Intra-PHY split), different sub-options for UL (uplink) and DL (downlink) may occur independently. For example, in the UL, FFT (Fast Fourier Transform) and CP removal may reside in the DUe's, while remaining functions reside in the CUe 404. In the DL, iFFT and CP addition may reside in the DUe, while the remainder of the PHY resides in the CUe.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as CoMP, MIMO, load balancing, and mobility.

Generally speaking, the foregoing split options are intended to enable flexible hardware implementations which allow scalable cost-effective solutions, as well as coordination for e.g., performance features, load management, and real-time performance optimization. Moreover configurable functional splits enable dynamic adaptation to various use cases and operational scenarios. Factors considered in determining how/when to implement such options can include: (i) QoS requirements for offered services (e.g. low latency to support 5G RAN requirements, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

It is also noted that the "DU" functionality referenced in the various split options above can itself be split across the DUe and its downstream components, such as the RF stages of the node 409 (see FIGS. 7 and 7*a*) and/or the CPEe 413. As such, the present disclosure contemplates embodiments where some of the functionality typically found within the DUe may be distributed to the node/CPEe.

It will further be recognized that user-plane data/traffic may also be routed and delivered apart from the CUe. In one implementation (described above), the CUe hosts both the RRC (control-plane) and PDCP (user-plane); however, as but one alternate embodiment, a so-called "dis-aggregated" CUe may be utilized, wherein a CUe-CP entity (i.e., CUe—control plane) hosts only the RRC related functions, and a CUe-UP (CUe—user plane) which is configured to host only PDCP/SDAP (user-plane) functions. The CUe-CP and CUe-UP entities can, in one variant, interface data and inter-process communications via an E1 data interface, although other approaches for communication may be used.

It will also be appreciated that the CUe-CP and CUe-UP may be controlled and/or operated by different entities, such as where one service provider or network operator maintains cognizance/control over the CUe-UP, and another over the CUe-CP, and the operations of the two coordinated according to one or more prescribed operational or service policies or rules.

Referring again to FIG. 4, the exemplary embodiment of the DUe 409 is a strand-mounted or buried DUe (along with the downstream radio chain(s), the latter which may include one or more partial or complete RRH's (remote radio heads) which include at least portions of the PHY functionality of the node (e.g., analog front end, DAC/ADCs, etc.). As can be appreciated, the location and configuration of each DUe/node may be altered to suit operational requirements such as population density, available electrical power service (e.g., in rural areas), presence of other closely located or co-located radio equipment, geographic features, etc.

As discussed with respect to FIGS. 7-7a below, the nodes 406, 406a in the embodiment of FIG. 4 include multiple OFDM-based transmitter-receiver chains of 800 MHz nominal bandwidth, although this configuration is merely exemplary. In operation, the node generates waveforms that are transmitted in the allocated band (e.g., up to approximately 1.6 GHz), but it will be appreciated that if desired, the OFDM signals may in effect be operated in parallel with signals carried in the below-800 MHz band, such as for normal cable system operations.

As shown in FIG. 4, in one implementation, each node (and hence DUe) is in communication with its serving CUe via an F1 interface, and may be either co-located or not co-located with the CUe. For example, a node/DUe may be positioned within the MSO HFC infrastructure proximate a distribution node within the extant HFC topology, such as before the N-way tap point 412, such that a plurality of premises (e.g., the shown residential customers) can be served by the node/DUe via the aforementioned OFDM waveforms and extant HFC plant. In certain embodiments, each node/DUe 406, 406a is located closer to the edge of the network, so as to service one or more venues or residences (e.g., a building, room, or plaza for commercial, corporate, academic purposes, and/or any other space suitable for wireless access). For instance, in the context of FIG. 4, a node might even comprise a CPEe or external access node (each discussed elsewhere herein). Each radio node 406 is configured to provide wireless network coverage within its coverage or connectivity range for its RAT (e.g., 4G and/or 5G NR). For example, a venue may have a wireless NR modem (radio node) installed within the entrance thereof for prospective customers to connect to, including those in the parking lot via inter alia, their NR or LTE-enabled vehicles or personal devices of operators thereof.

Notably, different classes of DUe/node 406, 406a may be utilized. For instance, a putative "Class A" LTE eNB may transmit up X dbm, while a "Class-B" LTE eNBs can transmit up to Y dbm (Y>X), so the average area can vary widely. In practical terms, a Class-A device may have a working range on the order of hundreds of feet, while a Class B device may operate out to thousands of feet or more, the propagation and working range dictated by a number of factors, including the presence of RF or other interferers, physical topology of the venue/area, energy detection or sensitivity of the receiver, etc. Similarly, different types of NR-enabled nodes/DUe 406, 406a can be used depending on these factors, whether alone or with other wireless PHYs such as WLAN, etc.

Moreover, using the architecture of FIG. 4, data may be delivered redundantly or separately via the radio access node 406a as well as the CPEe 413 via one or more DUe units 406a, depending on the location of the client device 407, thereby enabling the client device to have constant access to the requested data when in range of the serving node/device. For instance, in one scenario, the supplemental link is used to maintain a separate data session simultaneously even without mobility; i.e., one session via PHY1 for Service A, and another simultaneous session via PHY2 for Service B (as opposed to handover of Service A from PHY1 to PHY2). In one implementation, extant 3GPP LTE-A multi-band carrier aggregation (CA) protocols are leveraged, wherein the supplemental link acts as a Secondary Cell or "SCell" to the Primary Cell or "PCell" presently serving the user from inside the home/building, or vice versa (e.g., the supplemental link can act as the PCell, and the SCell added thereafter via e.g., the premises node). See inter alia, 3GPP TR 36.808, "Evolved Universal Terrestrial Radio Access (E-UTRA); Carrier Aggregation; Base Station (BS) radio transmission and reception," incorporated herein by reference in its entirety.

Signal Attenuation and Bandwidth

Figure 6A:
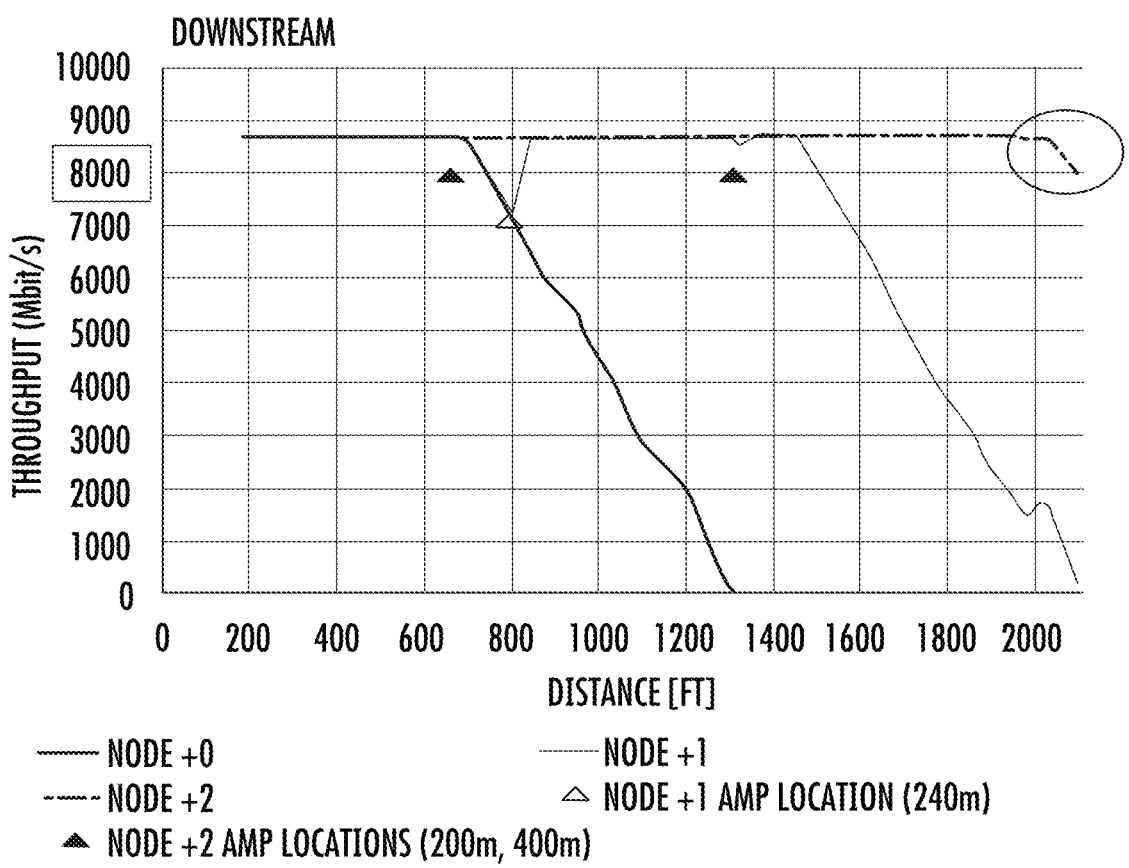
FIGS. 6a and 6b illustrate exemplary downstream (DS) and upstream (US) data throughputs or rates as a function of distance within the HFC cable plant of FIG. 4.
Figure 6B:
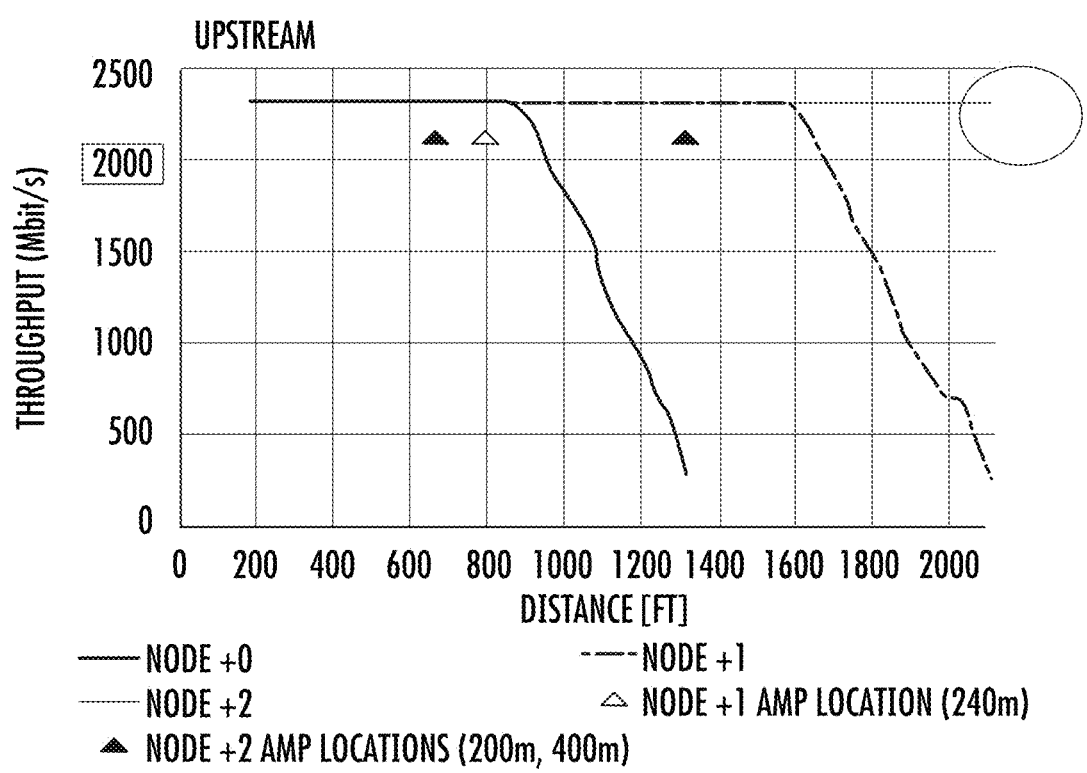

FIGS. 6a and 6b illustrate exemplary downstream (DS) and upstream (US) data throughputs or rates as a function of distance within the HFC cable plant of FIG. 4. As illustrated, a total (DS and US combined) bandwidth on the order of 10 Gbps is achievable (based on computerized simulation conducted by the Assignee hereof), at Node+2 at 2100 ft (640 m), and at Node+1 at 1475 ft (450 m). One exemplary split of the aforementioned 10 Gbps is asymmetric; e.g., 8 Gbps DL/2 Gbps UL, although this may be dynamically varied using e.g., TDD variation as described elsewhere herein.

Figure 2:
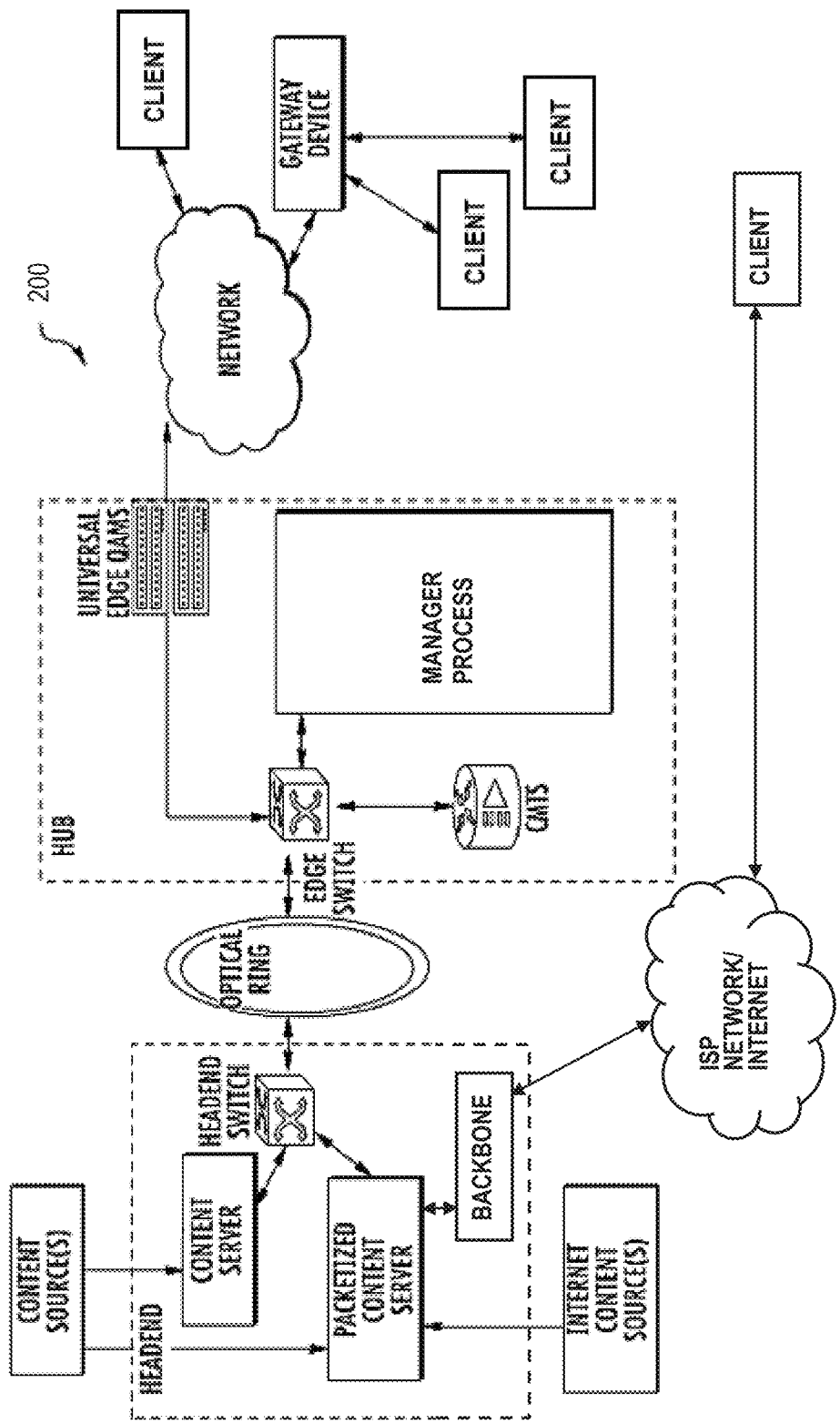

Notably, the portions of the extant HFC architecture described above (see e.g., FIGS. 1 and 2) utilized by the architecture 400 of FIG. 4 are not inherently limited by their medium and architecture (i.e., optical fiber transport ring, with coaxial cable toward the edges); coaxial cable can operate at frequencies significantly higher than the sub-1 GHz typically used in cable systems, but at a price of significantly increased attenuation. As is known, the formula for theoretical calculation of attenuation (A) in a typical coaxial cable includes the attenuation due to conductors plus attenuation due to the dielectric medium:

$$A = 4.35(R_t/Z_0) + 2(sqrt(E)) * 78 \text{ pF}$$
$$= dB \text{ per } 100 \text{ ft.}$$

where:
$R_t$=Total line resistance ohms per 100 ft.
$R_t$=0.1(1/d+1(sqrt(F))*D (for single copper line)
p=Power factor of dielectic
F=Frequency in megahertz (MHz)

As such, attenuation increases with increasing frequency, and hence there are practical restraints on the upper frequency limit of the operating band. However, these restraints are not prohibitive in ranges up to for example 2 GHz, where with suitable cable and amplifier manufacturing and design, such coaxial cables can suitably carry RF signals without undue attenuation. Notably, a doubling of the roughly 800 MHz-wide typical cable RF band (i.e., to 1.6 GHz width) is very possible without suffering undue attenuation at the higher frequencies.

It will also be appreciated that the attenuation described above is a function of, inter alia, coaxial conductor length, and hence higher levels of "per-MHz" attenuation may be acceptable for shorter runs of cable. Stated differently, nodes serviced by shorter runs of cable may be able to better utilize the higher-end portions of the RF spectrum (e.g., on the high end of the aforementioned exemplary 1.6 GHz band) as compared to those more distant, the latter requiring greater or disproportionate amplification. As such, the present disclosure contemplates use of selective mapping of frequency spectrum usage as a function of total cable medium run length or similar.

Another factor of transmission medium performance is the velocity factor (VF), also known as wave propagation speed or velocity of propagation (VoP), defined as the ratio of the speed at which a wavefront (of an electromagnetic or radio frequency signal, a light pulse in an optical fiber or a change of the electrical voltage on a copper wire) propagates over the transmission medium, to the speed of light (c, approximately 3E08 m/s) in a vacuum. For optical signals, the velocity factor is the reciprocal of the refractive index. The speed of radio frequency signals in a vacuum is the speed of light, and so the velocity factor of a radio wave in a vacuum is 1, or 100%. In electrical cables, the velocity factor mainly depends on the material used for insulating the current-carrying conductor(s). Velocity factor is an important characteristic of communication media such as coaxial, CAT-5/6 cables, and optical fiber. Data cable and fiber typically has a VF between roughly 0.40 and 0.8 (40% to 80% of the speed of light in a vacuum).

Achievable round-trip latencies in LTE (UL/DL) are on the order of 2 ms (for "fast" UL access, which eliminates need for scheduling requests and individual scheduling grants, thereby minimizing latency, and shorter TTI, per Release 15), while those for 5G NR are one the order of 1 ms or less, depending on transmission time interval frequency (e.g., 60 kHz).

Notably, a significant portion of 4G/4.5G transport latency relates to network core and transport (i.e., non-edge) portions of the supporting infrastructure.

Hence, assuming a nominal 0.7 VF and a one (1) ms roundtrip latency requirement, putative service distances on the order of 100 km are possible, assuming no other processing or transport latency:

$$0.5E{-}03 \text{ s (assume symmetric US/DS)} \times (0.7 \times 3E08 \text{ m/s}) \times 1 \text{ km}/1000 \text{ m} = 1.05E02 \text{ km}$$

As discussed in greater detail below with respect to FIGS. 7a and 7b, the exemplary embodiments of the architecture 400 may utilize IF (Intermediate Frequencies) to reduce attenuation that exists at the higher frequencies on the bearer medium (i.e., coaxial cable).

Default and Dedicated Bearers—

As previously referenced, one salient aspect of the present disclosure relates to identification and allocation of one or more dedicated bearers to certain types of traffic which may benefit from such allocation, including e.g., packetized audio/voice traffic. As used in the present context, a "bearer" can be broadly thought of as a set of network resources and parameters that are allocated to or define treatment of data carried over a data network. Although a bearer is virtual or logical, it may be associated with a particular attribute of a physical cabling medium (e.g., a radio frequency channel carried over a coaxial cable) or architecture based upon the physical medium. Various types of bearers exist for wireless networks. SRBs (Signaling Radio Bearers) carry control-plane traffic, such as RRC signaling messages. DRBs (Data Radio Bearers) carry user-data traffic via IP packets. A DRB may be a "default bearer" or a "dedicated bearer."

A "default" bearer is assigned to a UE that connects to a data network (e.g., a 4G LTE/LTE-A network) for the first time to provide "best effort" service, and remains as long as the UE is connected to the same network. See e.g., FIG. 3 which illustrates an exemplary prior art use case of default and dedicated bearers with a 3GPP EPS. Additional default bearers may be associated with the UE. For example, a VoIP implementation may use a first default bearer for signaling messages, a second default bearer for data traffic (e.g., via LTE connection or other), and a dedicated bearer for voice traffic and linked to the first default bearer. Each default bearer is associated with a respective IP address. In addition, a QoS Class Identifier (QCI) is a mechanism used in 3GPP-based (e.g., LTE) networks to ensure that bearer traffic is allocated appropriate QoS. Different QCI values may be associated with the bearer depending on its usage. Typically, QCI values of 5 through 9 are assigned to the default bearer, where each of these QCI values are associated with respective priority levels, packet delay budgets (in ms), packet error loss rates, and appropriate services (voice, video, gaming, chat, file transfer, email, etc.).

On the other hand, a dedicated bearer is configured to carry a specific data flow with a given QoS. More specifically, a dedicated bearer may provide a prioritized tunnel to transfer specific traffic such as VoIP (e.g., via OTT services); a dedicated bearer for other types of services (video streaming, etc.) may be set up simultaneously. Moreover, a dedicated bearer may provide a guaranteed bit rate (GBR) or may be non-GBR, while a default bearer does not have a guaranteed bit rate. GBR generally comes with a higher priority level, which benefits the specific traffic (e.g., VoIP, VoLTE) because lower priority traffic would be discarded first in a congested network environment. The dedicated bearer may be an additional bearer linked to the default bearer via an identity value (and does not require a separate IP address). The dedicated bearer must have a different QCI value with different associated QoS and capabilities, enabling different treatment of data that passes via the dedicated bearer. As further discussed below with respect to FIGS. 9-13b the present disclosure leverages use of dedicated bearers to give special or differentiated treatment to specific services such as OTT voice services via, e.g., aforementioned VoIP, VoLTE, or other 3GPP-based network protocols (e.g., those based on 4.5G hybrid protocols, 5G NR, etc.).

In some implementations, multiple "grades" of dedicated bearers may be available for use and allocation, and the allocation may be based on such grades (as well as other factors discussed elsewhere herein). Grades may be determined by e.g., width of the wideband carrier(s) used, the QCI value, and/or other measurements. That is, the QoS associated with the data pipe and/or QoE experienced by a user may differ depending on the grade. In some cases, the grade used for OTT voice applications may depend on the communication protocol (e.g., 3GPP-based vs. WLAN-based), transfer protocol (e.g., XMPP vs. BOSH) and/or the voice application used (i.e., the third-party server used). Some applications may require greater bandwidth, latency, etc.

In some variants, the cognizant MECx module (e.g., MECu, MECd, MECuc) may switch the grade dynamically, such as when the user changes applications. For example, the grade may be increased if the user ends a WhatsApp voice (only) call and initiates a Zoom conference call (having higher bandwidth requirements) within a certain period of time. Conversely, the grade may be decreased if the data transfer is insufficient to utilize the entire capacity of the dedicated bearer, in effect "scavenging" excess bandwidth being allocated to a given application. Such insufficiency may be determined in one implementation by comparing or ratioing the capacity of the dedicated bearer and the users' average data transfer rate, call frequency, number of connected parties, or other metrics which are indicative of the user's bandwidth consumption relative to the allocation. Furthermore, depending on the application, some degree of "clipping" may be tolerated, such as where only very intermittent high-bandwidth transients or peaks are unsupported by the allocated resources.

In some variants, subscribers/users of the network and the OTT voice service may select, such as via the managed network operator, a subscription or "pay per" plan to a certain grade level or a maximum grade level of service, depending on their particular needs.

In some implementations, dedicated bearers (controlled by the managed network operator) may be made specific and/or exclusive to one or more third-party services or applications. For example, for one or more particular dedicated bearer that is created by the cognizant MECx module, only a particular OTT service or application may occupy or utilize them (such as via a whitelist of acceptable allocation recipients). A "grade" as discussed above may be assigned to the particular dedicated bearer as well. However, in other scenarios, multiple OTT services may occupy a single dedicated bearer, including cases where the bearer has sufficient bandwidth to accommodate multiple distinct sessions (e.g., a 100 MHz nominal NR carrier allocated as a bearer could feasibly support multiple OTT sessions simultaneously).

Network Node and DUe Apparatus—

Figure 7:
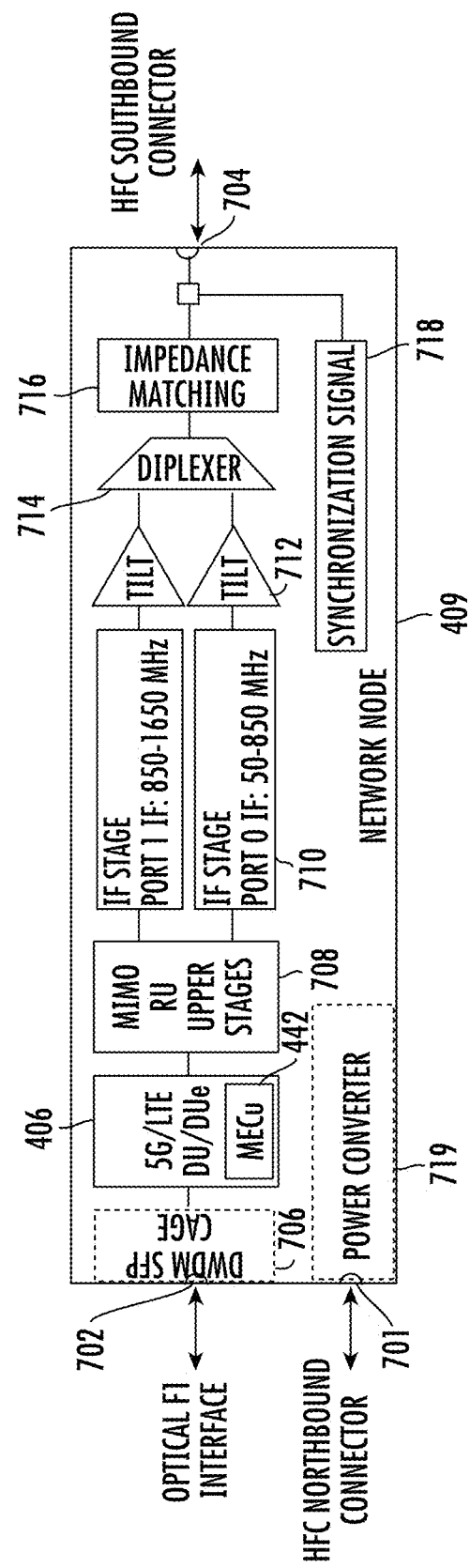
FIG. 7 is a functional block diagram illustrating an exemplary general configuration of a network node apparatus according to the present disclosure.
Figure 7A:
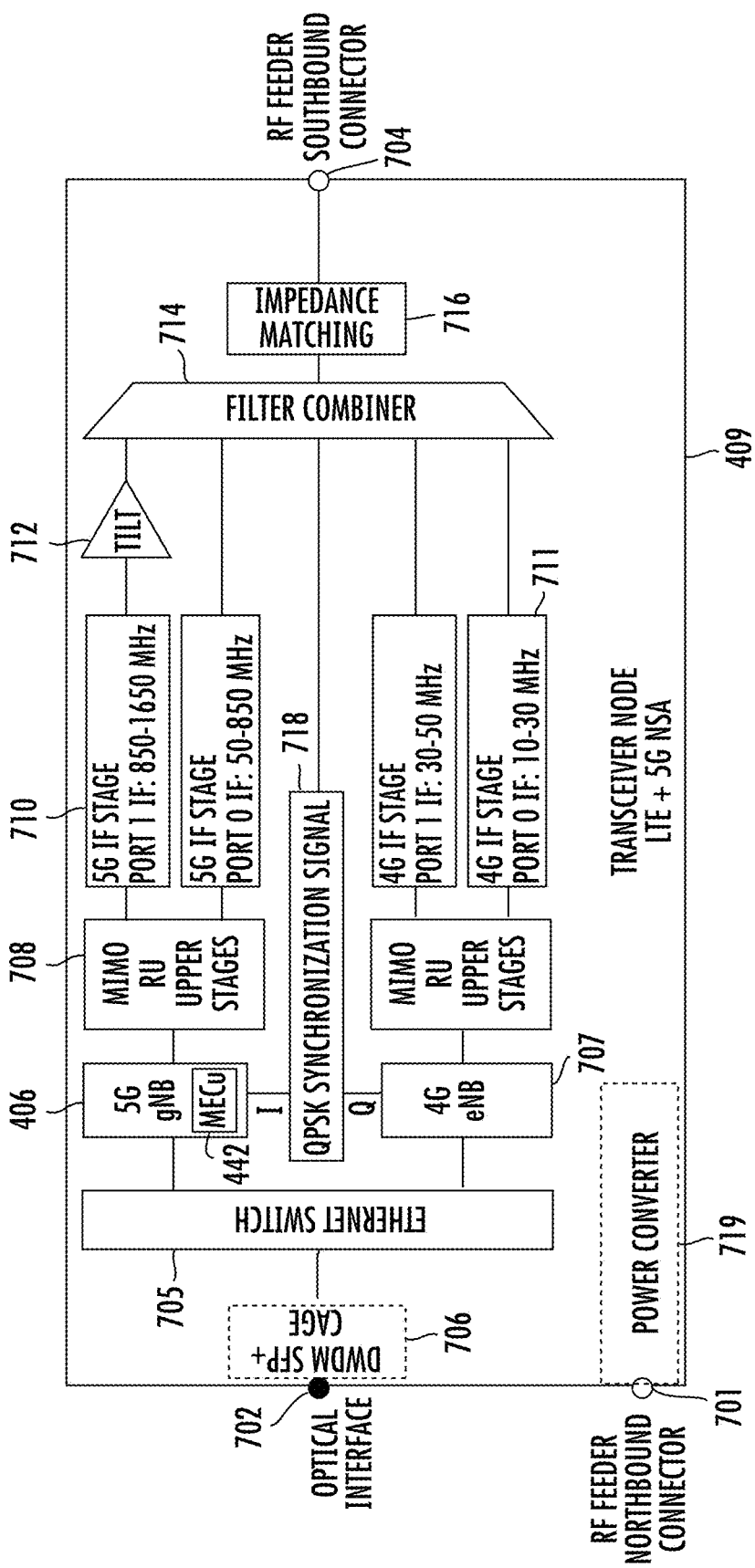
FIG. 7a is a functional block diagram illustrating an exemplary implementation of the network node apparatus according to the present disclosure, configured for 3GPP 4G and 5G capability.

FIGS. 7 and 7a illustrate exemplary configurations of a network radio frequency node apparatus 409 according to the present disclosure. As referenced above, these nodes 409 can take any number of form factors, including (i) co-located with other MSO equipment, such as in a physically secured space of the MSO, (ii) "strand" or pole mounted, (iii) surface mounted, and (iv) buried, so as to inter alia, facilitate most efficient integration with the extant HFC (and optical) infrastructure, as well as other 4G/5G components such as the CUe 404.

As shown, in FIG. 7, the exemplary node 409 in one embodiment generally includes an optical interface 702 to the HFC network DWDM system (see FIG. 2), as well as a "Southbound" RF interface 704 to the HFC distribution network (i.e., coax). The optical interface 702 communicates with an SFP connector cage 706 for receiving the DWDM signals via the interposed optical fiber. A 5G NR DUe 406 is also included to provide 5G DU functionality as previously described, based on the selected option split. The MIMO/radio unit (RU) stages 708 operate at baseband, prior to upconversion of the transmitted waveforms by the IF (intermediate frequency) stages 710 as shown. As discussed below, multiple parallel stages are used in the exemplary embodiment to capitalize on the multiple parallel data streams afforded by the MIMO technology within the 3GPP technology. A tilt stage 712 is also utilized prior to the diplexer stage 714 and impedance matching stage 716. Specifically, in one implementation, this "tilt" stage is used to compensate for non-linearity across different frequencies carried by the medium (e.g., coaxial cable). For instance, higher frequencies may have a higher loss per unit distance when travelling on the medium as compared to lower frequencies travelling the same distance on the same medium. When a high bandwidth signal (e.g. 50-1650 MHz) is transmitted on a coax line, its loss across the entire frequency bandwidth will not be linear, and may include shape artifacts such as a slope (or "tilt"), and/or bends or "knees" in the attenuation curve (e.g., akin to a low-pass filter). Such non-linear losses may be compensated for to achieve optimal performance on the medium, by the use of one or more tilt compensation apparatus 712 on the RF stage of the node device.

A synchronization signal generator 718 is also used in some embodiments as discussed in greater detail below with respect to FIG. 7a.

In the exemplary implementation of FIG. 7a, both 4G eNodeB and 5G gNB DUe 707, 406 are also included to support the RF chains for 4G and 5G communication respectively. As described in greater detail below, the 5G portion of the spectrum is divided into two bands (upper and lower), while the 4G portion is divided into upper and lower bands within a different frequency range. Similar to the configuration shown in FIG. 7, the 5G portion of the spectrum is managed by the DUe 406, which may also include an MECx module 442 as previously described with respect to FIGS. 5-5g. In the exemplary implementation, OFDM modulation is applied to generate a plurality of carriers in the time domain. See, e.g., co-owned and co-pending U.S. Pat. No. 9,185,341 issued Nov. 10, 2015 and entitled "Digital domain content processing and distribution apparatus and methods," and U.S. Pat. No. 9,300,445 issued Mar. 29, 2016 also entitled "Digital domain content processing and distribution apparatus and methods," each incorporated herein by reference in their entirety, for inter alia, exemplary reprogrammable OFDM-based spectrum generation apparatus useful with various embodiments of the node 509 described herein.

In some variants, the 4G eNB 707 may include a MECx module (not shown) to detect the type of traffic and manage the allocation of dedicated bearer(s). Having redundant MEC modules, one in the gNB DUe and one in the eNB, may enable the node 409 to allow data transmissions with a UE to utilize the appropriate protocol depending on network conditions, user location, availability of connectivity or RAT. For example, a user whose mobile device moves into or out of range of a 5G-enabled CPEe or modem (e.g., 413 or 417) may seamlessly transition to a supplemental 3PGG-based connection, as described in co-owned U.S. patent application Ser. No. 16/261,234 entitled "APPARATUS AND METHODS FOR ENABLING MOBILITY OF A USER DEVICE IN AN ENHANCED WIRELESS NETWORK" and filed Jan. 29, 2019, incorporated herein by reference in its entirety.

In the exemplary embodiment, the 5G and LTE OFDM carriers produced by the node 409 utilize 1650 MHz of the available HFC bearer bandwidth, and this bandwidth is partitioned into two or more sub-bands depending on e.g., operational conditions, ratio of "N+0" subscribers served versus "N+i" subscribers served, and other parameters. See discussion of FIG. 7c below. In one variant, each node utilizes RF power from its upstream nodes to derive electrical power, and further propagate the RF signal (whether at the same of different frequency) to downstream nodes and devices including the wideband amplifiers.

While the present embodiments are described primarily in the context of an OFDM-based PHY (e.g., one using IFFT and FFT processes with multiple carriers in the time domain) along with TDD (time division duplex) temporal multiplexing, it will be appreciated that other PHY/multiple access schemes may be utilized consistent with the various aspects of the present disclosure, including for example and without limitation FDD (frequency division duplexing), direct sequence or other spread spectrum, and FDMA (e.g., SC-FDMA or NB FDMA).

As previously noted, to achieve high throughput using a single receiver chipset in the consumer premises equipment (CPEe) 413 and 3GPP 5G NR waveforms over a single coaxial feeder, such as the coaxial cable that MSOs bring to their subscriber's premises or the single coaxial cable that is installed for lower-cost single input single output (SISO) distributed antenna systems (DAS), the total carrier bandwidth that can be aggregated by the prior art chipset is limited to a value, e.g. 800 MHz, which is insufficient for reaching high throughputs such as 10 Gbit/s using one data stream alone given the spectral efficiencies supported by the 3GPP 5G NR standard.

Since the 3GPP 5G NR standard supports the transmission of multiple independent parallel data streams as part of a multiple input multiple output (MIMO) channel for the same RF bandwidth to leverage the spatial diversity that wireless channels afford when multiple antenna elements are used, the very first generation of 3GPP 5G chipsets will support such parallel MIMO data streams. However, attempts to transmit these parallel streams over a single cable would generally be counterproductive, as all the streams would occupy the same RF bandwidth and would interfere with each other for lack of spatial diversity between them.

Accordingly, the various embodiments of the apparatus disclosed herein (FIGS. 7 and 7a) leverage the parallel MIMO data streams supported by 3GPP 5G NR, which are shifted in frequency in the transceiver node 409 before being injected into the single coaxial feeder so that frequency diversity (instead of spatial diversity; spatial diversity may be utilized at the CPEe and/or supplemental pole-mounted radio access node 406a if desired) is leveraged to achieve the maximum total carrier bandwidth that 3GPP 5G NR chipsets will support with parallel data streams. Conceptually, a transparent "pipe" that delivers MIMO streams which converge at the CPEe is created. Based on channel quality feedback from the CPEe back to the node (e.g., DUe 406 or node 409), the contents of the MIMO streams are mapped to different frequency resources, e.g. with a frequency selective scheduler, and the appropriate modulation and coding scheme (MCS) is selected by the transmission node for the contents. The aforementioned "pipe" disclosed herein acts in effect as a black box which internally reroutes different antenna ports to different frequency bands on the cable bearer medium.

Figure 7B:
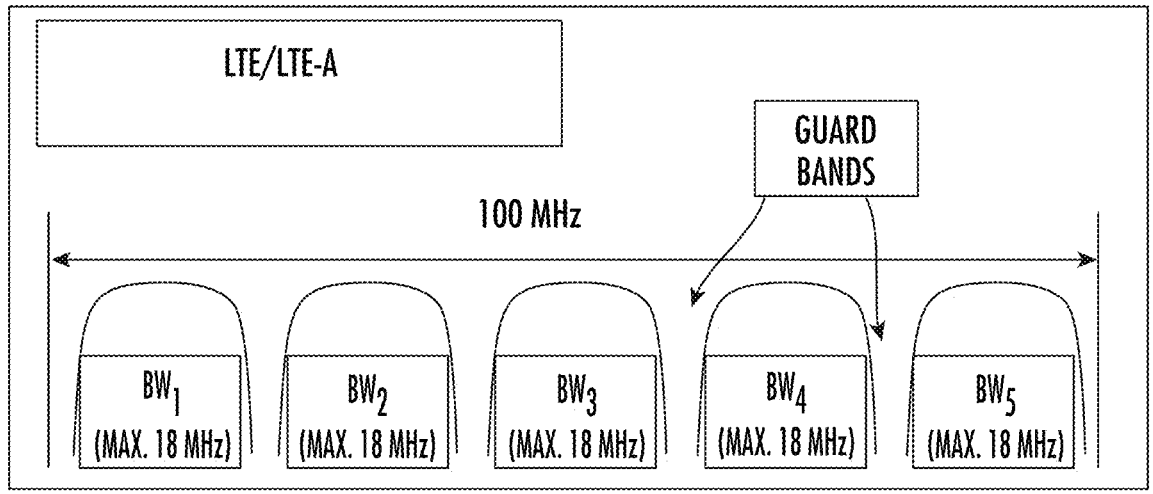
FIG. 7b is a graphical representation of frequency spectrum allocations according to prior art LTE/LTE-A and 5G NR standards.
Figure 7B:
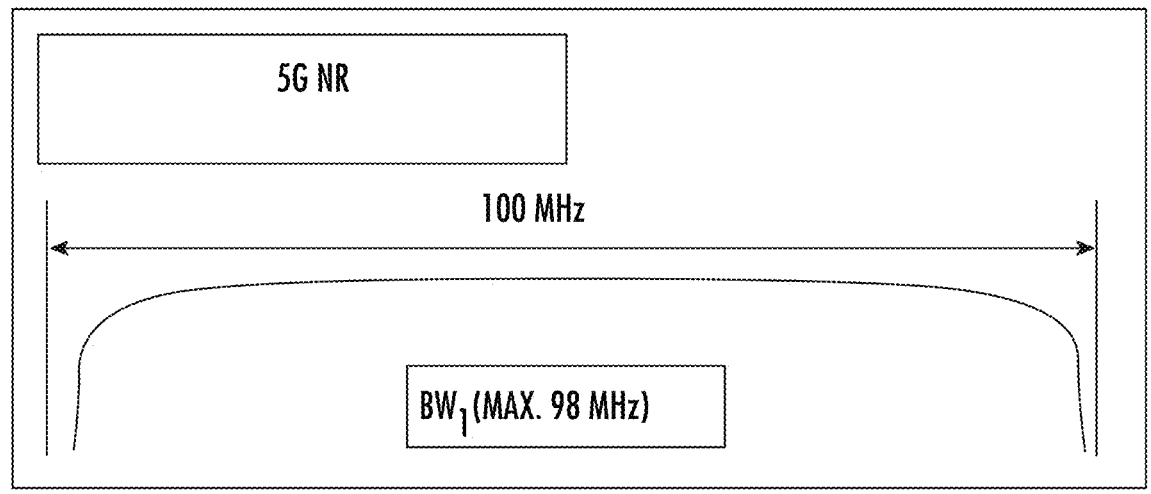

FIG. 7b shows a comparison of prior art LTE/LTE-A frequency bands and associated guard bands over a typical 100 MHz portion of the allocated frequency spectrum (top), as well as a comparable 5G NR frequency band allocation (bottom). As shown, 5G NR uses a wideband approach, with its maximum bandwidth being on the order of 98 MHz. Such use of the wideband 5G carrier is more efficient than multicarrier LTE/LTE-A. It provides a number of benefits, including faster load balancing, less common channel overhead, and reduced guard bands between carriers (LTE uses for example 10% allocated to its guard bands).

Accordingly, in one variant of the present disclosure (FIG. 7c), the node 409 is configured to offset the aforementioned individual parallel MIMO data streams in the frequency spectrum using a plurality of 5G NR widebands 732 (here, TDD carriers) distributed between lower and upper frequency limits 752, 754, each wideband having a center frequency and associated guardband (not shown) to the next adjacent wideband carrier(s) 732. In one implementation, the 5G NR values of maximum bandwidth and guardband are used; however, it will be appreciated that the various aspects of the present disclosure are in no way so limited, such values being merely exemplary. In the illustrated embodiments of FIG. 7c, N bands or TTD carriers 732 are spread across of the available spectrum, the latter which may in one example be 1.6 GHz as discussed previously herein, although other values are contemplated (including to frequencies well above 1.6 GHz, depending on the underlying cable medium losses and necessary transmission distances involved). As shown, depending on the available bandwidth and the bandwidth consumed by each TDD carrier 732, more or less of such carriers can be used (three shown on the left portion of the diagram, out to "n" total carriers. Notably, while a number of nominal 98 MHz NR carriers may be used, the embodiments of FIG. 7c also contemplate (i) much wider carriers (depending on the number of layers 737, 738 used, as shown in the bottom portion of FIG. 7c), and (ii) use of carrier aggregation or CA mechanisms to utilize two or more widebands together effectively as a common carrier.

As further shown in the top portion 730 of FIG. 7c, a lower band 734 is configured for FDD use; specifically, in this implementation, a downlink synchronization channel 733 (discussed elsewhere herein) is created at the lower portion of the band 734, and one or more LTE FDD bands 742 are created (such as for UL and DL channels as described below with respect to the bottom portion of FIG. 7c). The total bandwidth of the FDD band 734 is small in comparison to the remainder of the spectrum (i.e., between the lower and upper limits 752, 754), the latter used to carry, inter alia, the 5G NR traffic.

In the exemplary implementation 740 (FIG. 7c, bottom portion) of the generalized model 730 (FIG. 7c, top portion), the individual 5G TDD carriers 732 each include multiple "layers" 737, 738, which in the exemplary configuration correspond to MIMO ports and which can be utilized for various functions. As shown, a common UL/DL layer 737 is associated with each or the larger carriers 732 (to maintain an uplink and downlink channel), as are a number (L) of additional UL or DL layers 738 (e.g., which can be selectively allocated to UL or DL, the latter being the predominant choice due to service asymmetry on the network where DL consumes much more bandwidth than UL). In one variant, each layer is 98 MHz wide to correspond to a single NR wideband, although this value is merely exemplary.

Within the LTE FDD band 742, two LTE carriers for UL and DL 735, 736 are used, and a separate DL synchronization channel 733 is used at the lower end of the spectrum. As will be appreciated, various other configurations of the lower portion of the cable spectrum frequency plan may be used consistent with the present disclosure. In one variant, the lower spectrum portion 742 (FIG. 7c) is allocated to a 3GPP 4G LTE MIMO carrier with two parallel streams 735, 736 of about 20 MHz bandwidth for a total of about 40 MHz (including guardbands). This is performed since 3GPP Release 15 only supports 5G NR in Non-Standalone (NSA) mode, whereby it must operate in tandem with a 4G/4.5 LTE carrier.

As an aside, 5G NR supports adaptive TDD duty cycles, whereby the proportion of time allocated for downstream and upstream transmissions can be adapted to the net demand for traffic from the total set of transmitting network elements, viz. the node and all the CPEe 413 sharing the coaxial bus with the node. 4G LTE does not support such adaptive duty cycles. To prevent receiver blocking in the likely scenario that the 5G and 4G duty cycles differ, high-rejection filter combiners 714 (FIG. 7*a*) are used in all active network elements, viz. transceiver nodes, inline amplifiers and CPEe 413 for the 4G and 5G carriers to not interfere with each other or cause receiver blocking. In the exemplary diplexer of FIG. 7*a*, both 4G and 5G are addressed via a high-rejection filter to allow for different duty cycles.

As noted above, another minor portion 733 of the lower spectrum on the coaxial cable (e.g., <5 MHz) employs one-way communication in the downstream for the transmission of two digital synchronization channels, one for 5G and one for 4G, which are I-Q multiplexed onto one QPSK analog synchronization channel within the aforementioned "minor portion" 733 from the signal generator 718 of the transceiver node 409 to the multiple inline amplifiers and CPEe 513 that may be sharing the coaxial bus. These synchronization channels aid coherent reception of the PRBs, specifically, the synchronization signal is used to achieve frequency synchronization of oscillators in all active components downstream from the node such as line-extender amplifiers and CPEe's. The oscillators for the 4G and 5G technologies may be independent. If the carrier uses FDD, such as on the 4G LTE channels, frequency synchronization is sufficient. If the carrier uses TDD as in the 5G NR portions of FIG. 7*c*, then phase synchronization is needed as well for downstream components to identify the transmission mode—downlink or uplink and the duty cycle between the two and the synchronization signal conveys this information. Since lower frequencies attenuate less on the cable, the synchronization channel is in one implementation transmitted over a lower portion of the spectrum on the cable (FIG. 7*c*) so that it reaches every downstream network element and CPEe. In one variant, an analog signal is modulated with two bits, where one bit switches according to the duty cycle for the 4G signal, and the other bit switches according to the duty cycle of the 5G signal, although other approaches may be utilized.

It will also be recognized that: (i) the width of each 5G TDD wideband carrier 732 may be statically or dynamically modified based on e.g., operational requirements such as demand (e.g., network or bandwidth requirements of any dedicated bearer created for enhanced-QoE voice services), and (ii) the number of wideband carriers 732 used (and in fact the number of layers utilized within each wideband carrier 732) can be similarly statically or dynamically modified. It will also be appreciated that two or more different values of bandwidth may be used in association with different ones of the plurality of widebands, as well as being aggregated as previously described.

The values of $f_{lower}$ 752 and $f_{upper}$ 754 may also be varied depending on operational parameters and/or other considerations, such as RF signal attenuation as a function of frequency as discussed in detail previously herein. For example, since higher frequencies attenuate much more over the coaxial transmission media than lower frequencies, in one variant the Intermediate Frequencies (IF) are transmitted over the media, and block-conversion to RF carrier frequency is employed subsequently in the consumer premises equipment (CPEe) 413 for 3GPP band-compliant interoperability with the 3GPP 5G NR chipset in the CPEe. In this fashion, attenuation that would otherwise be experienced by conversion earlier in the topology is advantageously avoided. Similarly, very short runs of cable (e.g., a "last mile" between a fiber delivery node and a given premises, or from a distribution node to various subscriber CPEe within a multi-dwelling unit (MDU) such as an apartment or condominium building, hospital, or enterprise or school campus can be mapped out into much higher frequencies since their overall propagation distance over the cable is comparatively small.

In another variant, active or dynamic Tx/Rx port formation specified in the 5G NR standards is utilized, yet the formed beams therein are substituted with frequency bandwidth assignments as discussed above (i.e., total bandwidth, $f_{lower}$ 752 and $f_{upper}$ 754 values, and TDD carrier bandwidth values).

Figure 7C:
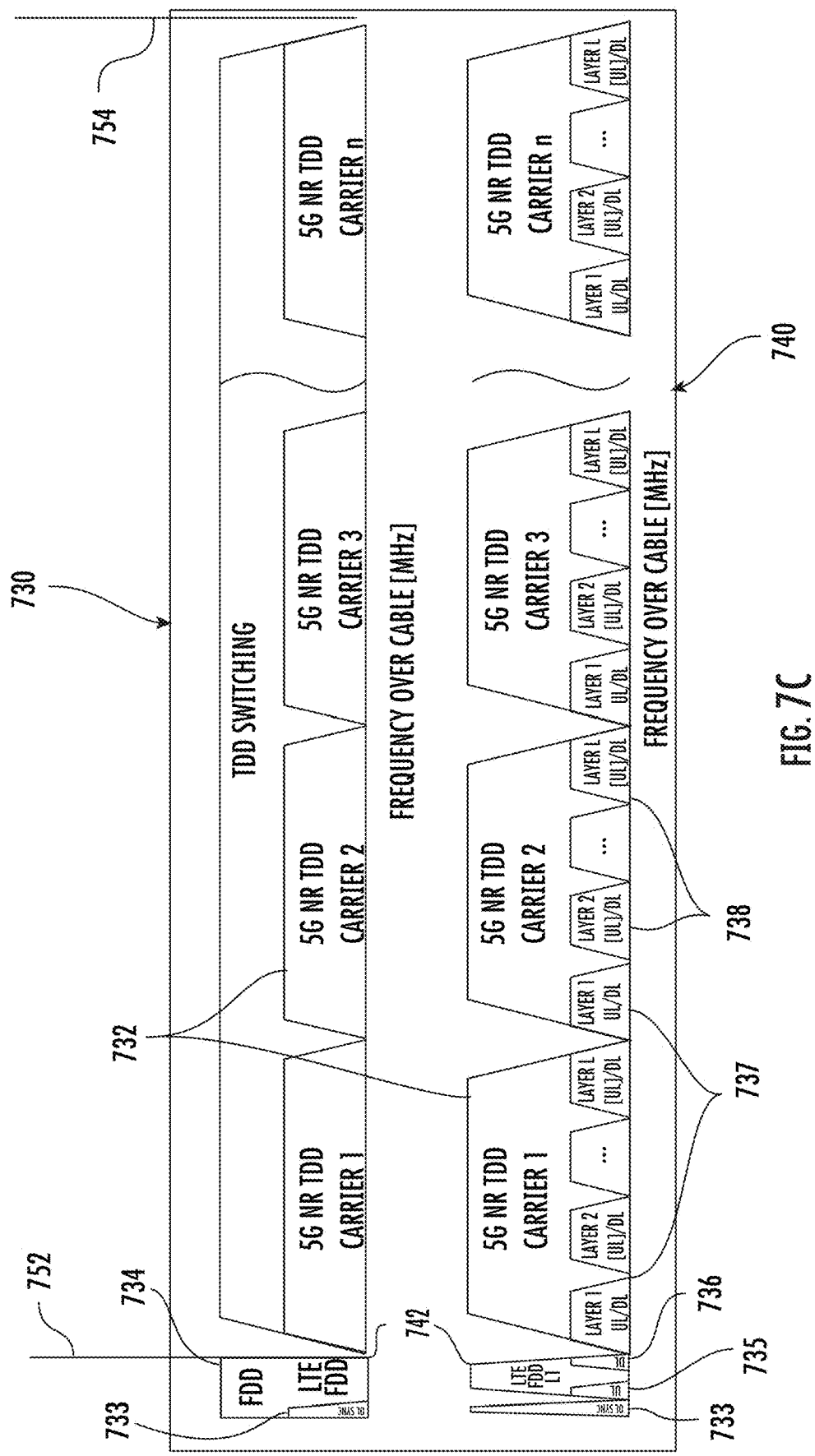
FIG. 7c is a graphical representation of a frequency spectrum allocation according to one embodiment of the present disclosure.
Figure 8:
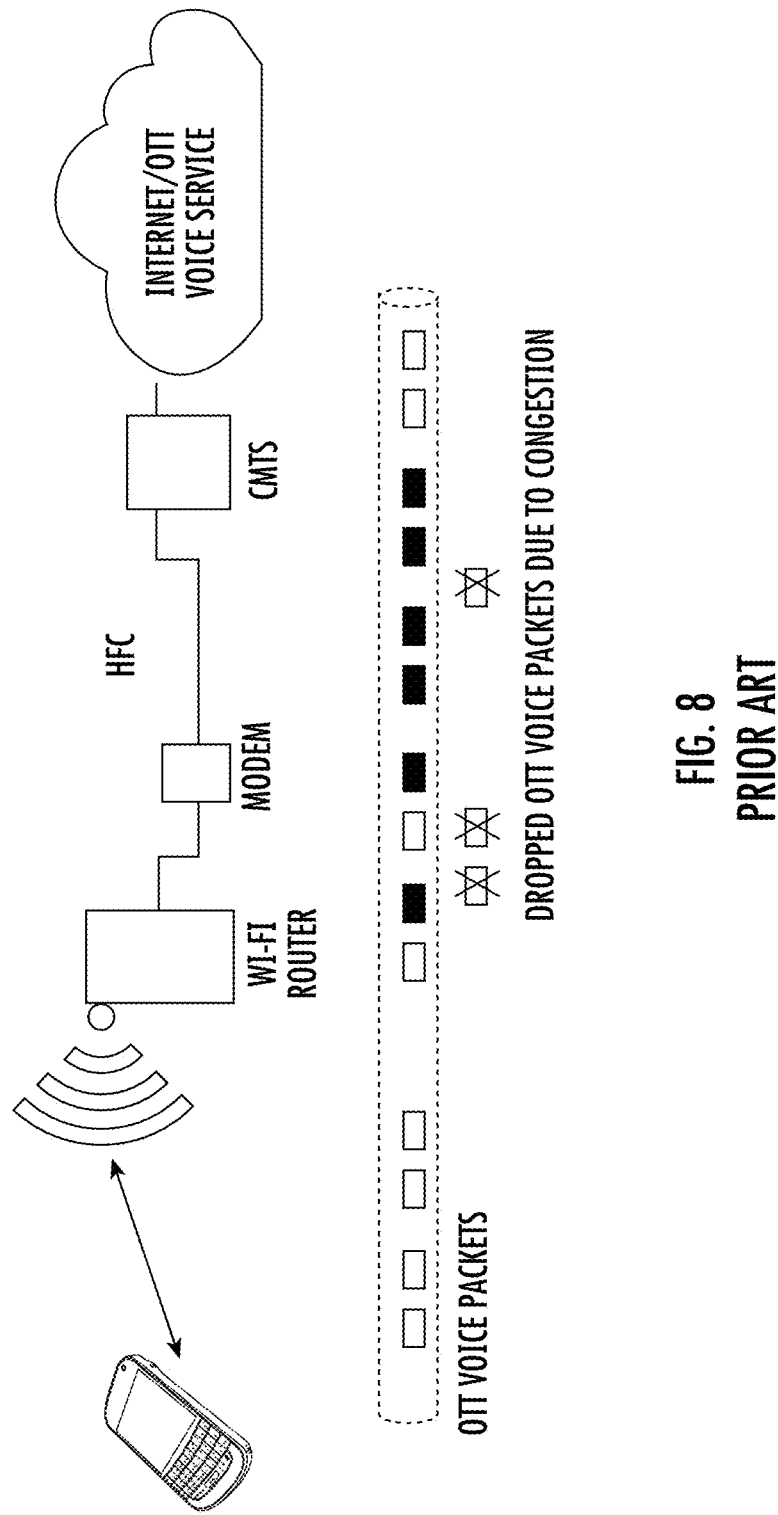
FIG. 8 illustrates a typical prior art approach to voice packet processing.
Figure 9:
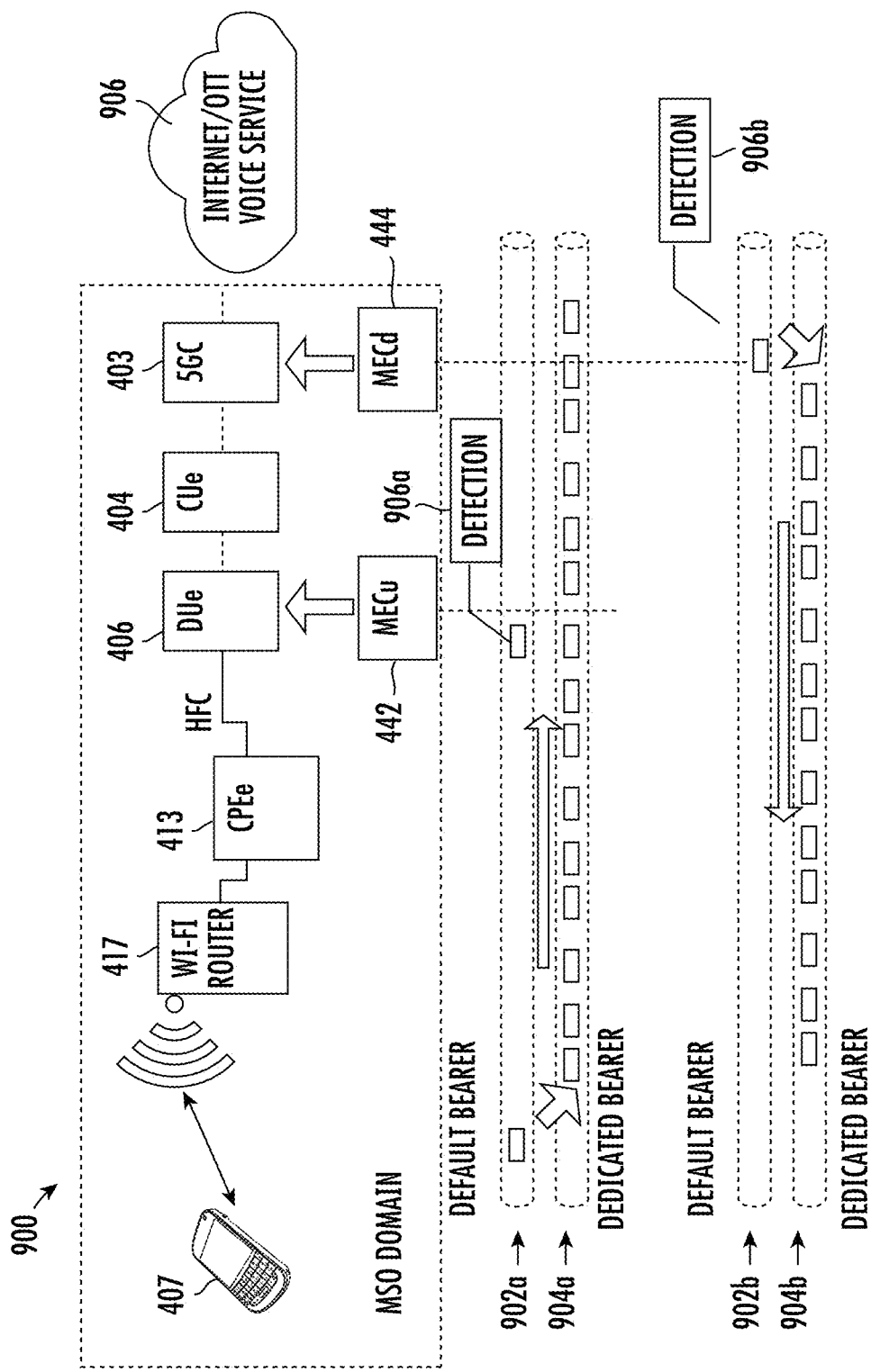
FIG. 9 illustrates one exemplary embodiment of OTT voice packet processing using a dedicated channel according to the present disclosure.

The foregoing aspects of FIG. 7*c* also highlight the fact that, while some exemplary configurations described herein utilize two (2) MIMO ports or streams as baseline of sorts for frequency diversity on the cable medium (i.e., in order to reduce the frequency-based filtering complexity in the CPEe 413), a much greater level of complexity in frequency planning can be utilized consistent with the present disclosure, including use of more MIMO layers and different bandwidths per TDD carrier 732. Specifically, exemplary embodiments herein map the different antenna ports to different frequency bands on the cable, with different frequency bands experiencing different levels of propagation loss, phase delay, environmental interference and self-interference. Hence, independent channels with frequency diversity for signals to reach the CPEe are created. When upconverted to RF frequency at the CPEe, the CPEe in one implementation processes these signals as if they were received over the air, and will (as shown in block 810 of FIG. 8), upconvert each frequency band on the cable, from 50 to 850 MHz for Port 0 and 850 to 1650 MHz for Port 1 in the exemplary embodiment, to the same RF frequency, thereby realigning them by virtue of a different frequency multiplier being applied to each port. Moreover, in the exemplary embodiment. The CPEe provides channel quality information (CQI), rank Indicator (RI) and precoding matrix indicator (PMI) feedback back to the distribution node 409 consistent with extant 3GPP protocols. If the higher frequencies on the cable medium are not excessively attenuated (see FIGS. 6*a* and 6*b*), an RI of 2 (for 2-layer MIMO) will be reported back to the node 409. The node then uses this information to code independent layers of data to the CPEe. However, depending on permissible complexity in the CPEe and the physical characteristics of the cable relative to topological location of the CPEe, four (4), or even (8) layers may be utilized in place of the more simple 2-layer approach above.

In operation, the IF carriers injected by the transceiver node into the coaxial feeder 704 can be received by multiple CPEe 413 that share the feeder as a common bus using directional couplers and power dividers or taps. Point-to-Multipoint (PtMP) downstream transmissions from the node 409 to the CPEe 413 can be achieved by, for instance, scheduling payload for different CPEe on different 3GPP 5G NR physical resource blocks (PRB) which are separated in frequency.

In the exemplary embodiments of FIG. 7*c*, the vast majority of bandwidth in the coaxial cable bearer is used in Time Division Duplex (TDD) fashion to switch between downstream (DS) and upstream (US) 5G NR communications, depending on the configuration of the particular layers 737, 738 used in each TDD carrier 732. Upstream communications from the multiple CPEe 413 to the transceiver node can also/alternatively occur simultaneously over separate PRBs (with frequency separation) if desired.

In one exemplary implementation, upon detection of one or more criteria triggered by, e.g., transmission protocol, destination IP address, etc. as discussed above, an MECx module 440, 442 of a network node (e.g., node functioning as CUe 404 or DUe 406) may assign a dedicated bearer on top of a default bearer attached to a UE 407 communicative with the exemplary 5G NR network. The dedicated bearer may occupy for instance a portion of one of the wideband carriers 732 of the expanded frequency spectrum illustrated in FIG. 7c so as to, inter alia, (i) enable usage of sufficient bandwidth for voice (and/or video, etc.) data transmission; (ii) leave one or more other widebands for transmission of other simultaneous data streams, obviating the need to manage bandwidth even in a congested network environment; and (iii) transmit voice data at ultra-high rates and ultra-low latencies to reduce user-perceptible delays or artifacts associated with transmission of the packet media data.

In some variants, the assigned wideband 732 (or its associated layer 737, 738) may narrow or expand depending on the network requirements of the dedicated bearer. For example, if the OTT voice data only requires a small portion of the wideband/layer at most, the wideband/layer may become reduced to accommodate only the UL or DL (or both) dedicated bearer(s). As noted above, each wideband may be statically or dynamically modified based on, e.g., operational requirements such as demand. If the OTT data includes voice data, video data, text, image data, bulk data (e.g., file transfers), and/or other data as may be needed during, say, a group conference video call (e.g., a Zoom meeting), the wideband/layer may be expanded to accommodate potential bandwidth needs for this session while retaining and maximizing the QoE of the users in the session (e.g., simultaneous broadcast transmissions of high-definition audio and video with dozens of users with no degradation in audio or video quality). This enhanced QoE is backed by one or more dedicated bearers attached to the wideband(s)/layer(s) assigned to the session.

In one variant, a dedicated bearer utilizing a 5G NR wideband carrier 732 may revert to an LTE-mapped portion of the spectrum rather than shrinking the wideband/layer. Since some exemplary embodiments of the node apparatus 409 includes both 4G and 5G capabilities, the connection need not necessarily be interrupted but rather allocated to a new (LTE) band, such as the UL or DL bands 735, 736 shown in FIG. 7c.

In additional variants, virtualized 5G network "slices" may be utilized to dynamically allocate logical network functions. This enables, for example, user-plane functionality to exist at the edge of a network, and management functionality elsewhere (e.g., another edge node, at the core). Advantageously, these network slices may be configured "on the fly" to support specific scenarios or use cases of the network, each application being able to retain its own unique set of network resources and topology suitable for the specific scenario. Additionally, this type of network slicing is flexible in that at least portions of the network architecture may be dynamically reconfigured to provide the necessary (or maximum) level of connectivity, capability, bandwidth, etc. In some implementations, the aforementioned dynamic allocation of wideband frequencies may be determined by the network slice determined for OTT voice applications. On the other hand, low-power applications where the end device must preserve its battery life as long as possible (e.g., a mobile UE which is low on battery power or otherwise restricted) may require the network slice to be optimized to the appropriate limited parameters (lower bandwidth, less frequent message ping signals, etc.). Note that assignment of a dedicated bearer is separate from the aforementioned network slicing, as attaching a dedicated bearer to a specific type of data transmission relates at least in part to prioritizing (according to QCI values), as compared to abstractly slicing network assets.

The connectivity between the transceiver node 409 and the northbound or upstream network element is achieved with a fiber optic link 702 to the MSO DWDM plant. To minimize the number of fiber channels required to feed the transceiver node 409, and to restrict it to a pair of fiber strands, in one embodiment the 3GPP 5G NR F1 interface (described supra) is realized over the fiber pair to leverage the low overhead of the F1 interface. The 3GPP 5G NR Distribution Unit (DUe) functionality is incorporated into the transceiver node 409 as previously described, since the F1 interface is defined between the Central Unit (CU/CUe) and DU/DUe where, in the illustrated embodiment, the CUe and DUe together constitute a 3GPP 5G NR base station or gNB (see FIGS. 5-5g).

An Ethernet switch 705 is also provided at the optical interface in the embodiment of FIG. 7a to divide the backhaul into the 4G and 5G data paths (e.g., the received upstream 4G and 5G signals are respectively routed differently based on the switch 705).

The exemplary node 409 also includes a power converter 719 to adapt for internal use of quasi-square wave low voltage power supply technology over HFC used by DOCSIS network elements as of the date of this disclosure. The node 409 in one variant is further configured to pass the quasi-square wave low voltage power received on the input port 701 through to the HFC output port 704 to other active network elements such as e.g., amplifiers, which may be installed downstream of the node on the HFC infrastructure.

It is noted that as compared to some extant solutions, the illustrated embodiment of FIGS. 4 and 7, 7a, 7c uses HFC versus twisted pair to feed the CPEe 413; HFC advantageously provides lower loss and wider bandwidths than twisted pair, which is exploited to provide 5G throughputs to farther distances, and to leverage the large existing base of installed coaxial cable. Moreover, the foregoing architecture in one implementation is configured to serve multiple CPEe 413 using directional couplers and power dividers or taps to attach to a common coaxial bus which connects to a single interface at the transceiver node. The aforementioned Ethernet services (necessary to service an external Wi-Fi access-point and an integrated Wi-Fi router) are further added in other implementations to provide expanded capability, in contrast to the existing solutions.

QoE/QoS for OTT Voice Services—

As alluded to above, Over the Top (OTT) Voice services when used in residential or enterprise environments via Wi-Fi do not provide a rich and sustained Quality of Experience (QoE) to the user, as these OTT Voice packets are treated the same as all other data packets in the DOCSIS plant. There is no prioritization for call data and packets dropped during congestion. A simplified illustration of a prior art DOCSIS-based architecture shown in FIG. 8. As can be seen, a congested network environment caused by insufficient bandwidth, time of day, etc. results in data packets being dropped. In scenarios where continuous receipt packet without room for buffering, e.g., OTT voice or video calls, the QoE and/or MOS may drop. In other words, user experience may become less than satisfactory for the reasons discussed elsewhere herein.

In contrast, the architecture 400 of FIG. 4, et seq. provides a mechanism by which OTT voice and similar services that primarily are accessed over e.g., Wi-Fi, can be provided a high quality guaranteed QoE/QoS. Specifically, referring now to FIG. 9, the architecture 900 as illustrated (implemented in architecture 400 in at least one exemplary embodiment) further includes one or more Mobile Edge Computing (MEC) platforms 442, 444 (which can reside for example at the DUe 406, CUe 404 or network core 403) that, when an OTT Voice service sets up the call via session instantiation, first detect the type of traffic as OTT Voice, and subsequently apply appropriate logic or rules (in both the UL and DL).

In one exemplary embodiment of the architecture 400 useful for enhanced QoE voice services, a wireless-enabled client device (UE) 407 may be in data communication with an OTT voice service provider 906 via a network embodied in the architecture 400. The client device 407 may access the network via wireless means by establishing communication with a router or modem 417 or other gateway apparatus. In one implementation, a IEEE Std. 802.11-based protocol may be used (e.g., Wi-Fi). In another implementation, the client device may communicate with 3GPP-based network apparatus, e.g., a small or femto cell, DUe (e.g., a pole-mounted access node), or other aforementioned architecture components. The router 417 may be communicative with an "enhanced" consumer premises equipment CPEe 413 that is connected to other network entities (including DUe 406) via physical cabling media, consistent with other portions of this disclosure. Given the present disclosure, it will be recognized that wired data communication is possible in other embodiments (e.g., direct wired connection with modem or router).

In one variant, the detection is triggered based on protocol being used (e.g. XMPP or BOSH), and specifies that all packets using the given protocol be tagged as OTT voice and be targeted for specific handling as described further below with respect to the methods of FIGS. 12-13. In another variant, detection is based on specific destination IP addressed typically used for specific OTT Voice services. Notably, all OTT applications (e.g., WhatsApp, Skype, Viber, FaceTime, Google Talk) use specific servers for their services, and hence the range of their IP addresses used in mediating the call is known a priori. Yet other variants based on e.g. size and format of packets, method of encryption being used, etc., will be recognized as possible additional/substitute detection means as will be appreciated by those of ordinary skill given the present disclosure.

Once detection has been performed, the cognizant MECx entity (e.g., 440, 442) will advise the DUe 406 to initiate a request to create a dedicated bearer for this session via signaling between the entities. In some variants, the cognizant MECx may alternatively or additionally be present in other nodes such as the CUe and the network core. In one exemplary variant, the MECx may advise the DUe to flag the detection to the core network (e.g., 5GC or EPC) 403, after which the 5GC or EPC creates a dedicated bearer. Once a dedicated bearer has been created, all OTT voice traffic will be mapped and transported on the new dedicated bearer. The dedicated bearer is then treated with a given scheduling (and/or other) priority over other "best effort" traffic (traversing on their own dedicated bearer) to mitigate the impact of congestion and to guarantee a high Mean Opinion Score (MOS). In some embodiments, a virtualized slice of the network 900 may be assigned to transmission of the OTT voice data, where the network slice is configured with optimized network parameters conducive to the desired transfer characteristics, e.g., little to no lag, simultaneous connections, high audio (and/or video) bitrate, and so on.

Referring again to FIG. 9, a default bearer 902a and an attached dedicated bearer 904a may carry data packets upstream. In one exemplary embodiment, the data packets include audio packets, specifically OTT voice data, transmitted to an OTT service provider. Moreover, when a voice packet transmitted through the default bearer 902a is detected by a MECx module 442 (residing in DUe 406, for example) via one or more of the aforementioned detection mechanisms, the MECx 442 instructs, e.g., the DUe to create a dedicated bearer (e.g., bearer 904a), if one has not been created already. The dedicated bearer 904a is logically attached to the default bearer 902a and may have enhanced QoS parameters (e.g., higher priority for detected voice data, higher or wider bandwidth, lower packet delay budget), which in turn enhance the QoE of users who are utilizing OTT voice applications.

In a different scenario where data is transmitted downstream from, e.g., the OTT service provider, which may occur simultaneously with the above upstream scenario, the MECx 444 residing at, e.g., the core network 403 may detect a voice packet via one or more of the aforementioned detection mechanisms. The MECx 444 instructs the core network entity 403 (or EPC) to create a dedicated bearer 904b, if one has not been created already. The dedicated bearer 904b attaches to default bearer 902b and may have enhanced QoS parameters that guarantee the QoE of users, including via prioritization of the detected voice packets via the dedicated bearer 904b.

As discussed above, 5G network slicing may be used alternatively or in conjunction with utilization of a dedicated bearer to optimize allocation of distributed network assets to further enhance the network connectivity for OTT voice applications.

Figure 10:
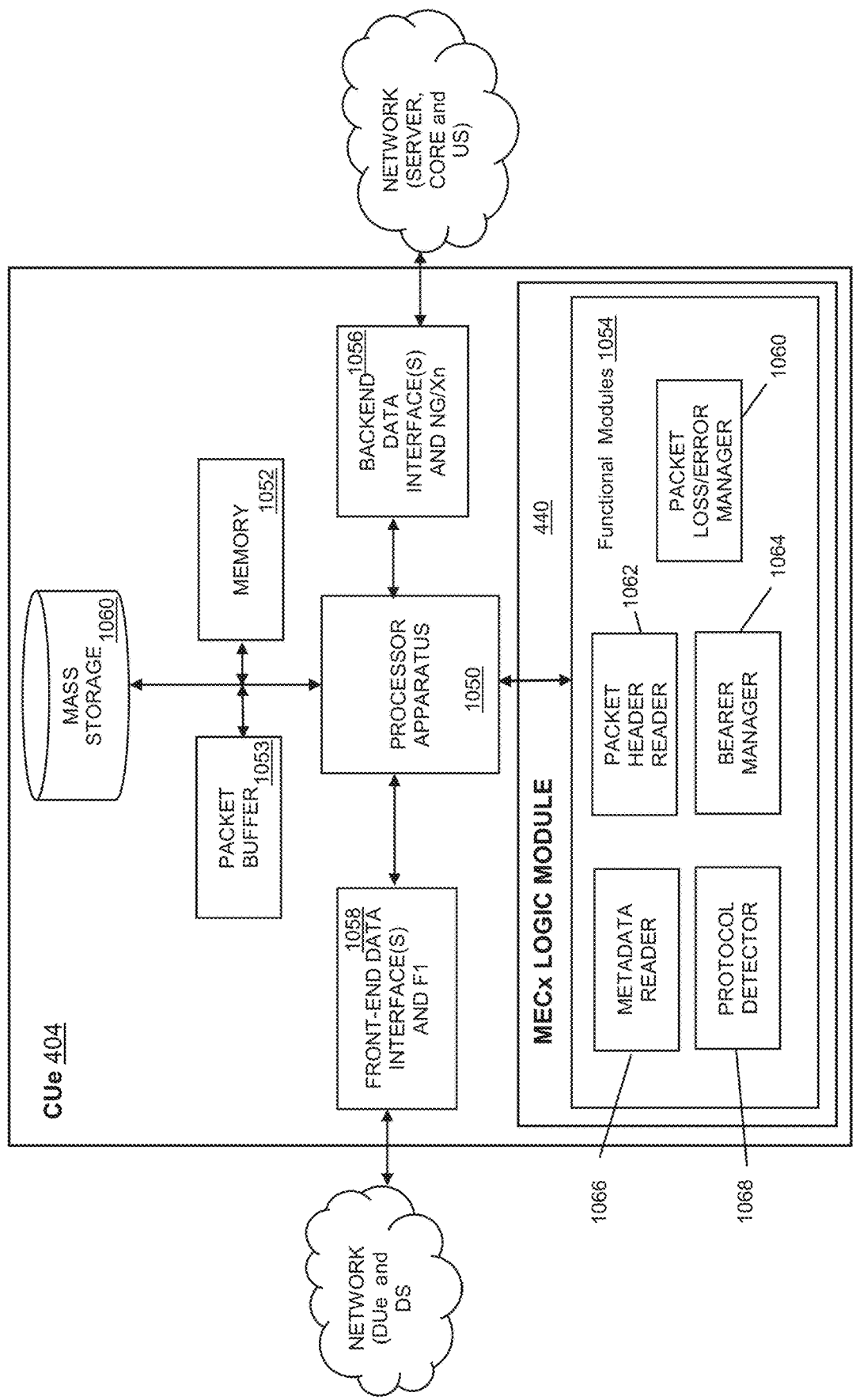
FIG. 10 is a functional block diagram illustrating an exemplary configuration of a Mobile Edge Computing (MECx) module of a CUe according to the present disclosure.

FIG. 10 illustrates a block diagram of an exemplary configuration of a CUe 404 with the aforementioned Mobile Edge Computing (MECx) platform or MECx module, useful for operation in accordance with the present disclosure.

In the exemplary embodiment as shown, the MECx module 440 is part of the CUe which includes, inter alia, a processor apparatus or subsystem 1050, a program memory module 1052, a backend network interface 1056 (toward, e.g., 5G NR Core, backend entity, third-party servers), and a front-end network interface 1058 (toward DUe, premises equipment, etc.). Within the MECx module 440 are a number of functional modules 1054 (here implemented as software or firmware operative to execute on the processor 1002), each assigned with a function relating to OTT service detection and dedicated or specialized bearer configuration and instantiation. Although the exemplary MECx module 440 is shown used within the CUe 404, those of ordinary skill in the related arts will readily appreciate, given the present disclosure, that the functions of the MECx module 440 may be redundantly or alternatively installed, virtualized, and/or distributed within other network entities such as the DUe (FIG. 11) and/or the core network (thus enabling ready access to detection and processing of data packets at the edge or servers associated with the third-party OTT voice service provider).

Moreover, while shown as part of the CUe 404 (such as via server blade, PCIe-connected module, or other), in one embodiment, the MECx module 440 is a standalone computerized apparatus that is in data communication with the CUe, such as via a LAN or WAN. However, it may also be implemented within an intermediate entity, e.g., within a data center, another network controller, and/or within "cloud" entities or other portions of the infrastructure of which the rest of the enhanced network (as discussed supra) is a part, whether owned/operated by the MSO or otherwise.

In one embodiment, the processor apparatus 1050 may include one or more of a digital signal processor, microprocessor, field-programmable gate array, or plurality of processing components mounted on one or more substrates. The processor 1050 may also comprise an internal cache memory. The processing subsystem is in communication with a program memory module or subsystem 1052, where the latter may include memory which may comprise, e.g., SRAM, flash and/or SDRAM components. The memory module 1052 may implement one or more of direct memory access (DMA) type hardware, so as to facilitate data accesses as is well known in the art. The memory module of the exemplary embodiment contains one or more computer-executable instructions that are executable by the processor apparatus 1050. A mass storage device (e.g., HDD or SSD, or even NAND flash or the like) is also provided as shown.

In one embodiment, the processing apparatus 1050 is configured to execute at least one computer program stored in memory 1052 (e.g., the logic of the MECx module 440 and its functional modules 1054 which implements the various detection functions described herein with respect to UL or DL data packets received from the network). The processing apparatus 1050 is configured to execute at least one computer program resident in storage 1060 associated with the host CUe 404 to support CUe functionality aside from the MECx functions. Other embodiments may implement such functionality within dedicated hardware, logic, and/or specialized co-processors (not shown). For instance, each distinct functional module 1060, 1062, 1064, 1066, 1068 of the MECx module (e.g., detection of transport protocol, metadata, etc.) may comprise their own hardware/software environment, and/or be distributed across multiple logical domains.

In the exemplary embodiment, the MEC module 442 is configured to receive data via the front-end interface(s) 1058 from, e.g., a client device and use the various functional modules to 1060, 1062, 1064, 1066, 1068 identify or characterize one or more aspects of the packets making up the data traffic, as well as cause subsequent creation and management of dedicated bearers. In one example, as discussed elsewhere herein, the MECx module 440 via its protocol detector 1068 is configured to detect the transport protocol (e.g., XMPP, BOSH, WebSocket, and other as discussed above). In another example, the MECx module is configured to read data associated with at least one packet of the received traffic. In one particular embodiment, the packet/header reader 1062 may be configured to read and/or extract the destination IP address of a given packet from, e.g., a header of the IP packet, and compare with an address stored in a storage device (e.g., memory 1052, or mass storage 1060 accessible via the MECx module 440). In some variants, the packet buffer 1053, and/or memory 1052 may at least temporarily store the received packets for further analysis by the functional modules of MECx. That is, additional attributes of the packets may be identified to corroborate the detection of, e.g., VoIP or VoLTE traffic, encrypted data may be decrypted, packets that are held in storage may be transmitted via a subsequently created dedicated bearer so as to avoid significant loss of packets during analysis and transition to the dedicated bearer (or back from the dedicated bearer to the default bearer), etc.

In other embodiments, application programming interfaces (APIs) such as those included in an MSO-provided applications, installed with other proprietary software, or natively available on the CUe controller apparatus (e.g., as part of the computer program noted supra or exclusively internal to the MECx module 440) may also be accessible to external processes (such as a network administrative process, another MECx module, or even the client or third-party server. Such APIs may include common network protocols or programming languages configured to enable communication with other network entities as well as receipt and transmit signals that a receiving device (e.g., client device, third-party OTT voice application server) may interpret. In one variant; the packet loss/error manager module 1060 communicates with other entities such as the transmitting client application (e.g., a VoIP or video chat app running on the client/UE) or the third-party OTT server to assess the performance of the dedicated bearer once established; i.e., via PER (packet error rate) or PLR (packet loss rate) data sent from the receiving entity. For instance, if an enumerated sequence of N packets was transmitted from the originator (e.g., client app) and the OTT server only received N-I of those packets ultimately (assume no retransmission mechanism), then N-I/N data can be used to assess the efficacy of the current dedicated bearer configuration, and perhaps modify it or instantiate a new bearer for use (whether in tandem, such as via a carrier aggregation or CA scheme, or as a replacement for the first dedicated bearer).

Returning to the exemplary embodiment as shown in FIG. 10*a*, one or more network "front-end" interface(s) 1058 are also utilized in the illustrated CUe for communication with downstream network entities, e.g., DUe, CPEe, APs or other intermediate entities, via extant infrastructure, e.g., Ethernet, HFC cabling, or other wired and/or wireless data network protocols. Upstream data packets originating from a client device may be received via the front-end interface(s) 1058.

In the exemplary embodiment, one or more backend interfaces 1056 are configured to transact one or more data packets with other networked devices, particularly backend apparatus such as the 5G NR Core, third-party OTT voice application servers, "cloud" servers, other distribution or controller nodes (i.e., DUe's or other CUe's), etc. according to a network protocol, which may also support the 3GPP 5G NR NG (NG-U and NG-C) and Xn (Xn-U and Xn-C) interfaces (see FIG. 4). Common examples of network routing protocols include for example: Internet Protocol (IP), Internetwork Packet Exchange (IPX), and GbE (Gigabit Ethernet), or other interfaces of suitable bandwidth capability.

It will also be appreciated that the two interfaces 1056, 1058 may be aggregated together and/or shared with other extant data interfaces, such as in cases where a function of the MECx module is virtualized within another component, such as the CUe or an MSO network server performing that function.

Figure 11:
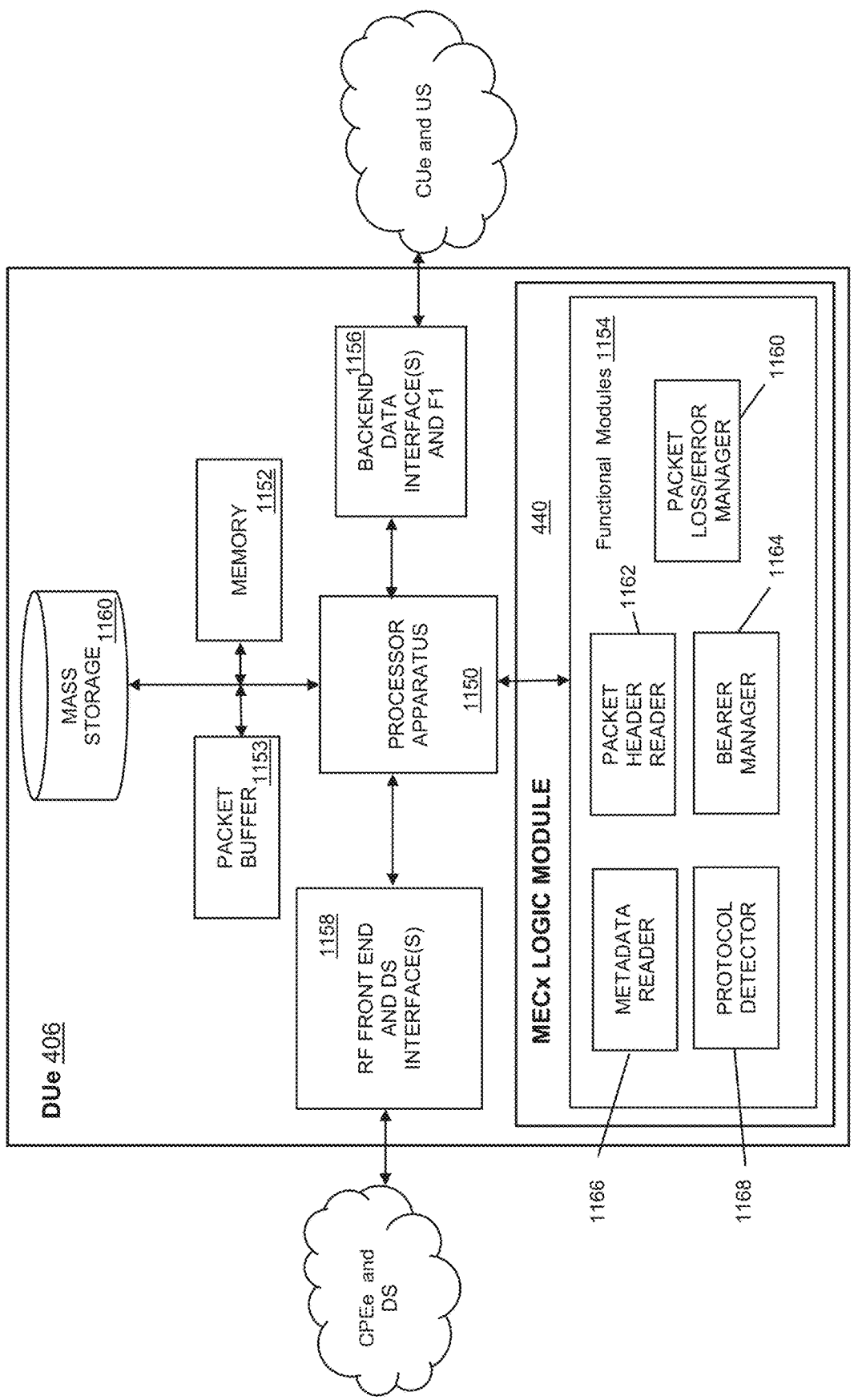
FIG. 11 is a functional block diagram illustrating an exemplary configuration of a Mobile Edge Computing (MECx) module of a DUe according to the present disclosure.

FIG. 11 illustrates a block diagram of an exemplary configuration of a DUe 406 with the aforementioned Mobile Edge Computing (MECx) platform or MECx module, useful for operation in accordance with the present disclosure.

In the exemplary embodiment as shown, the MECx module 440 is part of the DUe which includes, inter alia, a processor apparatus or subsystem 1150, a program memory module 1152, a backend network interface 1156 (toward, e.g., 5G CUe 404), and a front-end network interface 1158 (toward CPEe and premises equipment) via an RF front end of the type previously described with respect to FIG. 7 herein. As with the embodiment of FIG. 10, within the MECx module 440 are a number of functional modules 1154 (here implemented as software or firmware operative to execute on the processor 1102), each assigned with a function relating to OTT service detection and dedicated or specialized bearer configuration and instantiation. Although the exemplary MECx module 440 is shown used within the DUe 404, those of ordinary skill in the related arts will readily appreciate, given the present disclosure, that the functions of the MECx module 440 may be redundantly or alternatively installed, virtualized, and/or distributed within other DUe (e.g., two or more DUe having MECx in parallel) and/or other network elements, as discussed with respect to FIGS. 5-5g.

Moreover, while shown as part of the host DUe 406 (such as via server blade, PCIe-connected module, or other), in one embodiment, the MECx module 440 is a standalone computerized apparatus that is in data communication with the DUe (or multiple DUe), such as via a LAN or WAN. However, it may also be implemented within an intermediate entity, e.g., within a data center, another network controller, and/or within "cloud" entities or other portions of the infrastructure of which the rest of the enhanced network (as discussed supra) is a part, whether owned/operated by the MSO or otherwise.

As with the CUe-based variant of FIG. 10, the processor apparatus 1150 may include one or more of a digital signal processor, microprocessor, field-programmable gate array, or plurality of processing components mounted on one or more substrates. The processor 1150 may also comprise an internal cache memory. The processing subsystem is in communication with a program memory module or subsystem 1152, where the latter may include memory which may comprise, e.g., SRAM, flash and/or SDRAM components. The memory module 1152 may implement one or more of direct memory access (DMA) type hardware, so as to facilitate data accesses as is well known in the art. The memory module of the exemplary embodiment contains one or more computer-executable instructions that are executable by the processor apparatus 1150. A mass storage device (e.g., HDD or SSD, or even NAND flash or the like) is also provided as shown.

In one embodiment, the processing apparatus 1150 is configured to execute at least one computer program stored in memory 1152 (e.g., the logic of the MECx module 440 and its functional modules 1154 which implements the various detection functions described herein with respect to UL or DL data packets received from the network). The processing apparatus 1150 is configured to execute at least one computer program resident in storage 1160 associated with the host CUe 404 to support CUe functionality aside from the MECx functions. Other embodiments may implement such functionality within dedicated hardware, logic, and/or specialized co-processors (not shown). For instance, each distinct functional module 1160, 1162, 1164, 1166, 1168 of the MECx module (e.g., detection of transport protocol, metadata, etc.) may comprise their own hardware/software environment, and/or be distributed across multiple logical domains.

In the exemplary embodiment, the MEC module 442 is configured to receive data via the front-end interface(s) 1158 from, e.g., a client device and use the various functional modules to 1160, 1162, 1164, 1166, 1168 identify or characterize one or more aspects of the packets making up the data traffic, as well as cause subsequent creation and management of dedicated bearers.

In other embodiments, application programming interfaces (APIs) such as those included in an MSO-provided applications, installed with other proprietary software, or natively available on the DUe controller apparatus (e.g., as part of the computer program noted supra or exclusively internal to the MECx module 440) may also be accessible to external processes (such as a network administrative process, another MECx module, or even the client or third-party server, as previously described with respect to the CUe of FIG. 10.

Returning to the exemplary embodiment as shown in FIG. 11a, one or more network "front-end" interface(s) 1158 are also utilized in the illustrated DUe for communication with downstream network entities, e.g., CUe, CPEe, APs or other intermediate entities, via extant infrastructure, e.g., Ethernet, HFC cabling, or other wired and/or wireless data network protocols. Upstream data packets originating from a client device may be received via the front-end interface(s) 1158.

In the exemplary embodiment, one or more backend interfaces 1156 are configured to transact one or more data packets with other networked devices, particularly the 5G CUe, other DUe, etc. according to a network protocol, which may also support the 3GPP 5G F1 interface (see FIG. 4). Common examples of network routing protocols include for example: Internet Protocol (IP), Internetwork Packet Exchange (IPX), and GbE (Gigabit Ethernet), or other interfaces of suitable bandwidth capability.

It will also be appreciated that the two interfaces 1156, 1158 may be aggregated together and/or shared with other extant data interfaces, such as in cases where a function of the MECx module is virtualized within another component, such as the DUe or an MSO network server performing that function.

Methods—

The following discussion describes methods for improving or guaranteeing quality of experience (QoE) for a data provision service in a wireless-enabled data network according to the present disclosure.

Figure 12:
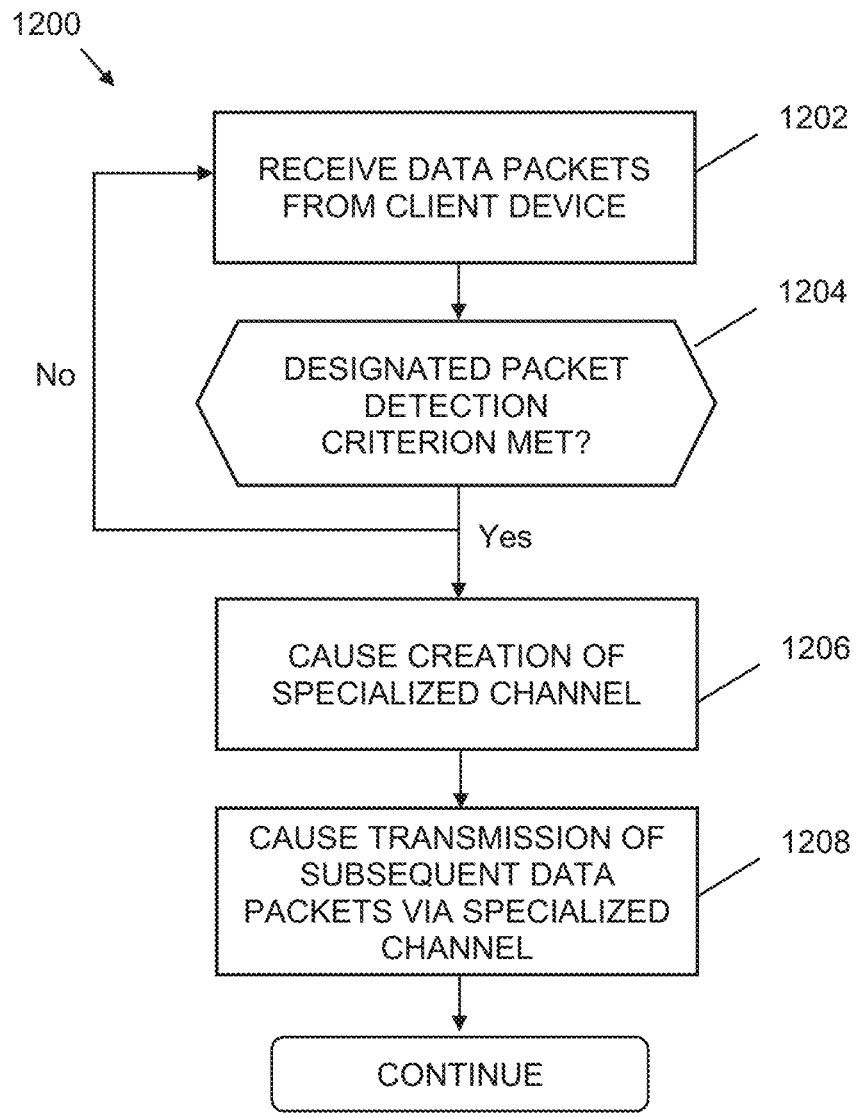
FIG. 12 is a logical flow diagram illustrating one exemplary embodiment of a method for enhancing a quality of experience (QoE) for over-the-top data services.

Referring now to FIG. 12, one exemplary embodiment of a method 1200 for enhancing a quality of experience (QoE) for over-the-top data services via, e.g., the architecture 400 of FIG. 4 is described in detail.

The method includes first receiving one or more data packets that originate from a client device, per step 1202. In the exemplary embodiment, a CUe entity (e.g., 404) may receive the data from the client device. More specifically, a MECx module residing in the CUe or DUe (e.g., MECu) may receive the data packets via a default bearer, for subsequent processing (and/or cause at least temporary storage at an associated storage or memory apparatus) as will be described below. In one implementation, the CUe receives the data via a DUe, where the DUe is closer to the edge of the network and more proximate to the client device and/or user of the client device. In another variant, the DUe entity (e.g., 406, 406a, 411) may receive the data. The DUe may include a MECx module that receives the data. Advantageously, the DUe may detect the type of data received earlier than it may be by the CUe by virtue of the DUe's closer topological proximity to the user, as will be elaborated on below. However, depending on configuration of the network and the gNB, the CUe may be better equipped/more fully functioned, with greater processing, storage, bandwidth, and/or other networking capabilities, thereby allowing potentially faster and/or more efficient processing or simultaneous processing when data is received via numerous connections. One of ordinary skill in the relevant arts will recognize that the core network (e.g., 5GC 403 or EPC) may also include an MECx 444 configured to receive the upstream data packets (as well as downstream) in certain variants.

In the context of at least the exemplary embodiment, the client device may be a wireless-enabled UE capable of wireless data communication via 3GPP-based (e.g., 3G, 4G LTE, 4.5G, 4G/5G, 5G NR) and/or IEEE Std. 802.11-based protocols (i.e., Wi-Fi). The client device may be one of various different types of mobile devices such as those noted elsewhere herein. In this embodiment, the client device may transmit data comprising audio data to a network entity. More specifically, the client device may transmit voice data to a third-party over-the-top (OTT) voice services provider such as a VOIP server or the like operating on the Internet. The OTT provider may be a third-party source unaffiliated with the network operator/MSO, and may utilize one or more data servers to exchange content with requesting/participating users or subscribers via the network operator's infrastructure. For instance, the participating users may both/all be MSO subscribers, or only one may be an MSO subscriber.

At step 1204, the CUe (or DUe) may determine whether at least one aspect of the received data packets matches a predetermined criterion (or multiple criteria). In one embodiment, one of the aspects is a network transfer protocol of the data packets. In some exemplary variants, the CUe/DUe may determine, via its MECx, whether the transfer protocol is the aforementioned Extensible Messaging and Presence Protocol (XMPP) or Bidirectional-streams over Synchronous HTTP (BOSH). In other variants, the CUe/DUe may identify other types of transfer protocols, such as, inter alia, Real-time Transport Protocol (RTP), Real-time Streaming Protocol (RTSP), Web Socket, and XMPP over BOSH (XEP-0206). In one embodiment, the MEC module may identify the type of transfer protocol by reading the header portion of one or more of the received packets.

In another embodiment, the MECx evaluates routing data, metadata, or other such ancillary (i.e., non-user) data contained in one or more of the received packets or its framing. Various routing data/metadata may be identified, such as destination IP address (i.e., intended receiving node), type of packet, IP address of sending node, MAC address of sending node, checksum to detect any corruption, total length of packet (useful for, e.g., an implementation where the type of packet or packetization protocol may be identified at least by size of packets), type of transport protocol (useful for, e.g., the foregoing embodiment).

In one exemplary variant, the CUe/DUe may identify via the MECx the intended destination IP address of the packet, and determine whether this address matches one of a plurality of known IP addresses or range of IP addresses. In OTT voice services implementations, a client device communicates with a specific third-party server or servers for transmitting and receiving voice data with, e.g., other users using the same service. For example, a Skype conversation between two people or a group conference call among numerous parties necessitates a mutual connection to a specific server operated by the operator of Skype (and not necessarily the network operator). Hence, the MECx module of the CUe/DUe may determine that a packet having a destination IP matching the IP address (or range of IP addresses) associated with the specific server, and thereby classify the traffic as being voice traffic.

In some variants, the determination is made at a predetermined interval, or alternatively a dynamic interval, or based on the occurrence of specific events. For example, a packet "sniff" of the default bearer may occur periodically, or may occur based on changes of one or more parameters associated with the default bearer (e.g., those indicative that a new data stream has made use of or been assigned to the default bearer). Session establishment traffic (e.g., traffic specific to negotiation and instantiation of a session across the default bearer) may be used as well. In cases where different types of data are handled by, e.g., the CUe, the interval may be lower so as to evaluate the aspect of data more frequently and identify the relevant parameters (e.g., transfer protocol, destination IP) earlier. In another variant, the determination is made at every prescribed quantity of packets passed through the CUe/DUe (e.g., every N packets transacted).

In other variants, other detection rules may be implemented, such as size, content, length, and format of packets, method of encryption used, usage of VPN, etc.

Returning to FIG. 12, at step 1206, if the at least one aspect of the received data packets matches the predetermined criterion, the MECx module of the CUe or DUe may cause the creation of a "specialized" data channel. Here, the term "specialized channel" is broadly intended to include one or more channels that are specifically selected and/or configured for use with the detected traffic. In one exemplary embodiment, the MECx module instructs another network entity (e.g., 5G Core network, or EPC) to create a dedicated bearer. In addition, the dedicated bearer attaches to the existing default bearer which initially transported the one or more data packets at step 1202. The dedicated bearer has a different QCI value associated with, e.g., a different priority level, different packet error loss rate, and/or different packet delay budget. Generally, the priority level of the dedicated bearer is higher than that of the default bearer, making the packets less likely to drop; however, the present disclosure contemplates instances where the dedicated bearer is less capable in one or more regards, such as where the detected traffic is known to be more robust or error-tolerant, and hence can utilize a less capable bearer specifically chosen/configured for its particular needs.

In some variations, the criterion comprises a match that must exist between specified protocols (e.g., XMPP or BOSH) and/or versions thereof. In another variant, the protocol only need to match any audio transfer protocol, availing the guaranteed QoE enabled to a wider range of communications. In another variant, a match with one of several video encoding formats or transfer protocols may be required in addition to the match with the audio transfer protocol. Examples of video transfer protocols include but are not limited in any way to: Real-time Transport Protocol (RTP), Real-time Streaming Protocol (RTSP), User Datagram Protocol (UDP), MPEG2 Transport Stream (M2TS), RTP/RTSP over TCP, and so on. Examples of encoding formats may include, without limitation, H.264, MPEG-4, AVI, etc. One of ordinary skill in the relevant art will recognize other formats as applicable.

If the criterion/criteria is/are not met (e.g., there is no match), the process returns to step 1202 where the CUe/DUe may continue to receive traffic from the client device (or other networked devices).

At step 1208, the MECx module of the CUe or DUe may cause packets subsequently transmitted by, e.g., the client device to be transmitted via the specialized data channel. In the exemplary embodiment, the dedicated bearer provides favorable network parameters (at least by virtue of greater priority than at least some other types of traffic), and enables the upstream voice traffic from the client device to benefit from greater QoS and the user(s) to automatically benefit from greater QoE (whereas in prior systems, QoE may not be guaranteed).

The target (e.g., voice) traffic may be transmitted via the nodes of the architecture 400, i.e., through the CPEe, DUe, CUe, core network, in order to reach one or more specific servers associated with the OTT voice service provider. In one variant, the client device may wirelessly access the nodes via a router or modem near the premises (e.g., Wi-Fi router 417). In some variants, the client device may directly communicate with a DUe or another access node by wireless means, e.g., via a 3GPP-based protocol (e.g., 4G, 4.5G, 5G). Regardless, voice traffic transmitted by the client is received via the aforementioned created dedicated bearer.

In certain implementations, any dropped, corrupt, or missing packets may be retransmitted to the server(s), whether via the underlying transport protocols used (e.g., where such protocols have a packet loss detection and retransmission mechanism) or by mechanisms supporting the dedicated bearer itself. Retransmission of packets may be useful where a lag period exists between transmission and receipt or rendering of the data (e.g., live broadcasting of media with a time buffer to allow control over). As opposed to an instantaneous exchange of voice traffic via, e.g., VoIP, where retransmission would distort the received contents, a scenario such as above may allow the opportunity to rectify any corrupted or missing voice, image, or video content before it is delivered to the intended recipient.

In some implementations, any returning traffic having the aspect detected at step 1204 may be received via the same or another dedicated bearer. Stated differently, the present disclosure contemplates at least: (i) US and DS traffic for the same session being carried via separate unrelated/uncoupled bearers; (ii) US and DS traffic for the same session being carried via separate but logically related bearers; and (iii) US and DS traffic for the same session being carried via different US/DS portions of the same bearers (e.g., via subcarriers within a common bearer band).

Figure 12A:
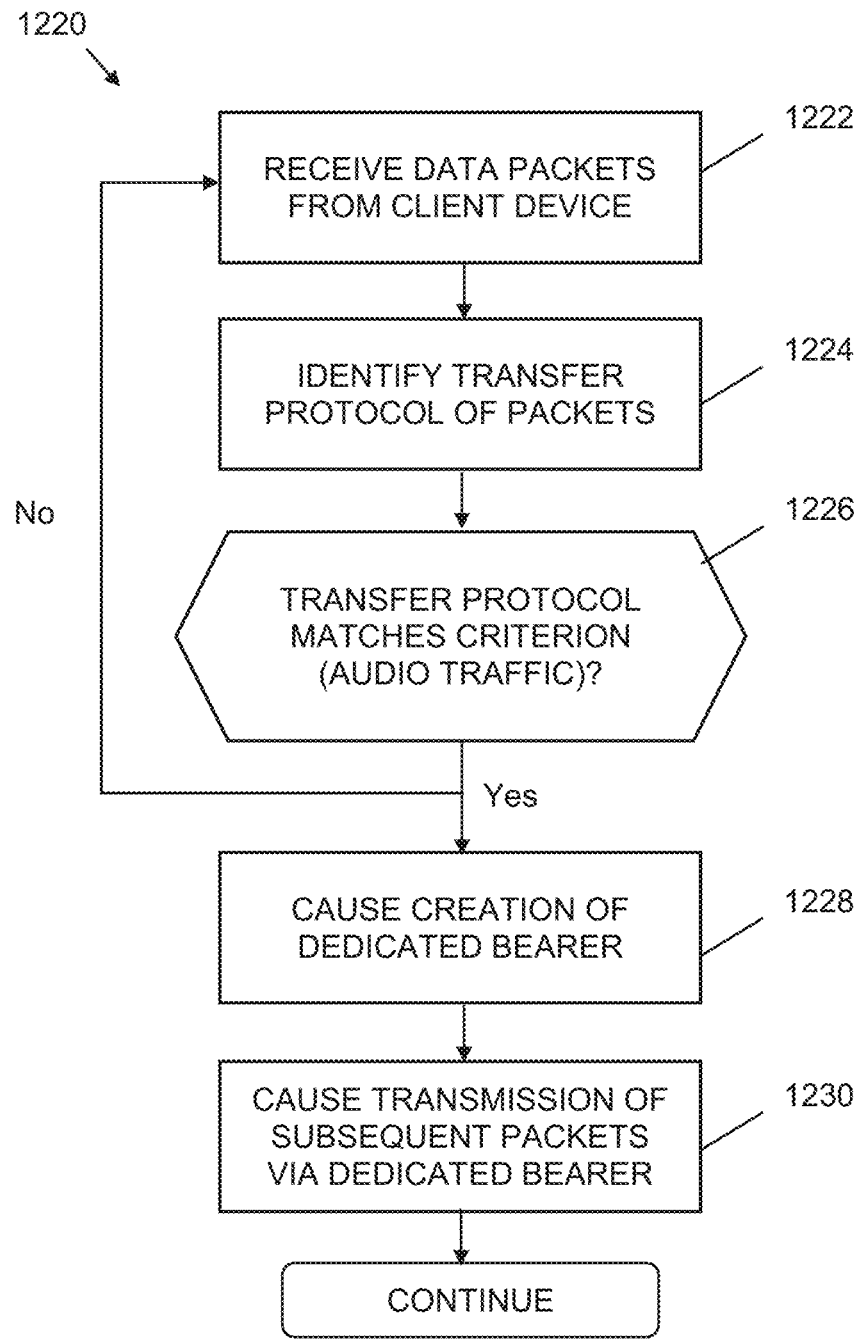
FIG. 12a is a logical flow diagram illustrating one particular implementation of the method of FIG. 12 for enhancing the QoE for over-the-top data services.

Turning to FIG. 12a, one exemplary implementation of the method 1220 for enhancing the QoE for over-the-top data services is described.

At step 1222, a CUe or DUe may receive one or more data packets that originate from a client device. In one exemplary embodiment, an MECx module disposed at the CUe and/or DUe receives upstream data packets from the client device, similar to the embodiments described with respect to step 1202.

At step 1224, the MECx module may identify the transport protocol associated with the received packets. The transport protocol detectable by the MEC module may include, without limitation, XMPP, BOSH, WebSocket, XMPP over BOSH, and in fact, any other known transfer protocol. In one embodiment, the MECx module may identify the type of transfer protocol by reading the header portion of a received packet. In one variant, the MECx module may be implemented for detection of the transfer protocol at the core network rather than at the CUe or DUe. In another variant, the transfer protocol may include those associated with video. In another variant, video encoding protocols may be detected.

At step 1226, the MECx module may determine whether the transport protocol identified in step 1224 matches one or more criteria. In one exemplary embodiment, a criterion includes types of transport protocols associated with audio traffic. The MECx module may determine whether the detected protocol is one associated with voice application formats or protocols, such as XMPP or BOSH.

In some variants, the MECx module may determine a match between the detected transfer protocol and video-related protocols or formats, such that a video data stream is then inferred (and accordingly higher bandwidth or other requirements of the bearer to be assigned). In some variants, the determination may be made at predetermined or dynamic intervals or every prescribed quantity of packets, as described above.

At step 1228, if it is determined that the transport protocol of the received data packets meets the prescribed criteria (e.g., matches one of those associated with voice traffic), the MECx module may cause a creation or instantiation of a dedicated bearer. In some variants, the match must exist between specified protocols (e.g., XMPP or BOSH) and/or versions thereof, such as via comparison to an updated whitelist maintained by the MECx.

If it is determined that there is no match between the protocol of the received data packets and any associated with voice traffic, the process returns to step 1222.

At step 1230, the MECx module may cause transmission of subsequent data packets from the client device via the dedicated bearer(s), thereby enabling improved or guaranteed QoE to users of the network at least by virtue of prioritization of the upstream voice traffic through the dedicated bearer(s).

In one implementation, any returning (DS) traffic having the same transport protocol as that detected in step 1226 may be routed to and received by the client via the same or another dedicated bearer. For example, the same bearer may be assigned, or a "companion" bearer may be dedicated to the DS traffic, and the two bearers logically associated within the MECx entities.

Figure 12B:
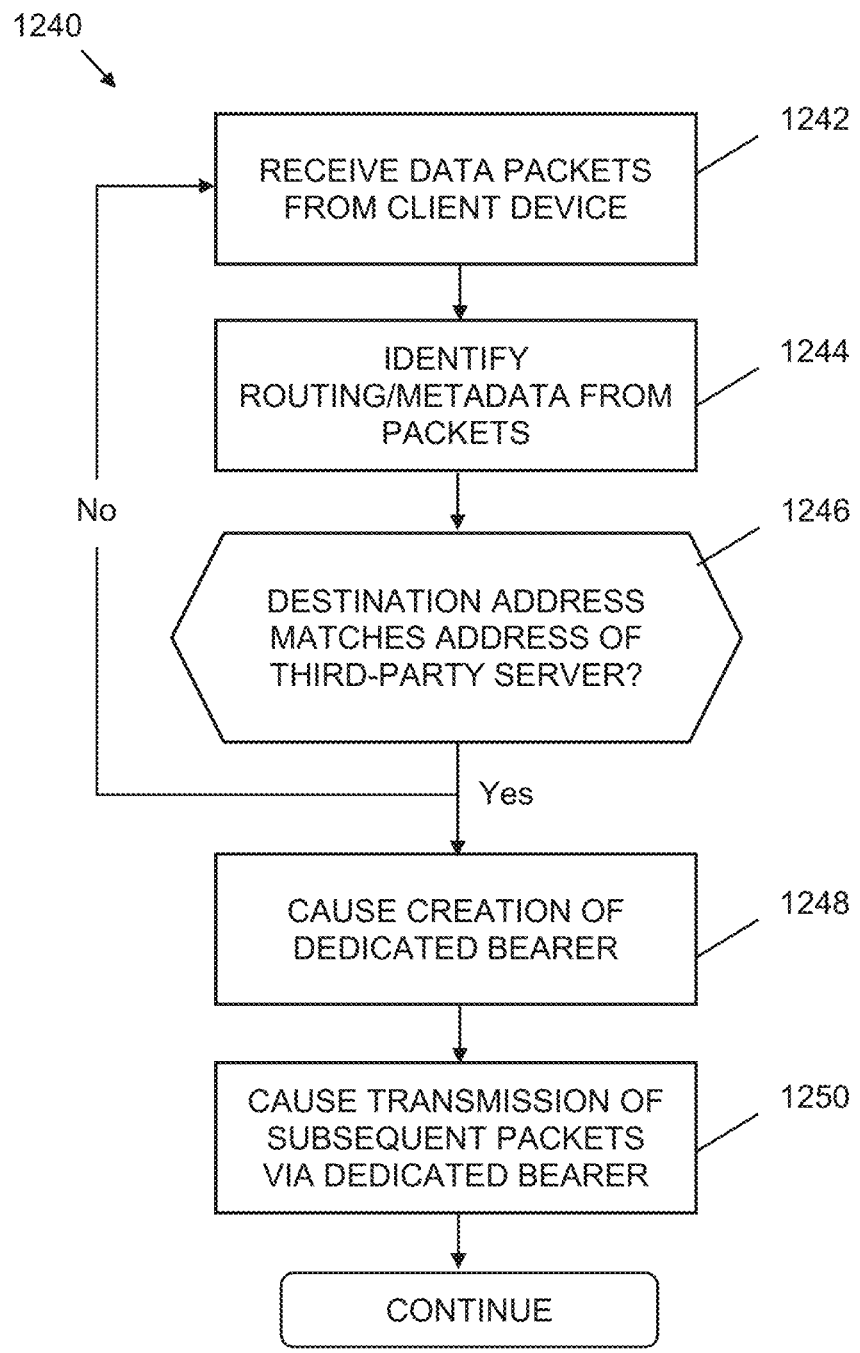
FIG. 12b is a logical flow diagram illustrating one particular implementation of the method of FIG. 12 for enhancing the QoE for over-the-top data services.

Turning now to FIG. 12b, another exemplary method 1240 for enhancing the QoE for over-the-top data services is described.

At step 1242, a network node (e.g., CUe or DUe) may receive data packets originating from a client device connected to the network. In exemplary embodiments, the CUe and/or DUe includes a MECx module configured to receive and/or cause storage of the packets, and evaluate the metadata associated with the packets (e.g., via FIFO buffer or the like).

At step 1244, the CUe/DUe (via its MECx) may analyze the packets to identify metadata associated with the received packets. In one exemplary embodiment, the MEC module of the CUe/DUe reads metadata of the packets that includes a destination IP address for the intended destination of the packet.

At step 1246, the CUe/DUe, and more specifically, the MECx module associated therewith, may determine whether the destination IP address matches the IP address of a specific third-party server, or is within a range of server addresses used by a known service. As noted elsewhere herein, an OTT voice application may enable voice applications via connection with a specific third-party server or servers used by the underlying application. Hence, identifying the destination IP address of a packet indicates to the CUe/DUe of the network that the incoming traffic includes at least voice data in need of enhanced QoE.

At step 1248, if the criteria is determined to be met (e.g., an address or address range match based on step 1246), the CUe/DUe (MECx module) may cause creation of a dedicated bearer for subsequent packets originating from the client device. If a match does not exist, the CUe/DUe continues to receive data and continue checking intended destination IP addresses in the routing data, header or metadata as applicable for a match with the known IP addresses.

At step 1250, the CUe/DUe (MECx module) may cause transmission of packets received after to the creation of the dedicated bearer, thereby enhancing the QoE experienced by the user of the client device at least by virtue of prioritization of the upstream voice traffic through the dedicated bearer. In some implementations, any returning traffic from the server associated with the destination IP may be received via the same or another dedicated bearer as previously described.

Advantageously, the above-described processes enable mitigation of the impact of network congestion, and improve or even guarantee a prescribed level of QoE for the users (as well as a higher MOS), by giving higher priority (among other QoS and network enhancements associated with the QCI value of the dedicated bearer) to traffic exchanged via the dedicated bearer, over other traffic exchanged via the "best effort" default bearer. OTT voice traffic susceptible to connection drops or packet loss may especially benefit from the detection and enhancement by the specialized network nodes present in the architecture described in the present disclosure.

Figure 13:
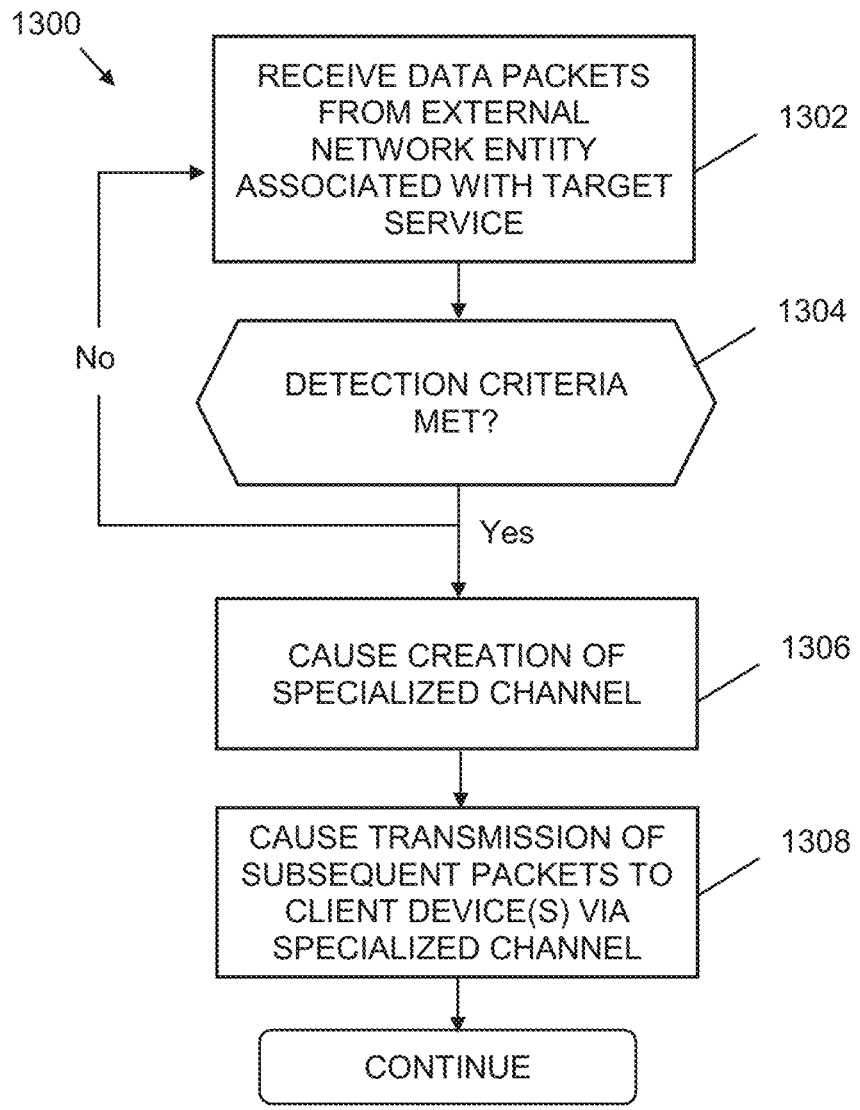
FIG. 13 is a logical flow diagram illustrating one exemplary embodiment of a method for enhancing the QoE for over-the-top data services received by a client device.

FIG. 13 illustrates one exemplary embodiment of a method 1300 for enhancing a quality of experience (QoE) for over-the-top data services received by a client device via, e.g., the architecture 400 of FIG. 4.

At step 1302, a network node may receive data packets from a network entity associated with a data provision service. In one exemplary embodiment, a core entity (e.g., 5G NR network core 403 or EPC) includes an MECx module that is configured to receive downstream data packets and/or cause at least temporary storage of the packets at an associated storage or memory apparatus, such as for buffering in a FIFO or similar structure. The core network may be communicative with from the network entity via physical HFC cabling controlled by an MSO, though the network entity may not be controlled by the MSO. For instance, Internet-based web servers used for voice and/or video traffic may constitute the "network entity," for example, OTT voice applications (Skype, FaceTime, etc.) use specific servers to provide such services to users who communicated with the servers via a network. However, the present disclosure also contemplates the case where the MSO or its proxy maintains or operates the network entity managing the audio/video streams of the OTT service.

In addition, the core entity (5GC or EPC or other MSO entity) may be configured to read or detect one or more aspects associated with the packets, as will be discussed further.

At step 1304 of the method 1300, the MECx module may determine whether one or more aspects of the packets meets or matches one or more detection criteria. In one embodiment, an aspect is use of a particular transport protocol of the data packets. For example, the data may be transmitted via XMPP or BOSH, indicating audio data. A variety of other transport protocols may be identified and matched, including video transfer protocols. Video encoding formats may also be identified and matched.

In other embodiments, an MECx module present in a DUe or a CUe of the architecture 400 may be configured to determine whether the aspects of the DS data packets meet or match the criteria; i.e., whether alone or in conjunction with a US packet analysis as previously described. It will also be appreciated that while a "US" or upstream packet entity (e.g., MECu) disposed topologically closer to the originating client, and a corresponding "DS" (downstream) packet entity (e.g., MECd) disposed at or near the core, and hence topologically closer to the originating VoiP or other OTT server(s) are described, the present disclosure contemplates an inversion of the foregoing, such as where the 5GC or EPC Core entity (MECx) is actually the upstream or client-to-server) packet detection/analysis entity, and the CUe/DuE MECx is the downstream detection/evaluation entity. Moreover, multiple MECx entities may be positioned throughout the network architecture 400 with each having homogeneous or heterogeneous capability (e.g., some are both US and DS packet "sniffers," and others are one function only (e.g., US or DS).

At step 1306, the MECx module of the cognizant network node (5GC or EPC in this example) may cause creation of a specialized data channel. In one exemplary embodiment, the MECx module establishes a dedicated bearer associated with a different QCI value associated with, e.g., a different priority level, different packet error loss rate, and/or different packet delay budget. Generally, the priority level of the dedicated bearer is higher than that of the default bearer, making the packets less likely to drop, although as described above, this is not a requirement.

At step 1308, the MECx module may cause packets from the network entity (e.g., VoiP or media server(s)) to the client device to be transmitted via the specialized data channel. In one exemplary embodiment, any packets from the third-party server(s) that are detected after the determination that there is a match between the one or more aspects with the one or more criteria are transmitted via the dedicated bearer. For example, a client device using an OTT voice application to communicate with another client device now receives voice traffic from third-party server(s) via the dedicated bearer, granting the voice traffic higher priority than at least some other types of traffic, thereby guaranteeing the user's QoE automatically.

Figure 13A:
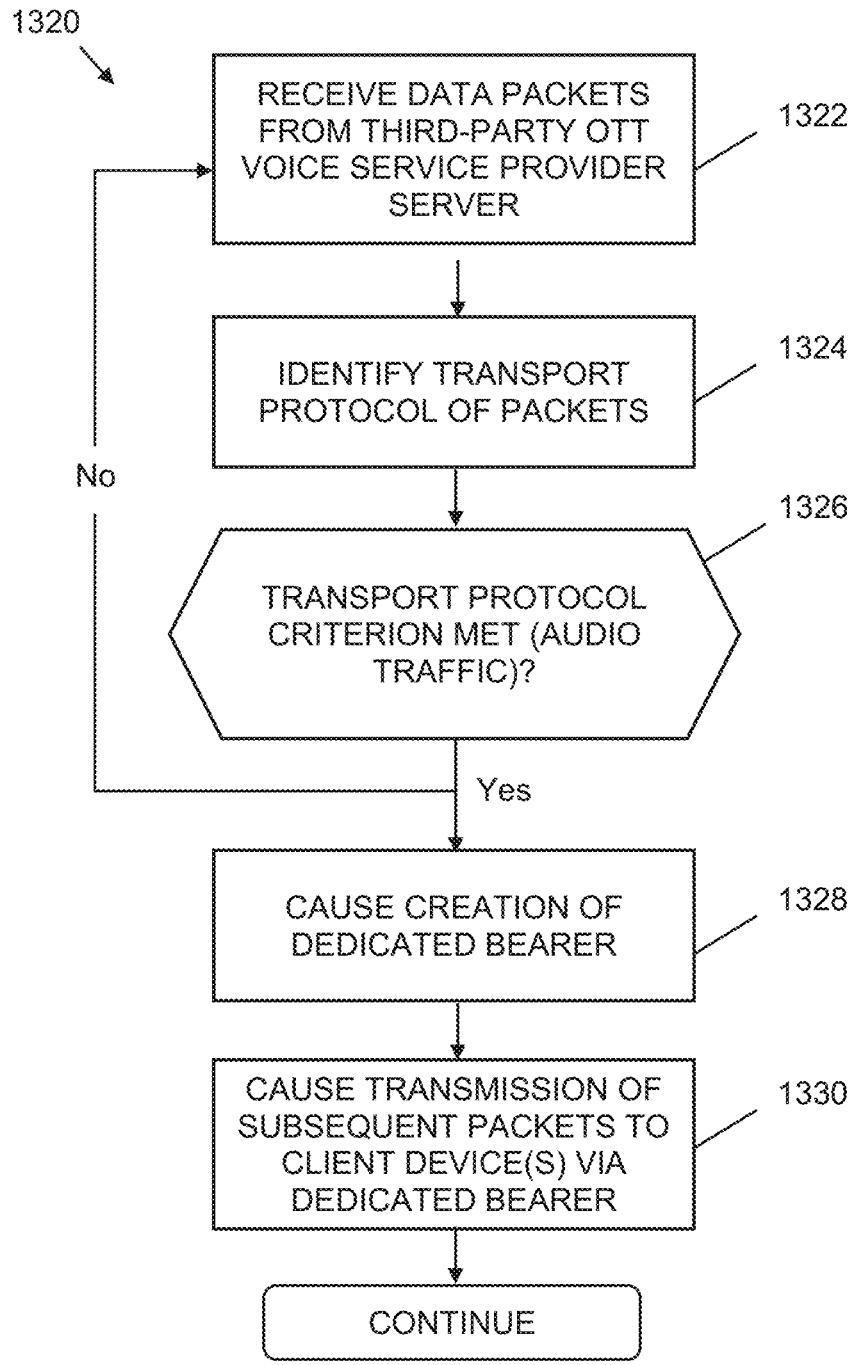
FIG. 13a is a logical flow diagram illustrating one particular implementation of the method of FIG. 13 for enhancing the QoE for over-the-top data services received by a client device.

FIG. 13a illustrates another exemplary implementation of a method 1320 for enhancing the QoE for over-the-top data services received by a client device.

At step 1322, a network node may receive data packets from a network entity associated with a data provision service. In one exemplary embodiment, an MECx module residing in a core entity (e.g., 5G NR Core 403 or EPC) receives downstream data packets from a third-party server associated with data provision services such as OTT voice services.

At step 1324, the MECx module of the network node may identify the transport or other protocol associated with the received packets. The transport protocol detectable by the MECx module may include for instance XMPP, BOSH, WebSocket, etc. In other variants, the transport protocol may include those associated with video. In another variant, video encoding protocols (such as MPEG-2 or MPEG-4 container formats) may be detected. As an aside, some containers are exclusive to audio, such as AIFF (IFF file format), WAV (RIFF file format), XMF (Extensible Music Format), while others can hold many types of audio and video, as well as other media, such as 3GP (used by many mobile phones; based on the ISO base media file format), ASF (container for Microsoft WMA and WMV), AVI, DVR-MS, Flash Video (FLV, F4V) (container for video and audio from Adobe Systems), and IFF (first platform-independent container format), as well as the aforementioned MPEG/MP4.

At step 1326, the MECX module may determine whether the transport protocol meets or matches a prescribed criterion.

At step 1328, if the MECx module determines that the transport protocol matches one of the prescribed protocols, the MECx module creates a dedicated bearer. If there is no match, the MEC module continues to monitor the downstream traffic per step 1322.

At step 1330, the MECx module may cause transmission of subsequent packets from the network entity (e.g., third-party voice application server) to the client device via the dedicated bearer that has a higher priority than the default bearer, among other enhanced QoS network parameters as noted elsewhere. Hence, voice packets received by the user's client device are guaranteed to not drop before at least some other types of traffic, enhancing the user's QoE.

Figure 13B:
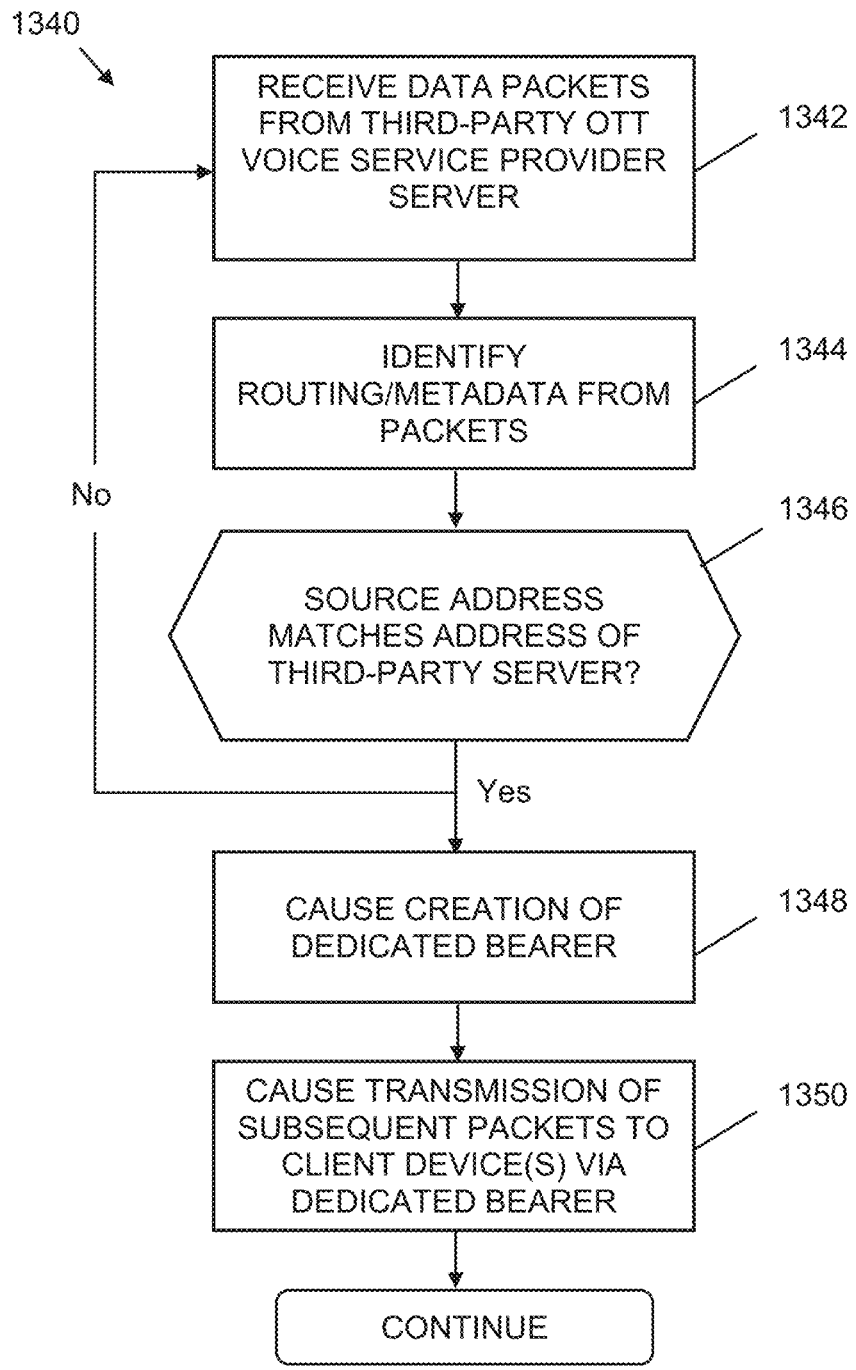
FIG. 13b is a logical flow diagram illustrating another particular implementation of the method of FIG. 13 for enhancing the QoE for over-the-top data services received by a client device.

FIG. 13*b* illustrates yet another embodiment of the method of DS detection and processing for enhanced QoE, wherein the source server or process IP address is used as a basis for detection of audio/video traffic that requires a customized (e.g., dedicated) bearer to be instantiated.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A method for provision of a data service over a data network, the data service having a guaranteed quality of experience (QoE), the method comprising:
receiving, over at least one first type of data channel, digital data from a computerized network apparatus, the digital data associated with a data service, the digital data comprising a first type of data and a second type of data;
determining that at least one aspect associated with the digital data meets at least one prescribed criterion;
based at least on the at least one prescribed criterion being met, causing instantiation of at least one second type of data channel, the second type of data channel comprising a priority level that is different from a priority level associated with the first type of data channel; and
causing the computerized network apparatus to transmit subsequent digital data via the at least one second type of data channel.

2. The method of claim 1, wherein the determining that the at least one aspect meets the at least one prescribed criterion comprises determining that a transport protocol associated with the digital data comprises one of an Extensible Messaging and Presence Protocol (XMPP) or a Bidirectional-streams over Synchronous HTTP (BOSH).

3. The method of claim 1, wherein the digital data comprises audio data configured for use with one or more of Voice over Internet Protocol (VoIP) or Voice over Long Term Evolution (VoLTE) services for at least real-time voice communication.

4. The method of claim 1, wherein the receiving, the determining and the causing of the instantiation are each performed by execution of computerized logic on one of a distributed unit (DU) or a central unit (CU) of the data network.

5. Computerized apparatus configured to enable enhanced quality of experience (QoE) of communication over a data network, the computerized apparatus comprising:
digital processing apparatus;
a data interface in data communication with the digital processing apparatus and configured for data communication with a computerized IP-enabled client device; and
a storage device in data communication with the digital processing apparatus and comprising at least one computer program, the at least one computer program configured to, when executed on the digital processing apparatus, cause the computerized apparatus to:
receive, over a first virtualized data channel, one or more data packets originating from the computerized IP-enabled client device of the data network;
determine that at least one attribute of the one or more received data packets meets a prescribed criterion;
based at least on the determination, cause creation of a second virtualized data channel, the second virtualized data channel comprising a priority level that is greater than a priority level associated with the first virtualized data channel; and
cause transmission of data packets associated with a communication service that are subsequently received from the computerized IP-enabled client device via the second virtualized data channel.

6. The computerized apparatus of claim 5, wherein the receipt of the one or more data packets comprises receipt of one or more Voice over Internet Protocol (VoIP) packets at least via a wireless connection between the computerized IP-enabled client device and a network node communicative with the computerized apparatus.

7. The computerized apparatus of claim 5, wherein the second virtualized data channel is logically correlated to the first virtualized data channel.

8. The computerized apparatus of claim 5, wherein:
the receipt of the one or more data packets from the computerized IP-enabled client device over the first virtualized data channel comprises receiving the one or more data packets from the computerized IP-enabled client device over a 3GPP EPS (Evolved Packet System) or 5G NR (New Radio) default bearer; and
the causation of the transmission of the data packets via the second virtualized data channel comprises causation of a transmission via a 3GPP EPS or 5G NR dedicated bearer attached to the 3GPP EPS or 5G NR default bearer.

9. The computerized apparatus of claim 5, wherein the causation of the creation of the second virtualized data channel is at least partly based on a determination that a match exists between (i) a transport protocol utilized by the one or more data packets and (ii) an Extensible Messaging and Presence Protocol (XMPP).

10. The computerized apparatus of claim 5, wherein the causation of the creation of the second virtualized data channel is at least partly based on a determination that a match exists between (i) a transport protocol utilized by the one or more data packets and (ii) a Bidirectional-streams over Synchronous HTTP (BOSH).

11. The computerized apparatus of claim 5, wherein the causation of the creation of the second virtualized data channel is at least partly in response to a determination that a destination Internet Protocol (IP) address associated with the one or more data packets comprises an IP address associated with a known third-party data server in data communication with the data network.

12. The computerized apparatus of claim 5, wherein:
the communication service comprises a real-time voice or video communication service susceptible to quality erosion due to use of the first virtualized data channel; and
the data network comprises an HFC (hybrid fiber coaxial) network utilizing at least OFDM (Orthogonal frequency division multiplexed) waveforms for providing at least the second virtualized data channel.

13. The computerized apparatus of claim 5, wherein the determination that the at least one attribute of the one or more received data packets meets the prescribed criterion comprises a determination that a transport protocol utilized by the one or more data packets matches a transport protocol associated with at least one of (i) a Bidirectional-streams over Synchronous HTTP (BOSH), or Extensible Messaging and Presence Protocol (XMPP).

14. The computerized apparatus of claim 5, wherein the determination occurs on a predetermined interval.

15. The computerized apparatus of claim 5, wherein the determination occurs based on at least one change of one or more parameters associated with the first virtualized data channel.

16. A software architecture, the software architecture comprising:
a mobile edge computing (MEC) apparatus that is operative on one or more Fifth Generation New Radio (5G NR) entities and configured to communicate with one or more software processes within the software architecture to invoke quality of service (QoS)-enabled bearers for over-the-top (OTT) voice sessions;
wherein the communication with the one or more software processes within the software architecture to invoke the QoS-enabled bearers for OTT voice sessions comprises:
receipt over a first virtualized data channel of one or more data packets originating from a computerized client device within the software architecture;
a determination that at least one attribute of the one or more received data packets meets a prescribed criterion;
based at least on the determination, causation of creation of a second virtualized data channel; and
causation of transmission of data packets associated with a communication service that are subsequently received from the computerized client device via the second virtualized data channel.

17. The software architecture of claim 16, wherein the one or more 5G NR entities comprise one or more of (i) a distributed unit (DU) or (ii) a central unit (CU).

18. The software architecture of claim 16, wherein the one or more 5G NR entities comprise at least an access and mobility management function (AMF).

19. A software architecture, the software architecture comprising:
a mobile edge computing (MEC) apparatus that is operative on one or more Fifth Generation New Radio (5G NR) entities and configured to communicate with one or more software processes within the software architecture to invoke quality of service (QoS)-enabled bearers for over-the-top (OTT) voice sessions;
wherein the communication with the one or more software processes within the software architecture to invoke the QoS-enabled bearers for OTT voice sessions comprises:
receipt over at least one first type of data channel of one or more data packets from a computerized network apparatus;
a determination that at least one aspect associated with the one or more data packets meets at least one prescribed criterion;
based at least on the at least one prescribed criterion being met, causation of instantiation of at least one second type of data channel, the second type of data channel comprising a priority level that is different from a priority level associated with the first type of data channel; and
causation of the computerized network apparatus to transmit one or more subsequent data packets via the at least one second type of data channel.

20. The software architecture of claim 19, wherein the one or more 5G NR entities comprise one or more of (i) a distributed unit (DU) or (ii) a central unit (CU).

* * * * *

UNITED STATES PATENT AND TRADEMARK OFFICE
CERTIFICATE OF CORRECTION

PATENT NO. : 12,041,398 B2
APPLICATION NO. : 17/967131
DATED : July 16, 2024
INVENTOR(S) : Pratik Das et al.

Page 1 of 1

It is certified that error appears in the above-identified patent and that said Letters Patent is hereby corrected as shown below:

In the Specification (Column 32 – Lines 60-64):
Currently Reads:
"where:
Rt = Total line resistance ohms per 100 ft.
Rt = 0.1(1/d + 1(sqrt(F))*D (for single copper line)
p = Power factor of dielectic
F = Frequency in megahertz (MHz)"

Should Read:
-- where:
Rt = Total line resistance ohms per 100 ft.
Rt = 0.1(1/d + 1(sqrt(F))*D (for single copper line)
p = Power factor of dielectric
F = Frequency in megahertz (MHz) --

Signed and Sealed this
Sixteenth Day of September, 2025

Coke Morgan Stewart
*Acting Director of the United States Patent and Trademark Office*